(12) United States Patent
Sasaki et al.

(10) Patent No.: US 7,716,814 B2
(45) Date of Patent: May 18, 2010

(54) METHOD OF MANUFACTURING MAGNETIC HEAD, AND MAGNETIC HEAD SUBSTRUCTURE

(75) Inventors: Yoshitaka Sasaki, Milpitas, CA (US); Hiroyuki Itoh, Milpitas, CA (US); Kazuo Ishizaki, Milpitas, CA (US); Ryuji Fujii, Hong Kong (CN); Tatsushi Shimizu, Hong Kong (CN)

(73) Assignees: Headway Technologies, Inc., Milpitas, CA (US); SAE Magnetics (H.K.) Ltd., Shatin (CN)

( * ) Notice: Subject to any disclaimer, the term of this patent is extended or adjusted under 35 U.S.C. 154(b) by 395 days.

(21) Appl. No.: 11/702,115

(22) Filed: Feb. 5, 2007

(65) Prior Publication Data

US 2008/0184551 A1    Aug. 7, 2008

(51) Int. Cl.
*G11B 5/127*  (2006.01)
*H04R 31/00*  (2006.01)

(52) U.S. Cl. .............. 29/603.16; 29/603.08; 29/603.12; 29/603.15; 29/603.18; 205/119; 205/122; 216/62; 216/65; 216/66; 360/121; 360/122; 360/317; 451/5; 451/41

(58) Field of Classification Search .............. 29/603.08, 29/603.12, 603.15, 603.16, 603.18, 606; 205/119, 122; 216/62, 65, 66; 360/121, 360/122, 317
See application file for complete search history.

(56) References Cited

U.S. PATENT DOCUMENTS

| | | | |
|---|---|---|---|
| 5,065,483 A * | 11/1991 | Zammit | 29/603.09 |
| 5,210,667 A * | 5/1993 | Zammit | 360/316 |
| 5,742,995 A | 4/1998 | Amin et al. | |
| 6,532,646 B2 | 3/2003 | Watanuki | |
| 6,760,197 B2 * | 7/2004 | Boutaghou et al. | 360/316 |
| 7,359,152 B2 | 4/2008 | Matono et al. | |
| 7,422,511 B2 * | 9/2008 | Fukuroi | 451/5 |
| 2005/0219752 A1 | 10/2005 | Takahashi | |
| 2006/0168798 A1 | 8/2006 | Naka | |
| 2006/0174475 A1 | 8/2006 | Sasaki et al. | |

FOREIGN PATENT DOCUMENTS

JP    A-61-267913    11/1986

(Continued)

OTHER PUBLICATIONS

Yoshitaka Sasaki et al., U.S. Appl. No. 11/207,891, filed Aug. 22, 2005.

*Primary Examiner*—Paul D Kim
(74) *Attorney, Agent, or Firm*—Oliff & Berridge, PLC

(57) ABSTRACT

Components of a plurality of magnetic heads are formed on a single substrate to fabricate a magnetic head substructure in which a plurality of pre-head portions are aligned in a plurality of rows. The substructure is cut to separate the plurality of pre-head portions from one another, and the plurality of magnetic heads are thereby fabricated. The surface formed by cutting the substructure is lapped to form a lapped surface. The lapped surface is lapped so as to reach a target position of a medium facing surface. The substructure incorporates first to fourth resistor elements each of which detects the position of the lapped surface. The third and fourth detection elements are located at positions shifted from the first and second resistor elements along the direction orthogonal to the medium facing surface.

20 Claims, 37 Drawing Sheets

FOREIGN PATENT DOCUMENTS

| JP | A-64-67709 | 3/1989 |
| JP | A-2000-67408 | 3/2000 |
| JP | A-2005-293805 | 10/2005 |
| JP | A-2006-73088 | 3/2006 |
| JP | A-2006-209905 | 8/2006 |

* cited by examiner

METHOD OF MANUFACTURING MAGNETIC HEAD, AND MAGNETIC HEAD SUBSTRUCTURE

BACKGROUND OF THE INVENTION

1. Field of the Invention

The present invention relates to a method of manufacturing magnetic heads used for writing data on a recording medium and to a magnetic head substructure used for manufacturing the magnetic heads.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction perpendicular to the surface of the recording medium. It is known that the perpendicular magnetic recording system is harder to be affected by thermal fluctuation of the recording medium and capable of implementing higher linear recording density, compared with the longitudinal magnetic recording system.

For each of the longitudinal magnetic recording system and the perpendicular magnetic recording system, magnetic heads typically used have a structure in which a reproducing (read) head having a magnetoresistive element (that may be hereinafter called an MR element) for reading and a recording (write) head having an induction-type electromagnetic transducer for writing are stacked on a substrate.

For each of the longitudinal and perpendicular magnetic recording systems, the write head incorporates a coil for generating a magnetic field corresponding to data to be written on a recording medium, and a magnetic pole layer for allowing a magnetic flux corresponding to the field generated by the coil to pass therethrough and generating a write magnetic field for writing the data on the recording medium. The pole layer incorporates a track width defining portion and a wide portion, for example. The track width defining portion has an end located in a medium facing surface that faces toward the recording medium. The wide portion is coupled to the other end of the track width defining portion and has a width greater than the width of the track width defining portion. The track width defining portion has a nearly uniform width.

To achieve higher recording density, it is a reduction in track width, that is, a reduction in width of the end face of the pole layer taken in the medium facing surface, and an improvement in writing characteristics that is required for the write head. An improvement in writing characteristics is, for example, an improvement in overwrite property that is a parameter indicating an overwriting capability. The overwrite property is reduced if the track width is reduced. It is therefore required to achieve a better overwrite property as the track width is reduced. Here, the length of the track width defining portion taken in the direction orthogonal to the medium facing surface is called a neck height. The smaller the neck height, the better is the overwrite property.

In the course of manufacturing magnetic heads, a number of magnetic head elements to be the magnetic heads are formed in a single substrate (wafer). The substrate in which the magnetic head elements are formed is cut such that the surface to be the medium facing surfaces appears. This surface is then polished to form the medium facing surfaces.

U.S. Pat. No. 5,742,995 discloses a technique in which a first triangle and a second triangle disposed to be opposite to each other are formed in a wafer and these triangles are used to calculate the height of an MR sensor (that is, the length of the MR sensor taken in the direction orthogonal to the medium facing surface). In this technique the height of the MR sensor is calculated by using the width of the base of the first triangle in the medium facing surface before the wafer is processed (before the wafer is polished), the width of the top of the second triangle in the medium facing surface before the wafer is processed, the width of the base of the first triangle in the medium facing surface after the wafer is polished, and the width of the top of the second triangle in the medium facing surface after the wafer is polished.

U.S. Patent Application Publication US2006/0174475A1 discloses a technique in which, in a substructure used to manufacture magnetic heads, there are provided resistor elements whose resistances vary in accordance with positions of the end faces of the track with defining portions when the medium facing surfaces are formed, and the surface to be the medium facing surfaces are lapped while monitoring the resistances of the MR elements and the resistor elements. In addition, this publication discloses a technique in which, in a substructure used to manufacture magnetic heads, there are provided first resistor elements whose resistances vary in accordance with positions of the end faces of MR elements when the medium facing surfaces are formed, and second resistor elements whose resistances vary in accordance with positions of the end faces of the track with defining portions when the medium facing surfaces are formed, and the surface to be the medium facing surfaces is lapped while monitoring the resistances of the first and second resistor elements.

An example of method of manufacturing magnetic heads will now be described. First, components of a plurality of magnetic heads are formed on a single substrate to fabricate a magnetic head substructure in which a plurality of pre-head portions that will be the magnetic heads later are aligned in a plurality of rows. Next, the magnetic head substructure is cut to fabricate a head aggregate including a single row of the pre-head portions. Next, a surface formed in the head aggregate by cutting the magnetic head substructure is polished (lapped) to form the medium facing surfaces of the pre-head portions that the head aggregate includes. Next, flying rails are formed in the medium facing surfaces. Next, the head aggregate is cut so that the pre-head portions are separated from one another, and the magnetic heads are thereby formed.

An example of method of forming the medium facing surfaces by lapping the head aggregate will now be described. In the method the head aggregate is lapped so that the MR heights of a plurality of pre-head portions are made equal while the resistances of a plurality of MR elements that the head aggregate includes are detected. The MR height is the length of each of the MR elements taken in the direction orthogonal to the medium facing surface.

According to the method of forming the medium facing surfaces as described above, it is possible to form the medium facing surfaces so that the MR heights are of a desired value. As a result, according to the method, a portion of each medium facing surface at which an end of the MR element is exposed is located at a desired position. Furthermore, according to this method, if the angle formed by the medium facing surface with respect to the top surface of the substrate is 90 degrees, a portion of the medium facing surface at which an end face of the track width defining portion is exposed is located at a desired position, too. As a result, the neck height is of a desired value, too.

Conventionally, however, there are cases in which the angle formed by the medium facing surface with respect to the top surface of the substrate deviates from 90 degrees. This is caused by misalignment of the head aggregate and a jig with respect to each other, the jig supporting the head aggregate when the aggregate is lapped. If the angle formed by the medium facing surface with respect to the top surface of the substrate is other than 90 degrees, the portion of the medium facing surface at which the end face of the track width defining portion is exposed deviates from its desired position even though the portion of the medium facing surface at which the end of the MR element is exposed is located at its desired position. As a result, the neck height is of a value other than the desired value.

As described above, if the neck height is of a value other than the desired value, there may be a case in which the track width is of a value other than the desired value, too. As thus described, the conventional problem is that there are some cases in which the portion of the medium facing surface at which the end face of the track width defining portion is exposed deviates from its desired position to thereby cause the track width to be of a value other than the desired value, and as a result, the yield of magnetic heads is reduced.

According to the technique disclosed in U.S. Pat. No. 5,742,995, it is possible to calculate the MR height but it is impossible to solve the above-mentioned problem.

According to the technique disclosed in U.S. Patent Application Publication US2006/0174475A1, it is possible to detect the angle formed by the lapped surface to be the medium facing surfaces with respect to the top surface of the substrate, and to thereby form the medium facing surfaces at desired positions with accuracy.

The following problem arises when the position of the lapped surface is detected while monitoring the resistances of the MR elements or the resistances of the resistor elements disclosed in U.S. Patent Application Publication US2006/0174475A1. The resistance of each MR element or resistor element is inversely proportional to the length of the MR element or resistor element taken in the direction orthogonal to the medium facing surface. Therefore, if this length of the MR element or resistor element is great, a change in resistance of the MR element or resistor element with respect to a change in position of the lapped surface is small. If this length of the MR element or resistor element is reduced, a change in resistance of the MR element or resistor element with respect to a change in position of the lapped surface becomes greater. Therefore, in a case in which there is a great distance between the lapped surface and the target position of the medium facing surfaces, such as a case in which this distance is greater than 1 µm, it is difficult to precisely detect the distance between the lapped surface and the target position of the medium facing surfaces and the angle formed by the lapped surface with respect to the top surface of the substrate. Consequently, if there is a great distance between the lapped surface and the target position of the medium facing surfaces, for example, there may be a case in which the angle formed by the lapped surface with respect to the top surface of the substrate greatly deviates from 90 degrees, and it is impossible to correct this angle later.

OBJECT AND SUMMARY OF THE INVENTION

It is an object of the invention to provide a method of manufacturing a magnetic head and a magnetic head substructure that allow a medium facing surface to be formed at a desired position with accuracy when the medium facing surface is formed by lapping a surface to be the medium facing surface, and that allow precise detection of the distance between a lapped surface to be the medium facing surface and a target position of the medium facing surface and the angle formed by the lapped surface with respect to the top surface of a substrate even if the lapped surface is away from the target position of the medium facing surface.

The magnetic head manufactured by a method of the invention incorporates: a medium facing surface that faces toward a recording medium; a read element that reads data written on the recording medium; and a write element that has an end face located in the medium facing surface and writes data on the recording medium.

The method of manufacturing the magnetic head of the invention includes the steps of: fabricating a magnetic head substructure by forming a plurality of sets of the read element and the write element on a substrate, the magnetic head substructure including a plurality of pre-head portions each of which will be the magnetic head later, the pre-head portions being aligned in a plurality of rows; and fabricating a plurality of magnetic heads by separating the plurality of pre-head portions from one another through cutting the substructure. In the step of fabricating the substructure, the read elements and the write elements are disposed such that the distance from the top surface of the substrate to the read elements and the distance from the top surface of the substrate to the write elements are different. The step of fabricating the magnetic heads includes the step of forming the medium facing surface by forming a lapped surface through lapping a surface formed by cutting the substructure, and by lapping the lapped surface so that the lapped surface reaches a target position of the medium facing surface and thereby becomes the medium facing surface.

The step of fabricating the substructure includes the step of forming: first and second detection elements that are disposed such that the distance from the top surface of the substrate to the first detection element and the distance from the top surface of the substrate to the second detection element are different and that are each used to detect a position of the lapped surface and to detect an angle formed by the lapped surface with respect to the top surface of the substrate; and third and fourth detection elements that are located at positions shifted from the first and second detection elements along a direction orthogonal to the medium facing surface and disposed such that the distance from the top surface of the substrate to the third detection element and the distance from the top surface of the substrate to the fourth detection element are different and that are each used to detect the position of the lapped surface and to detect the angle formed by the lapped surface with respect to the top surface of the substrate.

In the step of forming the medium facing surface, the medium facing surface is formed by lapping the lapped surface while monitoring the position of the lapped surface and the angle formed by the lapped surface with respect to the top surface of the substrate that are detected by using the first and second detection elements, and monitoring the position of the lapped surface and the angle formed by the lapped surface with respect to the top surface of the substrate that are detected by using the third and fourth detection elements.

A magnetic head substructure of the invention is used for manufacturing a magnetic head. The magnetic head incorporates: a medium facing surface that faces toward a recording medium; a read element that reads data written on the recording medium; and a write element that has an end face located in the medium facing surface and writes data on the recording medium.

The magnetic head substructure of the invention incorporates: a substrate; and a plurality of sets of the read element and the write element that are formed on the substrate so that a plurality of pre-head portions each of which will be the magnetic head later are aligned in a plurality of rows. The read elements and the write elements are disposed such that the distance from the top surface of the substrate to the read elements and the distance from the top surface of the substrate to the write elements are different. The substructure is such one that, to fabricate the magnetic head, the substructure is cut so that the plurality of pre-head portions are separated from one another, a surface formed by cutting the substructure is lapped to form a lapped surface, and the lapped surface is lapped so that the lapped surface reaches a target position of the medium facing surface and thereby becomes the medium facing surface.

The substructure further incorporates: first and second detection elements that are disposed such that the distance from the top surface of the substrate to the first detection element and the distance from the top surface of the substrate to the second detection element are different and that are each used to detect a position of the lapped surface and to detect an angle formed by the lapped surface with respect to the top surface of the substrate; and third and fourth detection elements that are located at positions shifted from the first and second detection elements along the direction orthogonal to the medium facing surface and disposed such that the distance from the top surface of the substrate to the third detection element and the distance from the top surface of the substrate to the fourth detection element are different and that are each used to detect the position of the lapped surface and to detect the angle formed by the lapped surface with respect to the top surface of the substrate.

In the method of manufacturing the magnetic head or the magnetic head substructure of the invention, each of the first to fourth detection elements may be a resistor element whose resistance changes with changes in the position of the lapped surface.

In the method or the substructure of the invention, the third and fourth detection elements may be located farther from the target position of the medium facing surface than the first and second detection elements. In this case, each of the first to fourth detection elements may be located in a region that will not remain in the magnetic head. Alternatively, a portion of each of the first and second detection elements may be located in a region that will remain in the magnetic head.

In the method or the substructure of the invention, the read element may be a magnetoresistive element. In this case, the read element may also function as the first detection element.

In the method or the substructure of the invention, at least one of the first to fourth detection elements may include a first indicator and a second indicator that are exposed at the lapped surface, and one of the width of the first indicator and the width of the second indicator taken at the lapped surface decreases while the other increases with changes in the position of the lapped surface.

In the method or the substructure of the invention, the write element may incorporate: a coil for generating a magnetic field corresponding to data to be written on the recording medium; and a pole layer that includes a track width defining portion having an end face located in the medium facing surface, the pole layer allowing a magnetic flux corresponding to the field generated by the coil to pass therethrough and generating a write magnetic field for writing the data on the recording medium.

In the method or the substructure of the invention, the magnetic head may be one used for a perpendicular magnetic recording system.

According to the method of manufacturing the magnetic head or the magnetic head substructure of the invention, it is possible to form the medium facing surface by lapping the lapped surface while monitoring the position of the lapped surface and the angle formed by the lapped surface with respect to the top surface of the substrate that are detected by using the first and second detection elements, and monitoring the position of the lapped surface and the angle formed by the lapped surface with respect to the top surface of the substrate that are detected by using the third and fourth detection elements. As a result, according to the invention, when the medium facing surface is formed by lapping a surface to be the medium facing surface, it is possible to from the medium facing surface at a desired position with accuracy and to precisely detect the distance from the lapped surface to the target position of the medium facing surface and the angle formed by the lapped surface with respect to the top surface of the substrate even if the lapped surface is away from the target position of the medium facing surface.

Other and further objects, features and advantages of the invention will appear more fully from the following description.

DETAILED DESCRIPTION OF THE PREFERRED EMBODIMENTS

First Embodiment

Figure 2:
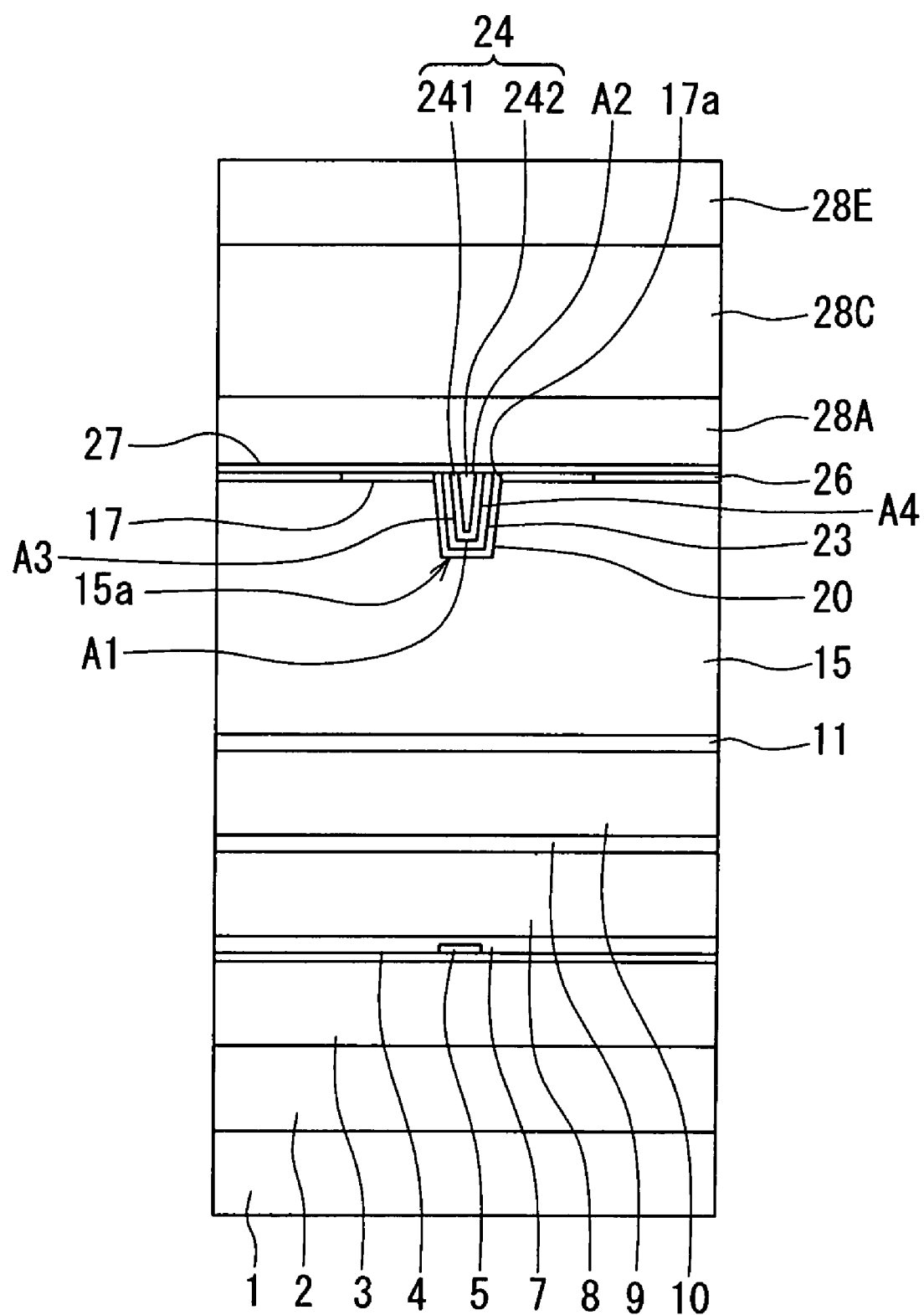
FIG. 2 is a front view of the medium facing surface of a magnetic head of the first embodiment of the invention.
Figure 3:
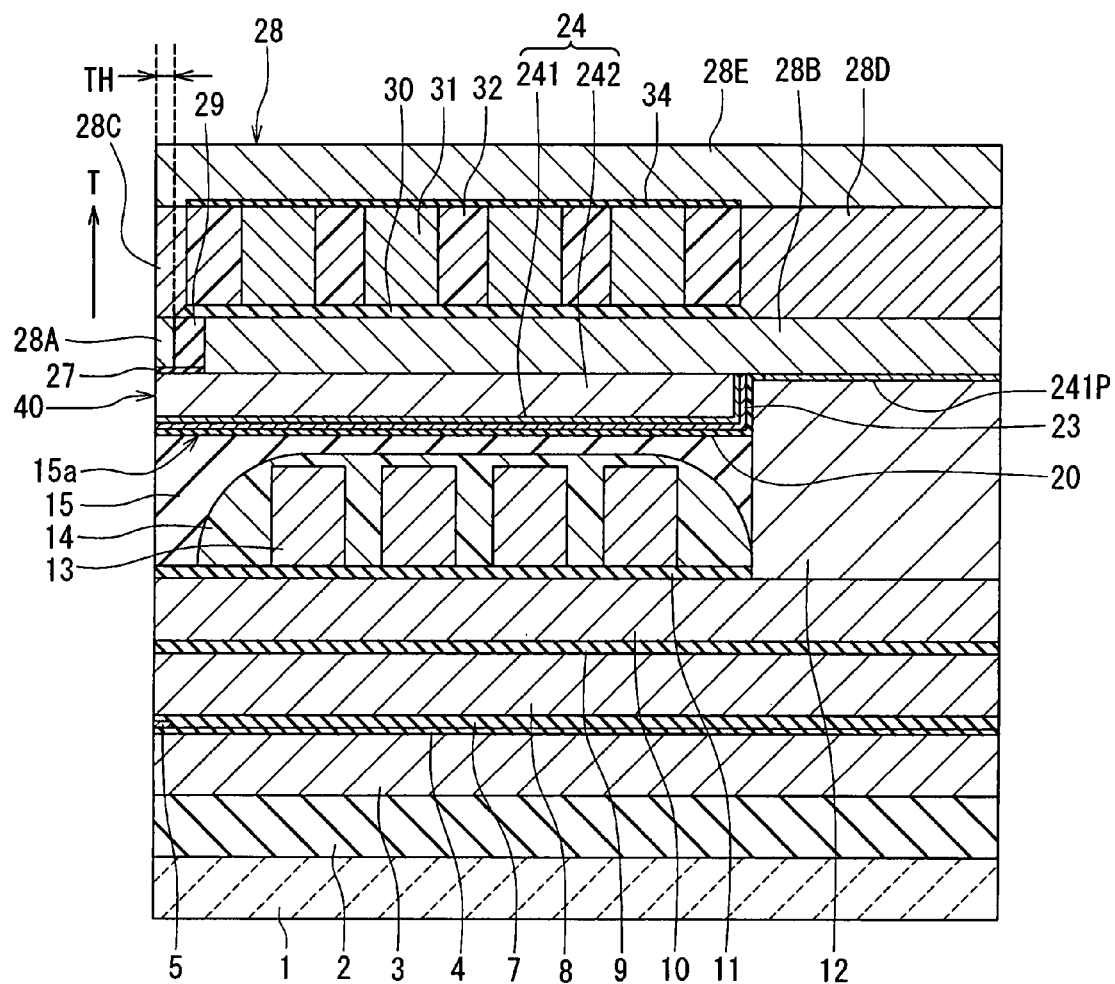
FIG. 3 is a cross-sectional view for illustrating the configuration of the magnetic head of the first embodiment of the invention.

Preferred embodiments of the invention will now be described in detail with reference to the accompanying drawings. Reference is now made to FIG. 2 and FIG. 3 to describe the configuration of a magnetic head manufactured through the use of a manufacturing method and a magnetic head substructure of a first embodiment of the invention. Here, a magnetic head for the perpendicular magnetic recording system will be described as an example of the magnetic head. FIG. 2 is a front view for illustrating the medium facing surface of the magnetic head. FIG. 3 is a cross-sectional view for illustrating the configuration of the magnetic head. FIG. 3 illustrates a cross section orthogonal to the medium facing surface and a surface of a substrate. The arrow indicated with T in FIG. 3 shows the direction of travel of a recording medium.

As shown in FIG. 2, the magnetic head of the embodiment has a medium facing surface 40 that faces toward a recording medium. As shown in FIG. 2 and FIG. 3, the magnetic head incorporates: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 disposed on the bottom shield gap film 4; and a top shield gap film 7 that is an insulating film disposed on the MR element 5.

The MR element 5 reads data stored on the recording medium. The MR element 5 has an end face that is located in the medium facing surface 40. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. The MR element 5 corresponds to the read element of the invention.

The magnetic head further incorporates a first top shield layer 8, a nonmagnetic layer 9 and a second top shield layer 10 that are disposed in this order on the top shield gap film 7. The first top shield layer 8 and the second top shield layer 10 are made of a magnetic material. The nonmagnetic layer 9 is made of a nonmagnetic material such as alumina. The portions from the bottom shield layer 3 to the second top shield layer 10 make up the read head.

The magnetic head further incorporates an insulating layer 11 and a coupling layer 12 that are disposed on the second top shield layer 10. The insulating layer 11 is made of an insulating material such as alumina. The insulating layer 11 has an opening formed in a region away from the medium facing surface 40. The coupling layer 12 is disposed on a region of the second top shield layer 10 where the opening of the insulating layer 11 is formed. The coupling layer 12 is made of a magnetic material.

The magnetic head further incorporates: a coil 13 disposed on the insulating layer 11; and an insulating layer 14 made of an insulating material and disposed around the coil 13 and in the space between respective adjacent ones of the turns of the coil 13. The coil 13 is flat-whorl-shaped and made of a conductive material such as copper. The insulating layer 14 is made of photoresist, for example.

The magnetic head further incorporates an encasing layer 15 made of a nonmagnetic material and disposed to cover the insulating layer 14. The encasing layer 15 has a groove 15a that opens in the top surface thereof and that accommodates a pole layer described later. The encasing layer 15 may be made of any of alumina, silicon oxide ($SiO_x$), and silicon oxynitride (SiON), for example.

The magnetic head further comprises a nonmagnetic conductive layer 17 made of a nonmagnetic conductive material and disposed on the top surface of the encasing layer 15. The nonmagnetic conductive layer 17 has an opening 17a that penetrates, and the edge of the opening 17a is located directly above the edge of the groove 15a in the top surface of the encasing layer 15. The nonmagnetic conductive layer 17 may be made of any of Ta, Mo, W, Ti, Ru, Rh, Re, Pt, Pd, Ir, NiCr, NiP, NiB, $WSi_2$, $TaSi_2$, $TiSi_2$, TiN, and TiW, for example.

The magnetic head further incorporates a nonmagnetic film 20, a polishing stopper layer 23 and the pole layer 24 that are disposed in the groove 15a. The nonmagnetic film 20 is disposed to touch the surface of the groove 15a. The pole layer 24 is disposed apart from the surface of the groove 15a. The polishing stopper layer 23 is disposed between the nonmagnetic film 20 and the pole layer 24. The pole layer 24 incorporates: a first layer 241 located closer to the surface of the groove 15a; and a second layer 242 located farther from the surface of the groove 15a.

The magnetic head further incorporates a coating layer 26 disposed on the encasing layer 15 around the nonmagnetic conductive layer 17. The coating layer 26, the nonmagnetic conductive layer 17, the nonmagnetic film 20, the polishing stopper layer 23, and the pole layer 24 have flattened top surfaces.

The nonmagnetic film 20 may be made of an insulating material or a semiconductor material, for example. The insulating material as the material of the nonmagnetic film 20 may be any of alumina, silicon oxide ($SiO_x$), and silicon oxynitride (SiON), for example. The semiconductor material as the material of the nonmagnetic film 20 may be polycrystalline silicon or amorphous silicon, for example.

The polishing stopper layer 23 is made of a nonmagnetic conductive material. The material of the polishing stopper layer 23 may be the same as that of the nonmagnetic conductive layer 17.

Each of the first layer 241 and the second layer 242 is made of a magnetic material. The first layer 241 may be made of any of CoFeN, CoNiFe and NiFe, for example. The second layer 242 may be made of any of NiFe, CoNiFe and CoFe, for example.

The magnetic head further incorporates a gap layer 27 disposed on the top surfaces of the nonmagnetic conductive layer 17 and the pole layer 24. The gap layer 27 has an opening located at a distance from the medium facing surface 40. The gap layer 27 may be made of an insulating material such as alumina or a nonmagnetic metal material such as Ru, NiCu, Ta, W or NiB.

The magnetic head further incorporates a shield layer 28. The shield layer 28 has: a first layer 28A disposed on the gap layer 27; a second layer 28C disposed on the first layer 28A; a yoke layer 28B disposed on a portion of the pole layer 24 where the opening of the gap layer 27 is formed; a coupling layer 28D disposed on the yoke layer 28B; and a third layer 28E disposed to couple the second layer 28C to the coupling layer 28D. The first layer 28A, the yoke layer 28B, the second layer 28C, the coupling layer 28D and the third layer 28E are each made of a magnetic material. These layers 28A to 28E may be made of any of CoFeN, CoNiFe and NiFe, for example.

The magnetic head further incorporates a nonmagnetic layer 29 made of a nonmagnetic material and disposed around the yoke layer 28B. A portion of the nonmagnetic layer 29 is disposed on a side of the first layer 28A. The nonmagnetic layer 29 is made of an inorganic insulating material such as alumina or coating glass. Alternatively, the nonmagnetic layer 29 may be made up of a layer of a nonmagnetic metal material and a layer of an insulating material disposed thereon. In this case, the nonmagnetic metal material may be a refractory metal such as Ta, Mo, Nb, W, Cr, Ru, NiCu, Pd or Hf.

The magnetic head further incorporates: an insulating layer 30 disposed on regions of the top surfaces of the yoke layer 28B and the nonmagnetic layer 29 in which a coil described later is disposed; the coil 31 disposed on the insulating layer 30; an insulating layer 32 disposed around the coil 31 and in the space between respective adjacent ones of the turns of the coil 31; and an insulating layer 34 disposed on the coil 31 and the insulating layer 32. The coil 31 is flat-whorl-shaped. A portion of the coil 31 passes between the second layer 28C and the coupling layer 28D. The coil 31 is made of a conductive material such as copper. The second layer 28C, the coupling layer 28D, the coil 31 and the insulating layer 32 have flattened top surfaces. The insulating layer 32 is made of photoresist, for example. The insulating layers 30 and 34 are made of alumina, for example.

The portions from the coil 13 to the third layer 28E of the shield layer 28 make up the write head. Although not shown, the magnetic head further incorporates a protection layer formed to cover the shield layer 28.

As described so far, the magnetic head of the embodiment incorporates the medium facing surface 40 that faces toward a recording medium, the read head, and the write head. The read head and the write head are stacked on the substrate 1. The read head is disposed backward in the direction T of travel of the recording medium (that is, located closer to an air-inflow end of the slider). The write head is disposed forward in the direction T of travel of the recording medium (that is, located closer to an air-outflow end of the slider).

The read head incorporates the MR element 5 as the read element, and the bottom shield layer 3 and the first top shield layer 8 for shielding the MR element 5. Portions of the bottom shield layer 3 and the first top shield layer 8 that are located on a side of the medium facing surface 40 are opposed to each other, the MR element 5 being placed between these portions. The read head further incorporates: the bottom shield gap film 4 disposed between the MR element 5 and the bottom shield layer 3; the top shield gap film 7 disposed between the MR element 5 and the first top shield layer 8; the second top shield layer 10 for shielding the read head and the write head from each other; and the nonmagnetic layer 9 disposed between the first top shield layer 8 and the second shield layer 10.

The write head incorporates the coil 13, the encasing layer 15, the nonmagnetic conductive layer 17, the nonmagnetic film 20, the polishing stopper layer 23, the pole layer 24, the gap layer 27, the shield layer 28, and the coil 31. The coils 13 and 31 generate a magnetic field corresponding to data to be written on the recording medium. In FIG. 3 the second top shield layer 10 is magnetically coupled to the shield layer 28 through the coupling layer 12 and a magnetic layer 241P that will be described later. Alternatively, the second top shield layer 10 and the shield layer 28 may be magnetically separated from each other without providing the coupling layer 12. The coil 13 is not a component requisite for the write head and may be omitted.

The pole layer 24 has an end face located in the medium facing surface 40. The pole layer 24 allows the magnetic flux corresponding to the magnetic field generated by the coil 31 to pass therethrough and generates a write magnetic field for writing the data on the recording medium by means of the perpendicular magnetic recording system. The coil 31 and the pole layer 24 correspond to the write element of the invention. The MR element 5 as the read element and the coil 31 and the pole layer 24 as the write element are disposed such that the respective distances from the top surface of the substrate 1 are different.

The shield layer 28 has an end located in the medium facing surface 40, and has a portion located away from the medium facing surface 40 and coupled to the pole layer 24. The gap layer 27 is made of a nonmagnetic material and provided between the pole layer 24 and the shield layer 28.

In the medium facing surface 40, the end face of the shield layer 28 is disposed forward of the end face of the pole layer 24 along the direction T of travel of the recording medium with a specific space created by the thickness of the gap layer 27. At least part of the coil 31 is disposed between the pole layer 24 and the shield layer 28 and insulated from the pole layer 24 and the shield layer 28.

The pole layer 24 is disposed in the groove 15a of the encasing layer 15 with the nonmagnetic film 20 and the polishing stopper layer 23 disposed between the pole layer 24 and the groove 15a. The nonmagnetic conductive layer 17 is disposed on the top surface of the encasing layer 15. The nonmagnetic conductive layer 17 has the opening 17a that penetrates, and the edge of the opening 17a is located directly above the edge of the groove 15a in the top surface of the encasing layer 15. The nonmagnetic conductive layer 17 has a thickness within a range of 20 to 60 nm inclusive, for example. The nonmagnetic film 20 has a thickness within a range of 10 to 50 nm inclusive, for example. The polishing stopper layer 23 has a thickness within a range of 40 to 70 nm inclusive, for example.

The pole layer 24 incorporates: the first layer 241 located closer to the surface of the groove 15a; and the second layer 242 located farther from the surface of the groove 15a. The first layer 241 has a thickness within a range of 50 to 70 nm inclusive, for example.

The shield layer 28 has: the first layer 28A disposed adjacent to the gap layer 27; the second layer 28C disposed on a side of the first layer 28A farther from the gap layer 27; the yoke layer 28B disposed on the portion of the pole layer 24 where the opening of the gap layer 27 is formed; the coupling layer 28D disposed on the yoke layer 28B; and the third layer 28E disposed to couple the second layer 28C to the coupling layer 28D. The second layer 28C is disposed between the medium facing surface 40 and the at least part of the coil 31.

The first layer 28A has: a first end located in the medium facing surface 40; and a second end opposite to the first end. The second layer 28C also has: a first end located in the medium facing surface 40; and a second end opposite to the first end. The second end of the first layer 28A defines the throat height TH. That is, as shown in FIG. 3, the throat height TH is the minimum distance between the first end and the second end of the portion of the first layer 28A facing toward the pole layer 24 with the gap layer 27 disposed in between. The throat height TH falls within a range of 0.1 to 0.3 μm inclusive, for example. The minimum distance between the first end and the second end of the portion of the second layer 28C facing toward the pole layer 24 with the gap layer 27 and the first layer 28A disposed in between falls within a range of 0.5 to 0.8 μm inclusive, for example. The first layer 28A and the yoke layer 28B have a thickness within a range of 0.3 to 0.8 μm inclusive, for example. The second layer 28C and the coupling layer 28D have a thickness within a range of 2.0 to 2.5 μm inclusive, for example. The third layer 28E has a thickness within a range of 2.0 to 3.0 μm inclusive, for example. The coil 31 has a thickness that is equal to or smaller than the thickness of the second layer 28C and that is within a range of 2.0 to 2.5 μm inclusive, for example.

Figure 4:
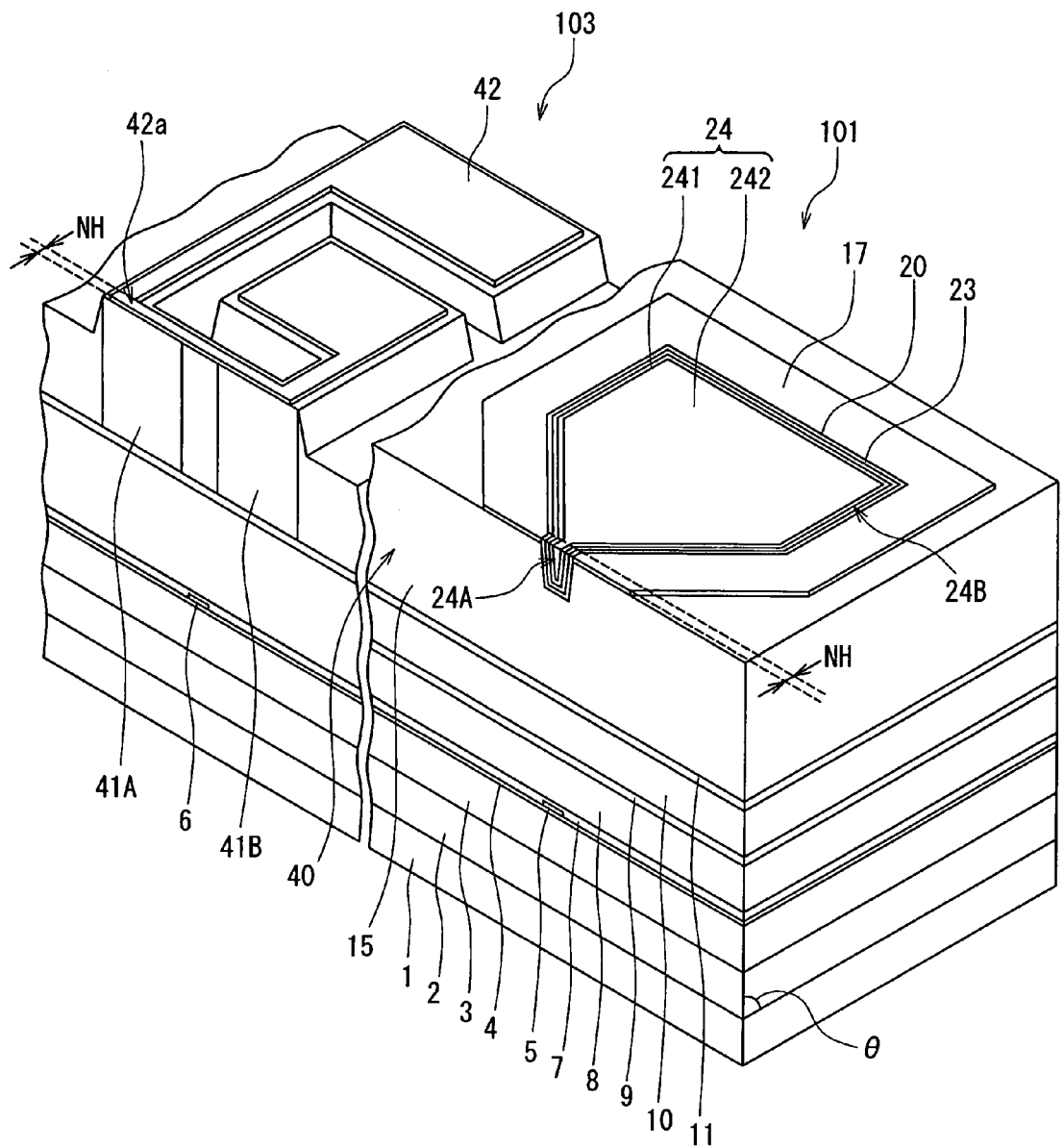
FIG. 4 is a perspective view of the main part of the magnetic head substructure of the first embodiment of the invention.

Reference is now made to FIG. 2 and FIG. 4 to describe the shape of the pole layer 24 in detail. FIG. 4 is a perspective view of the main part of the magnetic head substructure of the first embodiment. The magnetic head substructure is used for manufacturing the magnetic head of the embodiment. The configuration of the substructure will be described in detail later. As shown in FIG. 4, the pole layer 24 incorporates a track width defining portion 24A and a wide portion 24B. The track width defining portion 24A has an end located in the medium facing surface 40 and has a uniform width. The wide portion 24B is coupled to the other end of the track width defining portion 24A and has a width greater than the width of the track width defining portion 24A. For example, the wide portion 24B is equal in width to the track width defining portion 24A at the interface with the track width defining portion 24A, and gradually increases in width as the distance from the medium facing surface 40 increases and then maintains a specific width to the end of the wide portion 24B. Here, the length of the track width defining portion 24A taken in the direction orthogonal to the medium facing surface 40 is called a neck height NH. The neck height NH falls within a range of 0.1 to 0.3 μm inclusive, for example.

As shown in FIG. 2, the end face of the track width defining portion 24A located in the medium facing surface 40 has: a first side A1 close to the substrate 1; a second side A2 opposite to the first side A1; a third side A3 connecting an end of the first side A1 to an end of the second side A2; and a fourth side A4 connecting the other end of the first side A1 to the other end of the second side A2. The second side A2 defines the track width. The width of the end face of the track width defining portion 24A located in the medium facing surface 40 decreases as the distance from the first side A1 decreases.

The length of the second side A2, that is, the track width, falls within a range of 0.08 to 0.12 μm inclusive, for example. The thickness of the pole layer 24 falls within a range of 0.20 to 0.30 μm inclusive, for example. Each of the third side A3 and the fourth side A4 forms an angle that falls within a range of 5 to 12 degrees inclusive, for example, with respect to the direction orthogonal to the top surface of the substrate 1. The thickness of the gap layer 27 falls within a range of 30 to 60 nm inclusive, for example.

The magnetic head of the embodiment writes data on a recording medium by using the write head and reads data written on the recording medium by using the read head. In the write head the coil 31 generates a magnetic field that corresponds to the data to be written on the medium. The pole layer 24 and the shield layer 28 form a magnetic path through which a magnetic flux corresponding to the magnetic field generated by the coil 31 passes. The pole layer 24 allows the flux corresponding to the field generated by the coil 31 to pass and generates a write magnetic field used for writing the data on the medium by means of the perpendicular magnetic recording system. The shield layer 28 takes in a disturbance magnetic field applied from outside the magnetic head to the magnetic head. It is thereby possible to prevent erroneous writing on the recording medium caused by the disturbance magnetic field intensively taken in into the pole layer 24.

According to the embodiment, in the medium facing surface 40, the end face of the shield layer 28 is disposed forward of the end face of the track width defining portion 24A along the direction T of travel of the recording medium (that is, closer to the air-outflow end of the slider) with a specific small space created by the gap layer 27. The position of an end of the bit pattern written on the recording medium is determined by the position of the end of the pole layer 24 that is closer to the gap layer 27 and located in the medium facing surface 40. The shield layer 28 takes in a magnetic flux generated from the end face of the pole layer 24 located in the medium facing surface 40 and extending in directions except the direction orthogonal to the surface of the recording medium so as to prevent the flux from reaching the recording medium. It is thereby possible to prevent the direction of magnetization of the bit pattern already written on the medium from being changed due to the effect of the above-mentioned flux. According to the embodiment, an improvement in linear recording density is thus achieved.

According to the embodiment, as shown in FIG. 2, the width of the end face of the track width defining portion 24A located in the medium facing surface 40 decreases as the distance from the first side A1 decreases. It is thereby possible to prevent the problems resulting from a skew.

Figure 1:
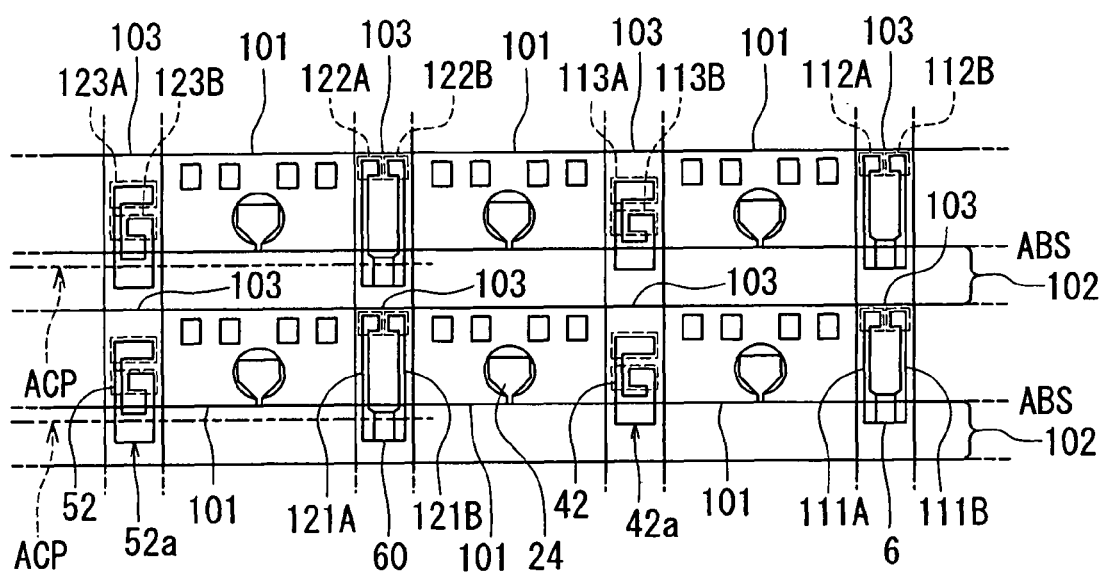
FIG. 1 illustrates the arrangement of main components of a magnetic head substructure of a first embodiment of the invention.

A method of manufacturing the magnetic head of the embodiment and the magnetic head substructure of the embodiment will now be described. FIG. 1 illustrates the arrangement of main components of the magnetic head substructure of the embodiment. The substructure includes a plurality of pre-head portions 101 aligned in a plurality of rows. Each of the pre-head portions 101 is to be the magnetic head later. In FIG. 1 'ABS' indicates an imaginary plane located at a target position of the medium facing surfaces 40. In the embodiment a group of pre-head portions 101 arranged in the direction parallel to the plane ABS, that is, in the horizontal direction of FIG. 1, is called a row of the pre-head portions 101.

The magnetic head substructure further includes: inter-row portions to be removed 102 each of which is located between adjacent two rows; and intra-row portions to be removed 103 each of which is located between two of the pre-head portions 101 adjacent to each other in each row. Neither the portions 102 nor the portions 103 will remain in the magnetic heads.

The method of manufacturing the magnetic head of the embodiment includes the steps of: fabricating the magnetic head substructure in which the pre-head portions 101 are aligned in a plurality of rows by forming components of a plurality of magnetic heads on a single substrate; and fabricating the plurality of magnetic heads by separating the pre-head portions 101 from one another through cutting the magnetic head substructure. Reference is now made to FIG. 5 to FIG. 40 to describe the step of fabricating the substructure in detail.

Figure 5:
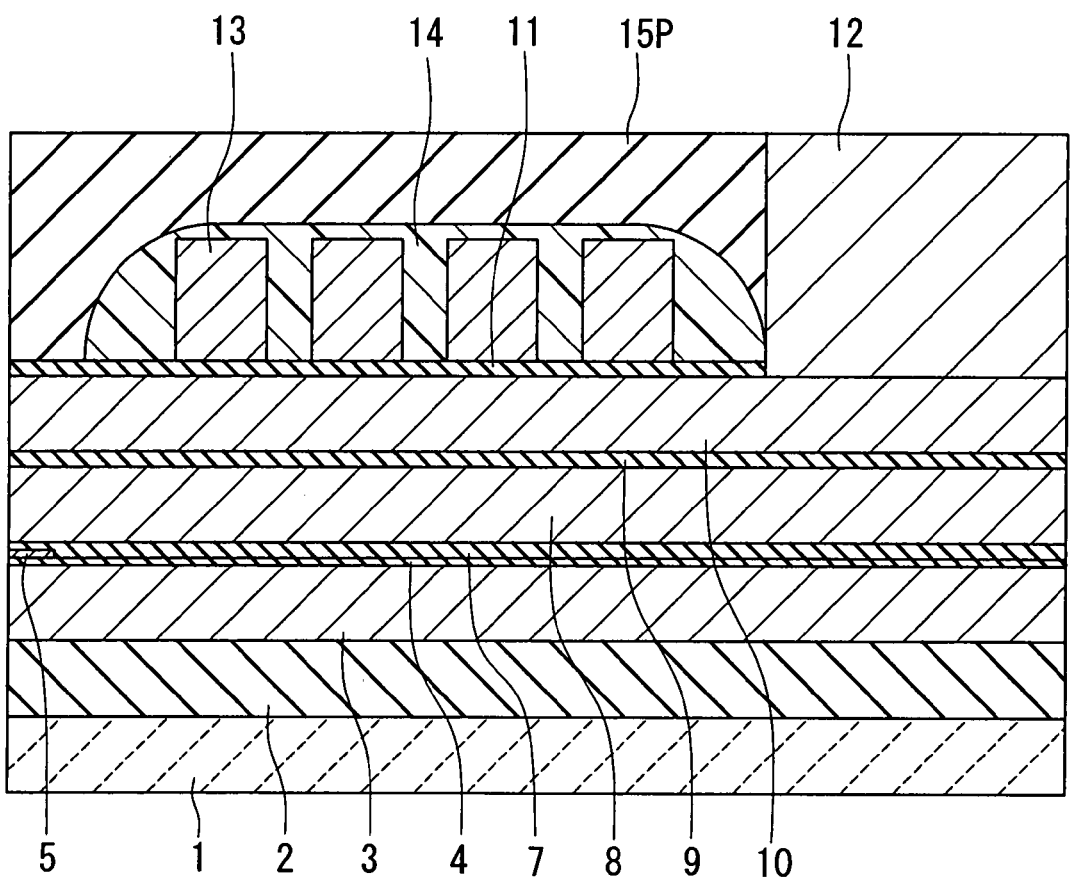
FIG. 5 is a cross-sectional view of a layered structure obtained in the course of a process of fabricating the magnetic head substructure of the first embodiment of the invention.
Figure 6:
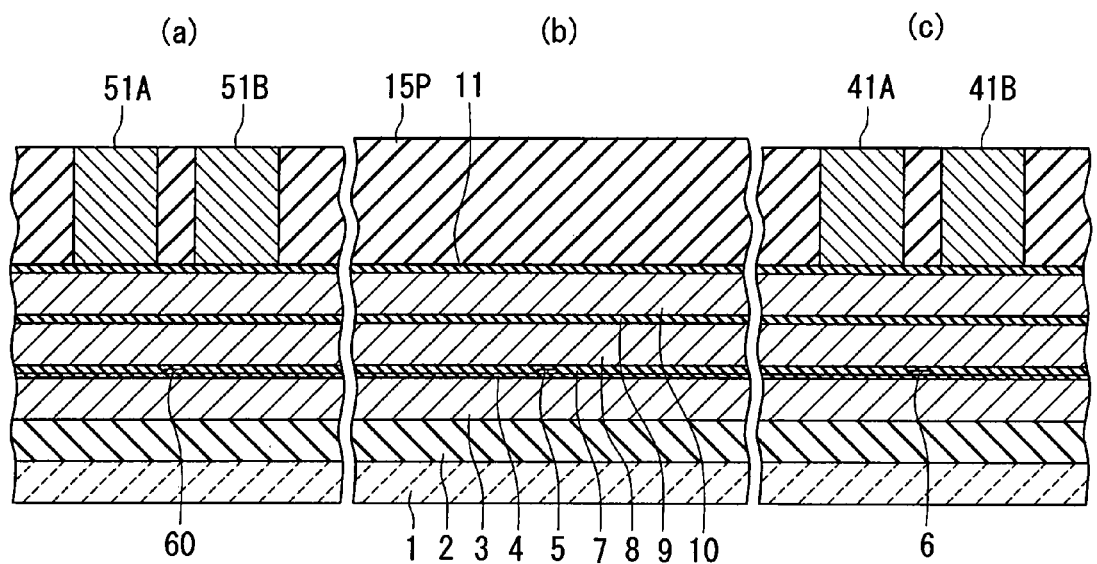
FIG. 6 is another cross-sectional view of the layered structure shown in FIG. 5.
Figure 7:
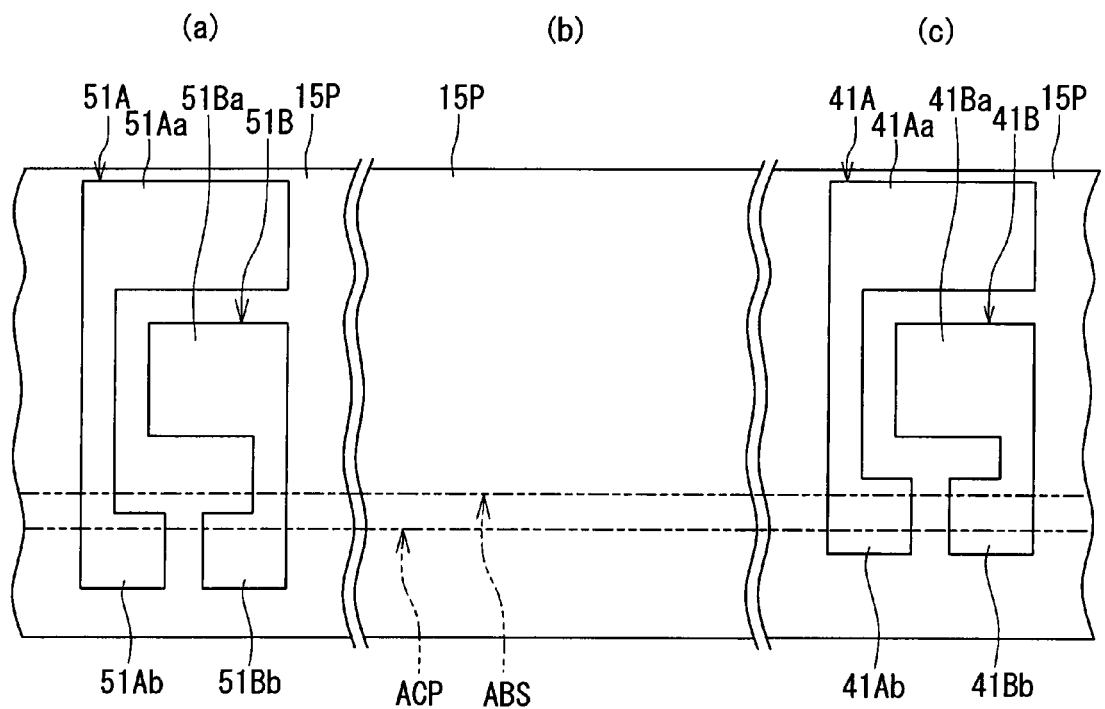
FIG. 7 is a top view of the layered structure shown in FIG. 5.

FIG. 5 to FIG. 7 illustrate a step of the process of fabricating the magnetic head substructure. FIG. 5 shows a cross section of a layered structure obtained in the course of the process of fabricating the substructure, wherein the cross section is orthogonal to the medium facing surface and the top surface of the substrate. FIG. 6 shows a cross section of the layered structure parallel to the medium facing surface. FIG. 7 shows the top surface of the layered structure. FIG. 6(a) and FIG. 7(a) each illustrate regions in which third and fourth resistor elements described later are formed. FIG. 6(b) and FIG. 7(b) each illustrate the pre-head portion. FIG. 6(c) and FIG. 7(c) each illustrate a region in which first and second resistor elements described later are formed. In FIG. 7 'ABS' indicates an imaginary plane located at a target position of the medium facing surfaces, and 'ACP' indicates an imaginary plane located in the inter-row portions to be removed 102 and parallel to the plane ABS. FIG. 6(a) shows a cross section taken at the plane ACP. FIG. 6(b) and FIG. 6(c) each show a cross section taken at the plane ABS.

According to the method of manufacturing the magnetic head of the embodiment, as shown in FIG. 5 and FIG. 6, the insulating layer 2, the bottom shield layer 3 and the bottom shield gap film 4 are first formed in this order on the substrate 1. Next, the MR element 5, the first resistor element 6 and the third resistor element 60 are formed on the bottom shield gap film 4. The MR element 5 is disposed to extend across the pre-head portion 101 and a portion of the inter-row portion to be removed 102 that are adjacent to each other with the plane ABS disposed in between. As shown in FIG. 1, the first resistor element 6 is disposed to extend across the intra-row portion to be removed 103 and a portion of the inter-row portion to be removed 102 that are adjacent to each other with the plane ABS disposed in between. The third resistor element 60 is disposed in a portion of the inter-row portion to be removed 102 adjacent to the intra-row portion to be removed 103. The first resistor elements 6 and the third resistor elements 60 are disposed alternately when seen in the direction of the row. The first resistor elements 6 and the third resistor elements 60 are such elements that portions thereof are exposed at a lapped surface described later when the lapped surface is formed, and that the resistances thereof change with changes in position of the lapped surface along the direction orthogonal to the medium facing surface 40. The first resistor element 6 corresponds to the first detection element of the invention. The third resistor element 60 corresponds to the third detection element of the invention.

It suffices that the resistor elements 6 and 60 are made of a conductive material having a sufficiently high resistivity. The material of the resistor elements 6 and 60 may be the same as that of the MR element 5. Next, although not shown, two leads connected to the MR element 5, two leads connected to the first resistor element 6, and two leads connected to the second resistor element 60 are formed. Next, the top shield gap film 7 is formed to cover the MR element 5, the resistor elements 6 and 60, and the leads. Next, the first top shield layer 8, the nonmagnetic layer 9, the second top shield layer 10 and the insulating layer 11 are formed in this order on the top shield gap film 7. Next, a portion of the insulating layer 11 where the coupling layer 12 is to be formed is selectively etched to form an opening in the insulating layer 11. If the coupling layer 12 is not to be provided, it is not necessary to form the opening in the insulating layer 11.

Next, in the pre-head portion 101, the coil 13 is formed by frame plating, for example, on the insulating layer 11. Next, the insulating layer 14 is formed to cover the coil 13. Next, the coupling layer 12 is formed by frame plating, for example, on the second top shield layer 10 in the region in which the opening of the insulating layer 11 is formed.

Furthermore, in the intra-row portion to be removed 103 and the adjacent portion of the inter-row portion to be removed 102 where the first resistor element 6 is located, electrode layers 41A and 41B are formed by frame plating, for example, on the insulating layer 11. In addition, in the portion of the inter-row portion to be removed 102 where the third resistor element 60 is located and the intra-row portion to be removed 103 adjacent thereto, electrode layers 51A and 51B are formed by frame plating, for example, on the insulating layer 11. The electrode layers 41A, 41B, 51A and 51B are made of a conductive material. The electrode layers 41A, 41B, 51A and 51B may be made of a material the same as that of the coupling layer 12, and the coupling layer 12 and the electrode layers 41A, 41B, 51A and 51B may be formed at the same time. Alternatively, the coil 13 and the insulating layer 14 may be formed after the coupling layer 12 and the electrode layers 41A, 41B, 51A and 51B are formed.

Next, a nonmagnetic layer 15P having a thickness of 3 to 4 µm, for example, is formed on the entire top surface of the layered structure. Next, the nonmagnetic layer 15P is polished by chemical mechanical polishing (hereinafter referred to as CMP), for example, so that the coupling layer 12 and the electrode layers 41A, 41B, 51A and 51B are exposed. The nonmagnetic layer 15P is a layer that will be the encasing layer 15 later by forming the groove 15a therein. Next, in the intra-row portion to be removed 103 and the adjacent portion of the inter-row portion to be removed 102, the top surface of the layered structure is etched by an amount equal to the thickness of an insulating layer 22 that will be formed later.

As shown in FIG. 7, the electrode layer 41A incorporates: a wide portion 41Aa located in a region away from the plane ABS; and an arm portion 41Ab extending from the wide portion 41Aa to the plane ABS. Similarly, the electrode layer 41B incorporates: a wide portion 41Ba located in a region away from the plane ABS; and an arm portion 41Bb extending from the wide portion 41Ba to the plane ABS. Ends of the arm portions 41Ab and 41Bb farther from the wide portions 41Aa and 41Ba are located in a region including the plane ABS such that these ends are opposed to each other at a specific distance from each other.

Furthermore, the electrode layer 51A incorporates: a wide portion 51Aa located in a region away from the plane ACP; and an arm portion 51Ab extending from the wide portion 51Aa to the plane ACP. Similarly, the electrode layer 51B incorporates: a wide portion 51Ba located in a region away from the plane ACP; and an arm portion 51Bb extending from the wide portion 51Ba to the plane ACP. Ends of the arm portions 51Ab and 51Bb farther from the wide portions 51Aa and 51Ba are located in a region including the plane ACP such that these ends are opposed to each other at a specific distance from each other.

Figure 8:
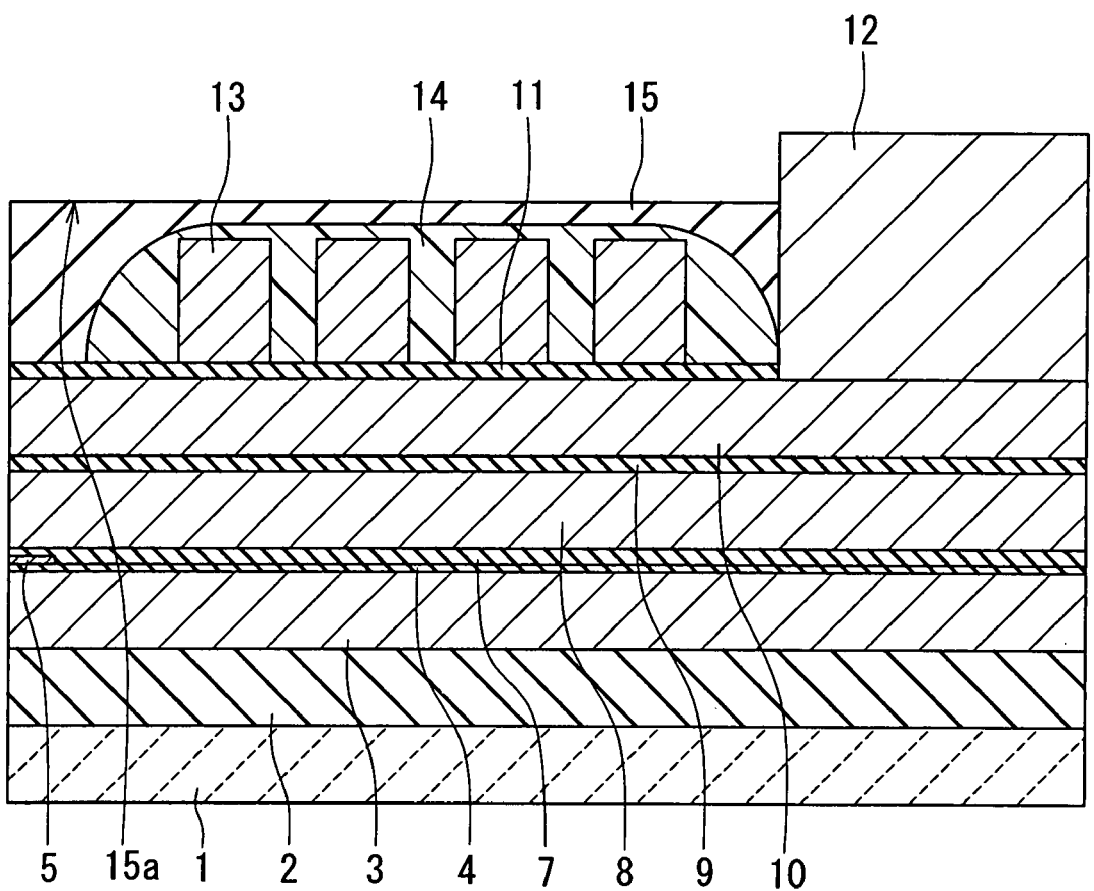
FIG. 8 is a cross-sectional view of the layered structure obtained in a step that follows the step shown in FIG. 5.
Figure 9:
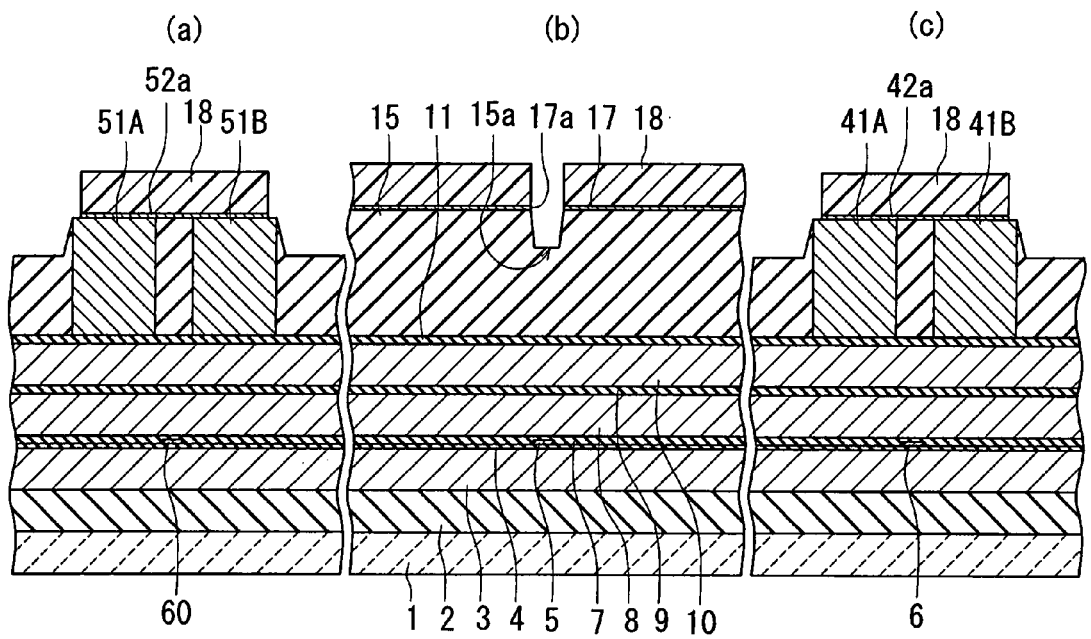
FIG. 9 is another cross-sectional view of the layered structure shown in FIG. 8.
Figure 10:
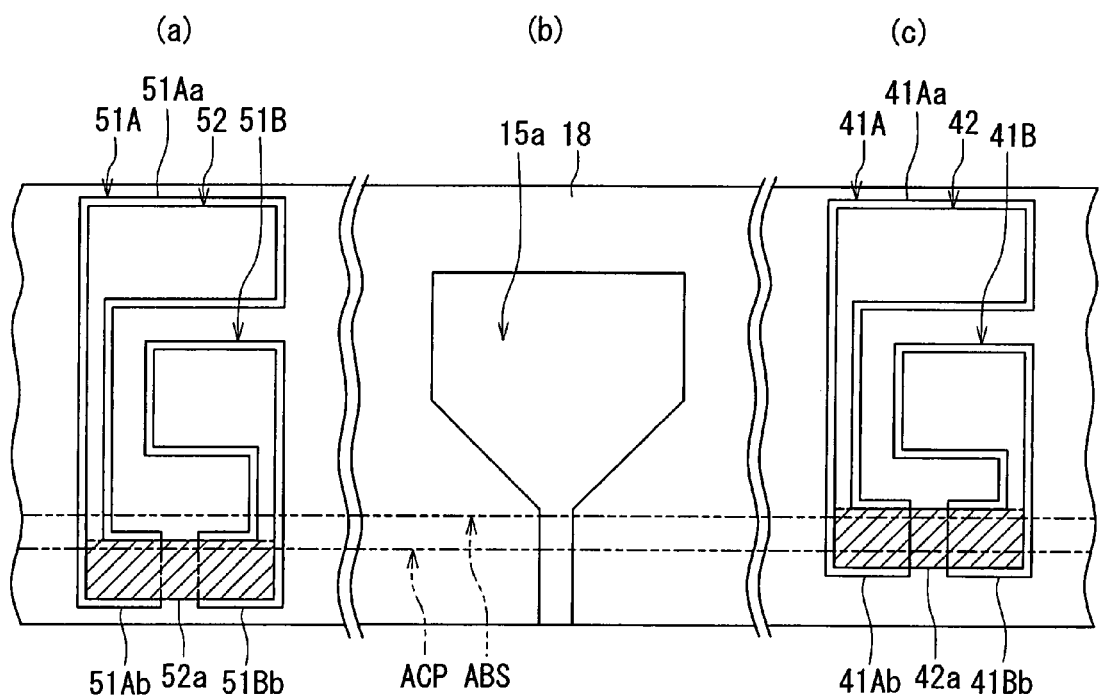
FIG. 10 is a top view of the layered structure shown in FIG. 8.

FIG. 8 to FIG. 10 illustrate the following step. FIG. 8 shows a cross section of the layered structure orthogonal to the medium facing surface and the top surface of the substrate. FIG. 9 shows a cross section of the layered structure parallel to the medium facing surface. FIG. 10 shows the top surface of the layered structure. FIG. 9(a), FIG. 9(b), FIG. 9(c), FIG. 10(a), FIG. 10(b) and FIG. 10(c) illustrate the regions the same as those of FIG. 6(a), FIG. 6(b), FIG. 6(c), FIG. 7(a), FIG. 7(b) and FIG. 7(c), respectively.

In the step, first, a nonmagnetic conductive layer 17 is formed by sputtering, for example, on the nonmagnetic layer 15P. Next, a photoresist layer having a thickness of 1.0 μm, for example, is formed on the nonmagnetic conductive layer 17. The photoresist layer is then patterned to form a mask 18 for making the groove 15a and resistor layers 42 and 52 described later. In the pre-head portion 101 and an adjacent portion of the inter-row portion to be removed 102, the mask 18 has an opening having a shape corresponding to the groove 15a. In the intra-row portion to be removed 103 and an adjacent portion of the inter-row portion to be removed 102, the mask 18 is located only in the region in which the resistor layers 42 and 52 are to be located.

Next, the nonmagnetic conductive layer 17 is selectively etched, using the mask 18. The opening 17a that penetrates is thereby formed in the nonmagnetic conductive layer 17 in the pre-head portion 101 and the adjacent portion of the inter-row portion to be removed 102. The opening 17a has a shape corresponding to the plane geometry of a magnetic layer 240 that will be formed later. A portion of the magnetic layer 240 will be formed into the pole layer 24. Through the selective etching of the nonmagnetic conductive layer 17, the remaining portion of the nonmagnetic conductive layer 17 is formed into the resistor layers 42 and 52 in the intra-row portion to be removed 103 and the adjacent portion of the inter-row portion to be removed 102. In FIG. 10(a) and FIG. 10(c), the state without the mask 18 is shown for clarity.

The resistor layer 42 is located in a region including a region on the top surface of the electrode layers 41A and 41B and a region on the nonmagnetic layer 15P between the ends of the arm portions 41Ab and 41Bb. The resistor layer 42 includes a rectangle-shaped portion disposed to extend across the intra-row portion to be removed 103 and the portion of the inter-row portion to be removed 102 that are adjacent to each other with the plane ABS disposed in between. This rectangle-shaped portion is defined as a second resistor element 42a. In FIG. 10 the second resistor element 42a is indicated with hatching for clarity.

The resistor layer 52 is located in a region including a region on the top surface of the electrode layers 51A and 51B and a region on the nonmagnetic layer 15P between the ends of the arm portions 51Ab and 51Bb. The resistor layer 52 includes a rectangle-shaped portion disposed in a region including the plane ACP in the portion of the inter-row portion to be removed 102 adjacent to the intra-row portion to be removed 103. This rectangle-shaped portion is defined as a fourth resistor element 52a. In FIG. 10 the fourth resistor element 52a is indicated with hatching for clarity.

Each of the second resistor element 42a and the fourth resistor element 52a is such an element that a portion thereof is exposed at the lapped surface described later when the lapped surface is formed, and that the resistance thereof changes with changes in the position of the lapped surface along the direction orthogonal to the medium facing surface 40. The second resistor element 42a corresponds to the second detection element of the invention. The fourth resistor element 52a corresponds to the fourth detection element of the invention. In the embodiment the opening 17a of the nonmagnetic conductive layer 17, the second resistor element 42a, and the fourth resistor element 52a are patterned at the same time.

Next, the nonmagnetic layer 15P is selectively etched, using the mask 18. As a result, in the pre-head portion and the adjacent portion of the inter-row portion to be removed 102, a portion of the nonmagnetic layer 15P exposed from the opening 17a of the nonmagnetic conductive layer 17 is etched and the groove 15a is thereby formed in the nonmagnetic layer 15P. In the intra-row portion to be removed 103 and the adjacent portion of the inter-row portion to be removed 102, a groove is formed in a portion of the nonmagnetic layer 15P that is not covered with the mask 18. Next, the mask 18 is removed. The nonmagnetic layer 15P is formed into the encasing layer 15 by forming the groove 15a therein. The edge of the opening 17a of the nonmagnetic conductive layer 17 is located directly above the edge of the groove 15a located in the top surface of the encasing layer 15.

The etching of each of the nonmagnetic conductive layer 17 and the nonmagnetic layer 15P is performed by reactive ion etching or ion beam etching, for example. The etching for forming the groove 15a in the nonmagnetic layer 15P is performed such that the walls of the groove 15a corresponding to both sides of the track width defining portion 24A of the pole layer 24 each form an angle that is within a range of 5 to 12 degrees inclusive, for example, with respect to the direction orthogonal to the top surface of the substrate 1.

Figure 11:
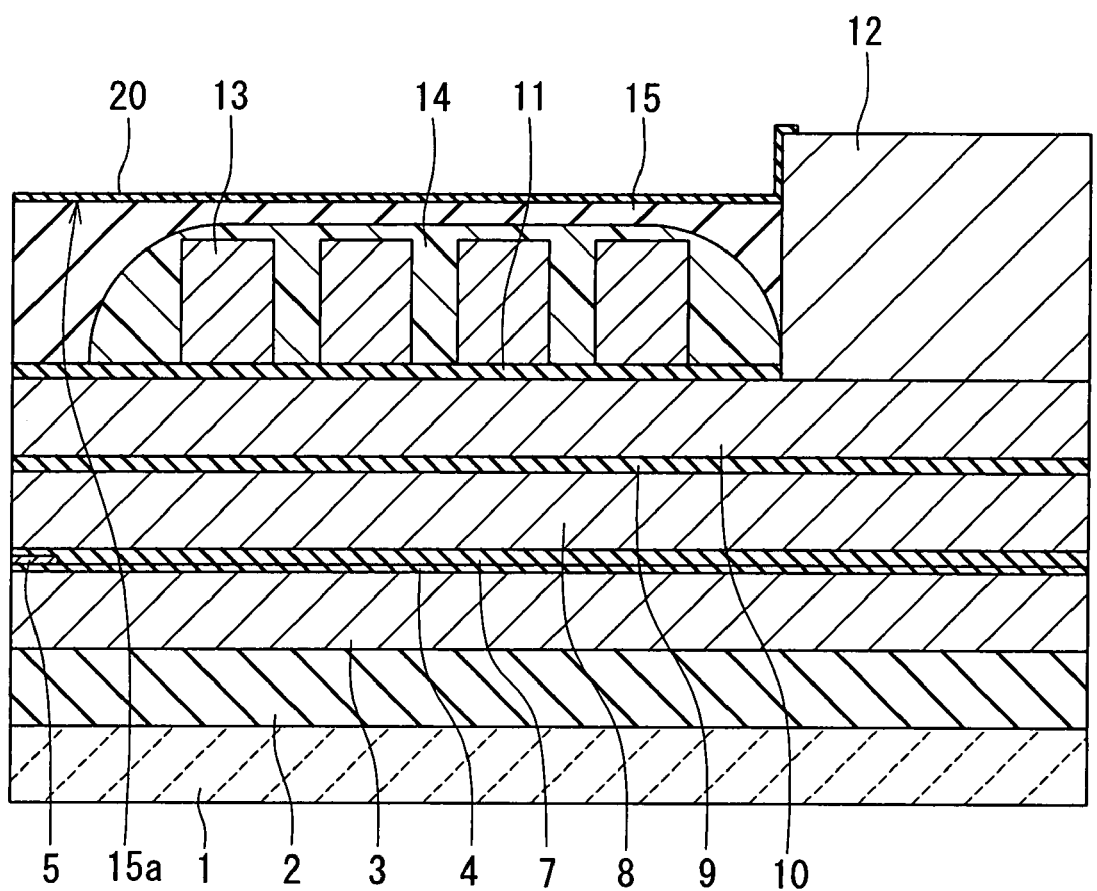
FIG. 11 is a cross-sectional view of the layered structure obtained in a step that follows the step shown in FIG. 8.
Figure 12:
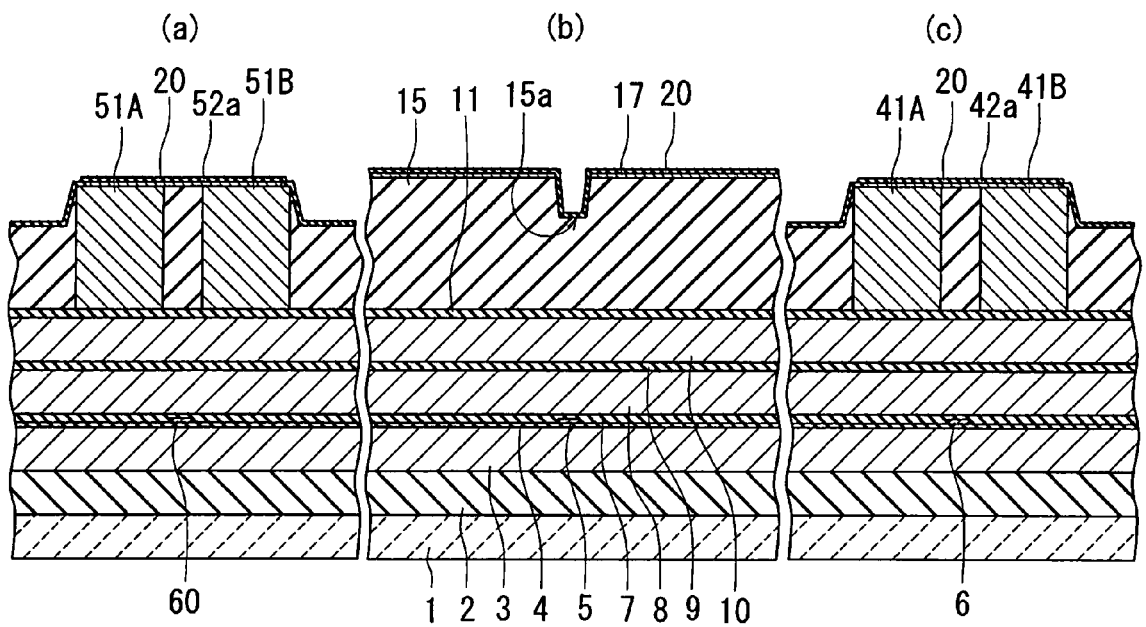
FIG. 12 is another cross-sectional view of the layered structure shown in FIG. 11.
Figure 13:
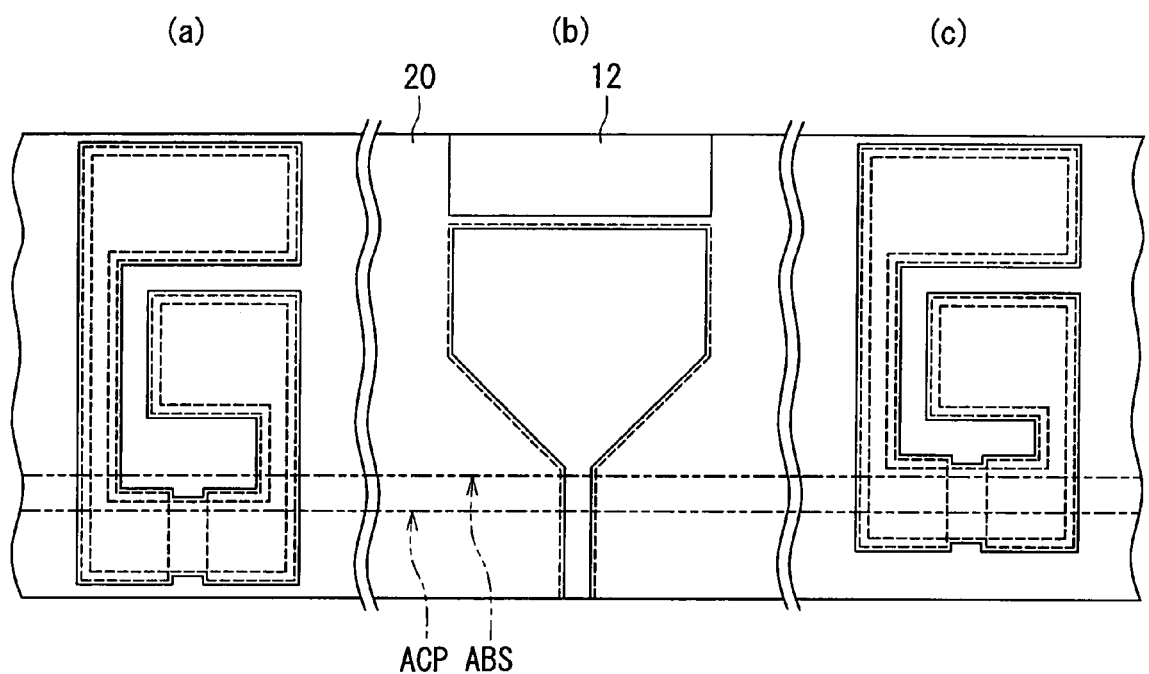
FIG. 13 is a top view of the layered structure shown in FIG. 11.

FIG. 11 to FIG. 13 illustrate the following step. FIG. 11 shows a cross section of the layered structure orthogonal to the medium facing surface and the top surface of the substrate. FIG. 12 shows a cross section of the layered structure parallel to the medium facing surface. FIG. 13 shows the top surface of the layered structure. FIG. 12(a), FIG. 12(b), FIG. 12(c), FIG. 13(a), FIG. 13(b) and FIG. 13(c) illustrate the regions the same as those of FIG. 6(a), FIG. 6(b), FIG. 6(c), FIG. 7(a), FIG. 7(b) and FIG. 7(c), respectively.

In the step, first, the nonmagnetic film 20 is formed on the entire top surface of the layered structure. The nonmagnetic film 20 is formed in the groove 15a of the encasing layer 15, too. The nonmagnetic film 20 may be formed by sputtering or chemical vapor deposition (CVD), for example. It is possible to control the thickness of the nonmagnetic film 20 with precision. In the case of forming the nonmagnetic film 20 by CVD, it is preferred to employ a method called 'atomic layer CVD' (ALCVD) in which formation of a single atomic layer is repeated. In this case, it is possible to control the thickness of the nonmagnetic film 20 with higher precision. In the case of forming the nonmagnetic film 20 by ALCVD, the material of the nonmagnetic film 20 is preferably alumina. In the case of forming the nonmagnetic film 20 using a semiconductor material, it is preferred to form the nonmagnetic film 20 by ALCVD at a low temperature (around 200° C.) or by low-pressure CVD at a low temperature. The semiconductor material as the material of the nonmagnetic film 20 is preferably undoped polycrystalline silicon or amorphous silicon.

Next, a portion of the nonmagnetic film 20 located on the top surface of the coupling layer 12 is selectively etched to from an opening in the nonmagnetic film 20. If the coupling layer 12 is not to be provided, it is not necessary to form the opening in the nonmagnetic film 20.

Figure 14:
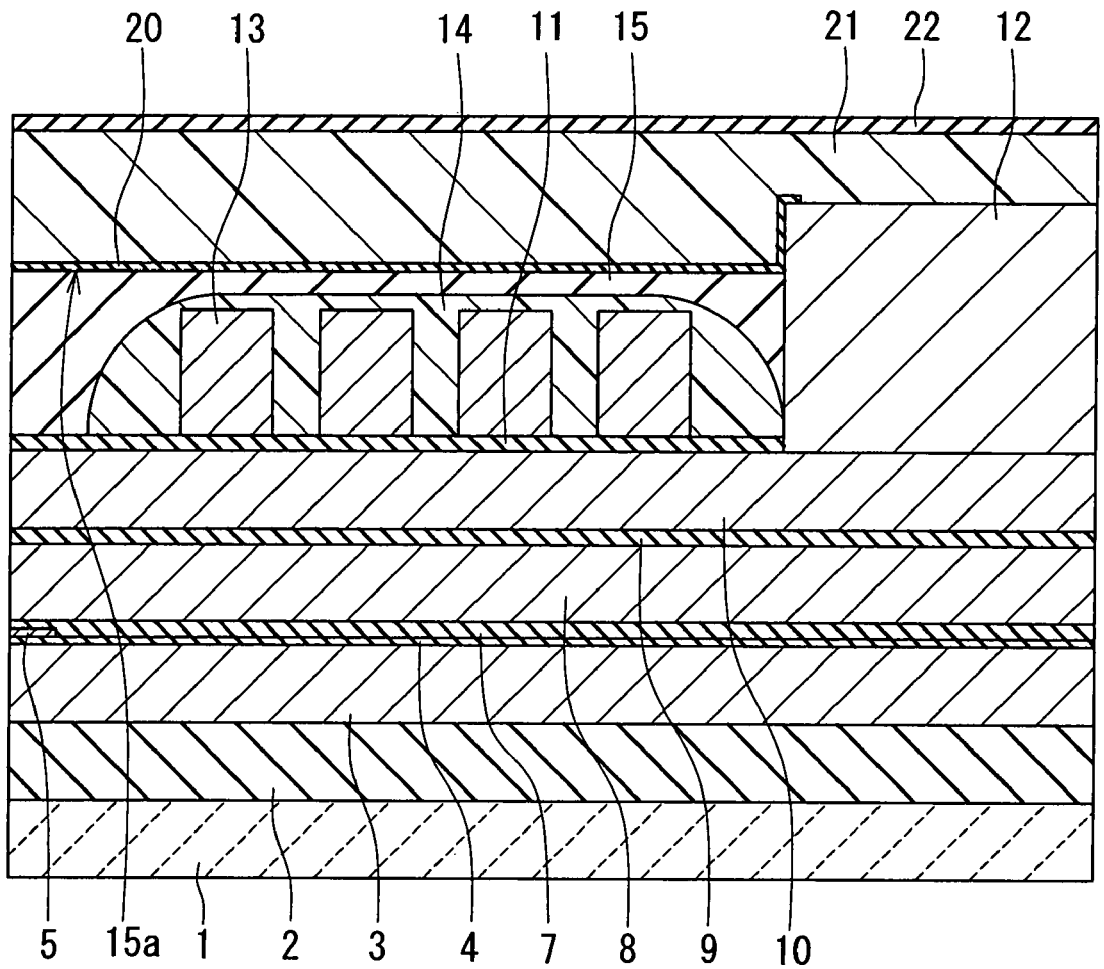
FIG. 14 is a cross-sectional view of the layered structure obtained in a step that follows the step shown in FIG. 11.
Figure 15:
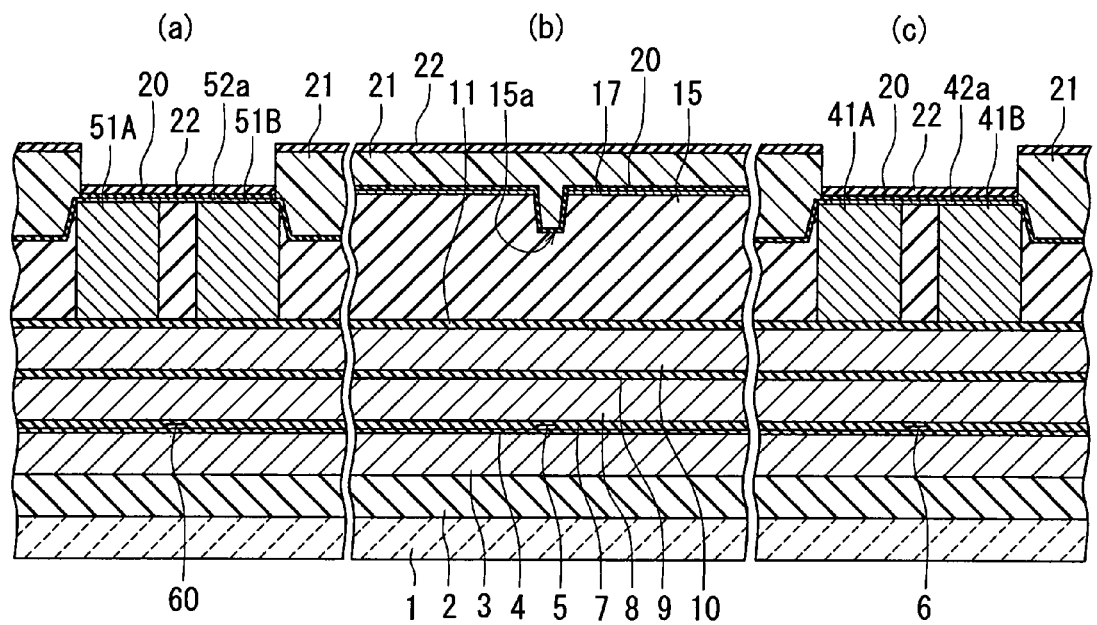
FIG. 15 is another cross-sectional view of the layered structure shown in FIG. 14.
Figure 16:
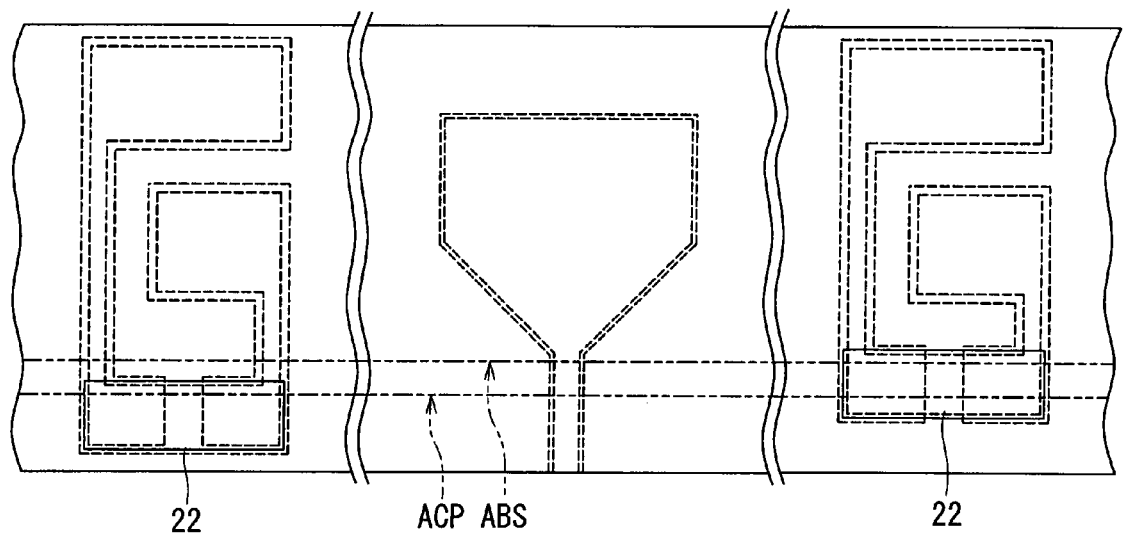
FIG. 16 is a top view of the layered structure shown in FIG. 14.

FIG. 14 to FIG. 16 illustrate the following step. FIG. 14 shows a cross section of the layered structure orthogonal to the medium facing surface and the top surface of the substrate. FIG. 15 shows a cross section of the layered structure parallel to the medium facing surface. FIG. 16 shows the top surface of the layered structure. FIG. 15(a), FIG. 15(b), FIG. 15(c), FIG. 16(a), FIG. 16(b) and FIG. 16(c) illustrate the regions the same as those of FIG. 6(a), FIG. 6(b), FIG. 6(c), FIG. 7(a), FIG. 7(b) and FIG. 7(c), respectively.

In the step, first, a photoresist layer is formed on the entire top surface of the layered structure. Next, the photoresist layer is patterned to form a mask 21. The mask 21 has two openings located above the resistor elements 42a and 52a. Next, the insulating layer 22 made of alumina, for example, and having a thickness of 0.3 µm, for example, is formed by a method such as sputtering on the entire top surface of the layered structure. Next, the mask 21 is lifted off. As a result, the insulating layer 22 is located above the resistor elements 42a and 52a only.

Figure 17:
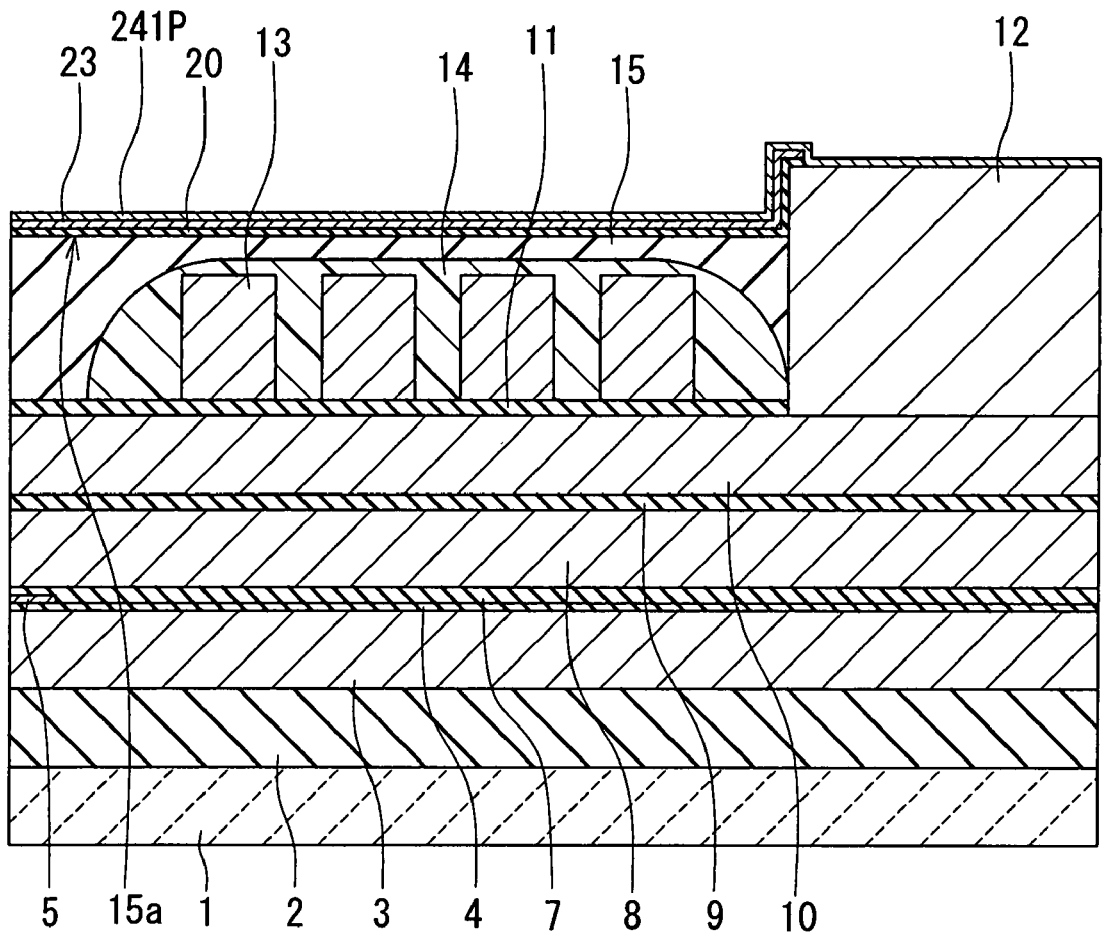
FIG. 17 is a cross-sectional view of the layered structure obtained in a step that follows the step shown in FIG. 14.
Figure 18:
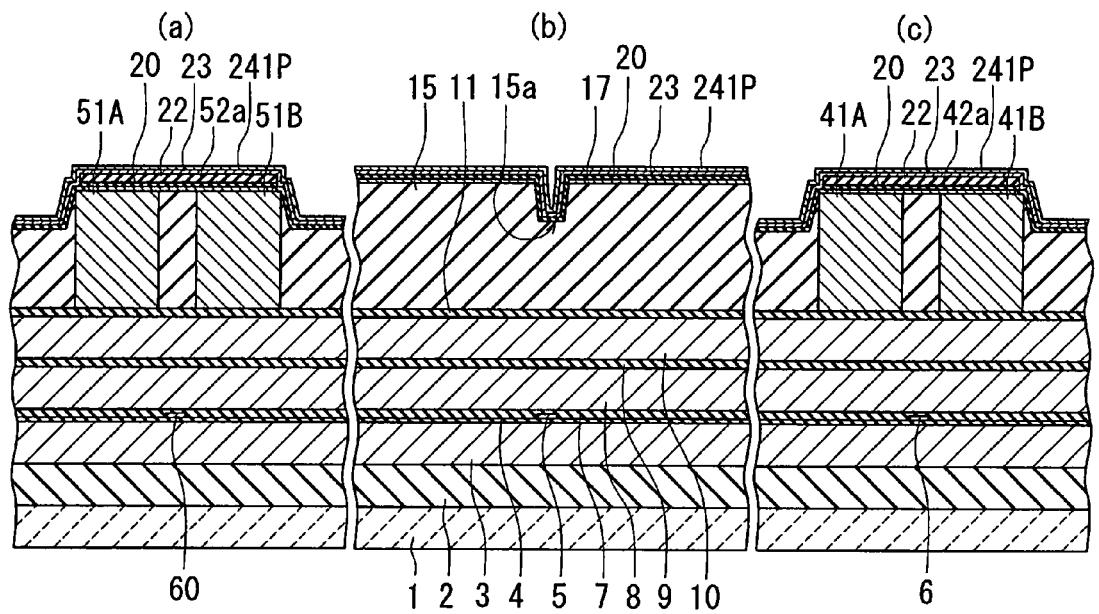
FIG. 18 is another cross-sectional view of the layered structure shown in FIG. 17.
Figure 19:
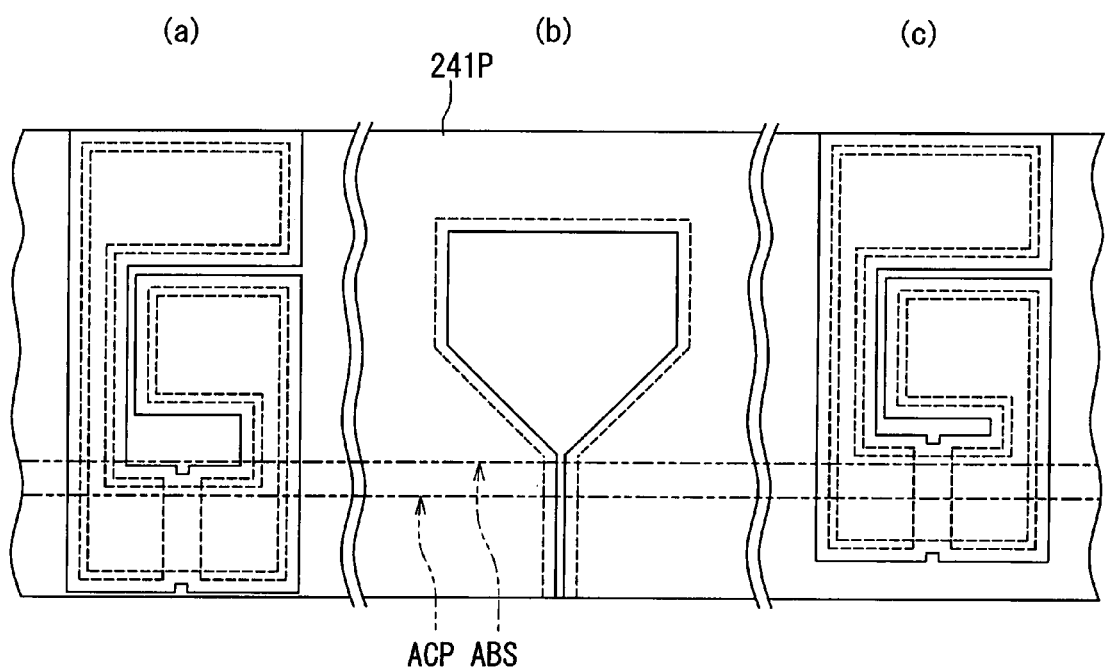
FIG. 19 is a top view of the layered structure shown in FIG. 17.

FIG. 17 to FIG. 19 illustrate the following step. FIG. 17 shows a cross section of the layered structure orthogonal to the medium facing surface and the top surface of the substrate. FIG. 18 shows a cross section of the layered structure parallel to the medium facing surface. FIG. 19 shows the top surface of the layered structure. FIG. 18(a), FIG. 18(b), FIG. 18(c), FIG. 19(a), FIG. 19(b) and FIG. 19(c) illustrate the regions the same as those of FIG. 6(a), FIG. 6(b), FIG. 6(c), FIG. 7(a), FIG. 7(b) and FIG. 7(c), respectively.

In the step, first, the polishing stopper layer 23 is formed by sputtering, for example, on the entire top surface of the layered structure. Next, a portion of the polishing stopper layer 23 located on the top surface of the coupling layer 12 is selectively etched to form an opening in the polishing stopper layer 23. If the coupling layer 12 is not to be provided, it is not necessary to form the opening in the polishing stopper layer 23. Next, the magnetic layer 241P is formed on the polishing stopper layer 23. The magnetic layer 241P will be the first layer 241 of the pole layer 24 later. The magnetic layer 241P is formed by sputtering or ion beam deposition (hereinafter referred to as IBD), for example. In the case of forming the magnetic layer 241P by sputtering, it is preferred to employ collimation sputtering or long throw sputtering.

Figure 20:
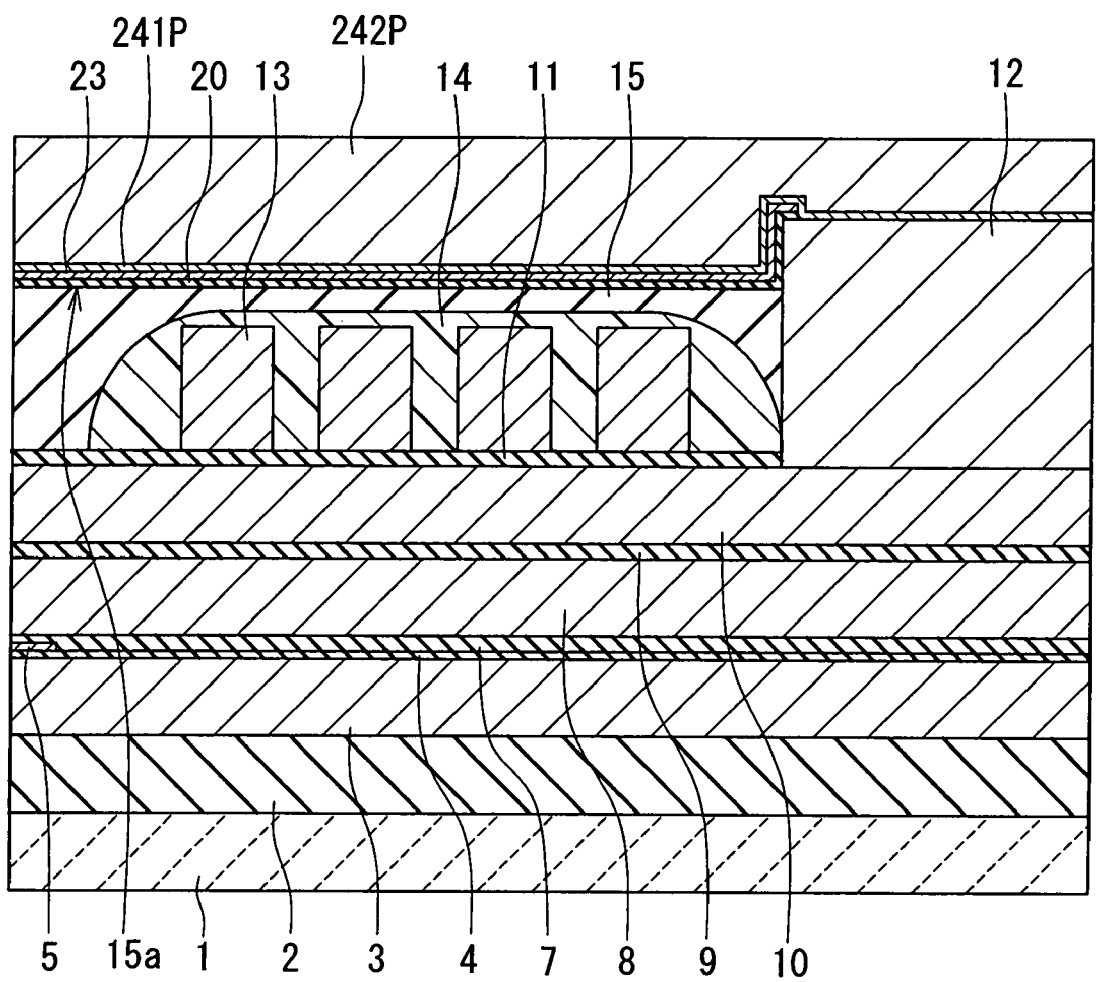
FIG. 20 is a cross-sectional view of the layered structure obtained in a step that follows the step shown in FIG. 17.
Figure 21:
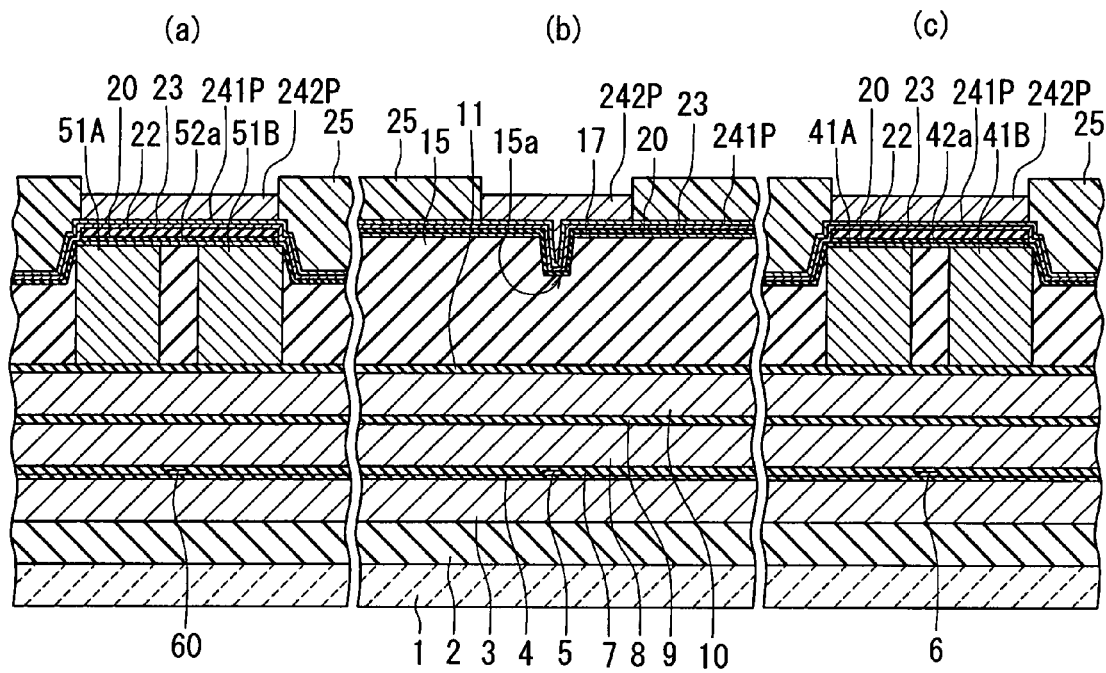
FIG. 21 is another cross-sectional view of the layered structure shown in FIG. 20.
Figure 22:
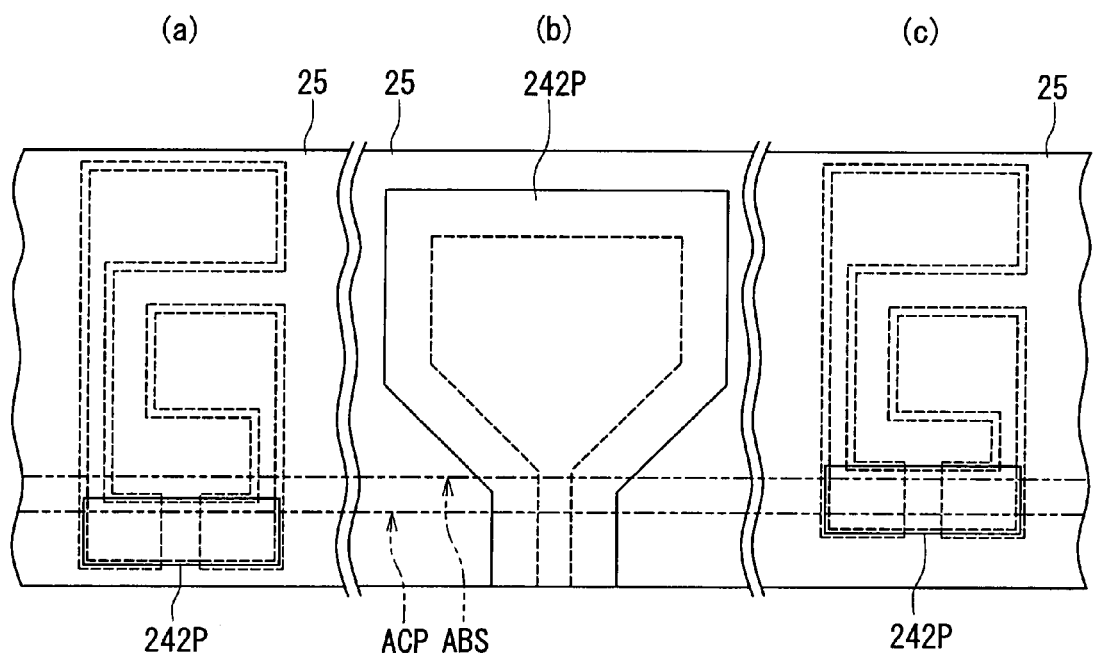
FIG. 22 is a top view of the layered structure shown in FIG. 20.

FIG. 20 to FIG. 22 illustrate the following step. FIG. 20 shows a cross section of the layered structure orthogonal to the medium facing surface and the top surface of the substrate. FIG. 21 shows a cross section of the layered structure parallel to the medium facing surface. FIG. 22 shows the top surface of the layered structure. FIG. 21(a), FIG. 21(b), FIG. 21(c), FIG. 22(a), FIG. 22(b) and FIG. 22(c) illustrate the regions the same as those of FIG. 6(a), FIG. 6(b), FIG. 6(c), FIG. 7(a), FIG. 7(b) and FIG. 7(c), respectively.

In the step, first, a photoresist layer is formed on the entire top surface of the layered structure. Next, the photoresist layer is patterned to form a frame 25. The frame 25 has an opening located above the groove 15a, another opening located above the resistor element 42a, and still another opening located above the resistor element 52a. Next, a magnetic layer 242P is formed by frame plating on the magnetic layer 241P in the opening of the frame 25. In this case, the magnetic layer 241P is used as an electrode for plating. The magnetic layer 242P will be the second layer 242 of the pole layer 24 later. Next, the frame 25 is removed. In the frame 25, it is acceptable that the openings are not formed in the portions above the resistor elements 42a and 52a and that the magnetic layer 242P is not located above the resistor elements 42a and 52a. In the manner thus described, the magnetic layers 241P and 242P to be the pole layer 24 are formed such that the groove 15a is filled with the magnetic layers 241P and 242P and that the top surfaces of the magnetic layers 241P and 242P are located higher than the top surface of the polishing stopper layer 23.

Figure 23:
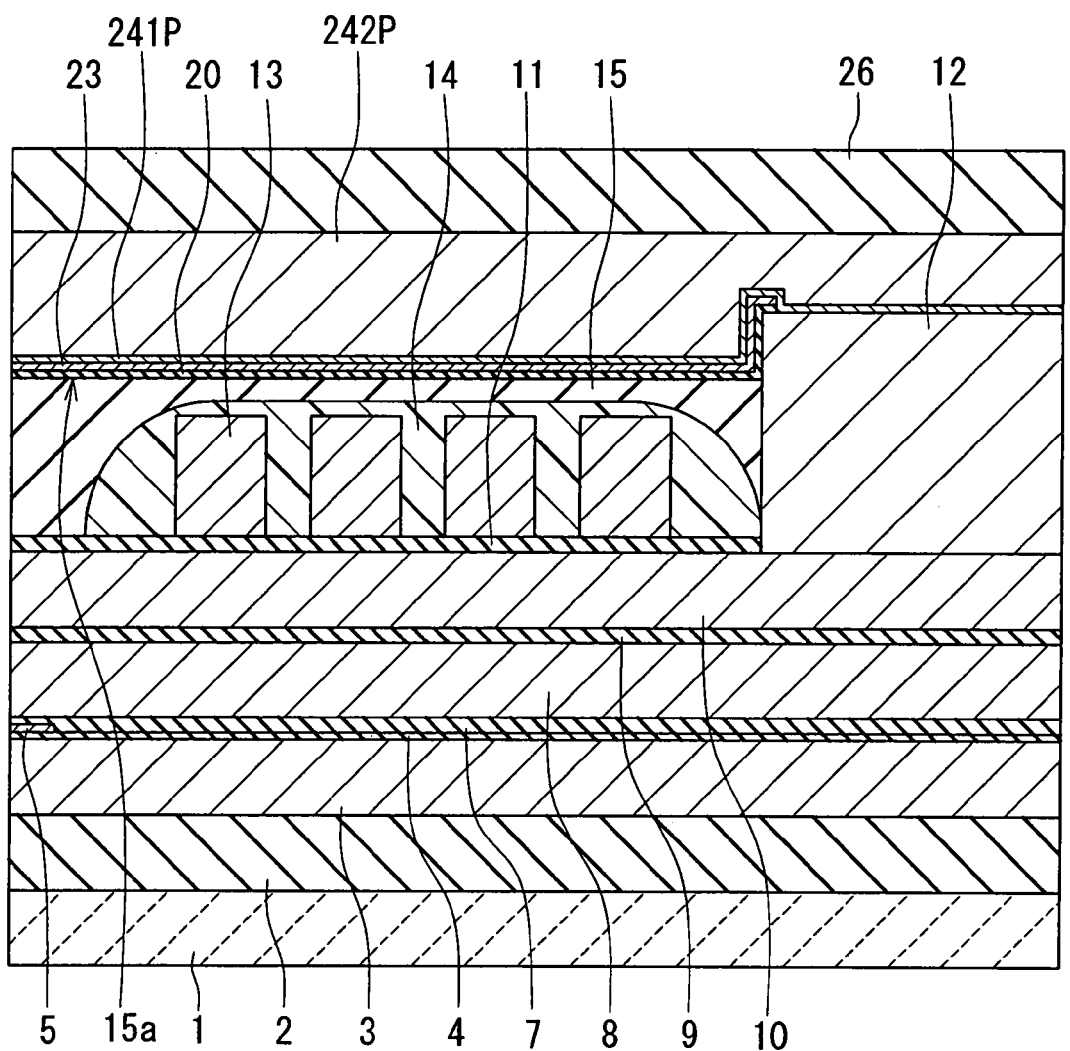
FIG. 23 is a cross-sectional view of the layered structure obtained in a step that follows the step shown in FIG. 20.
Figure 24:
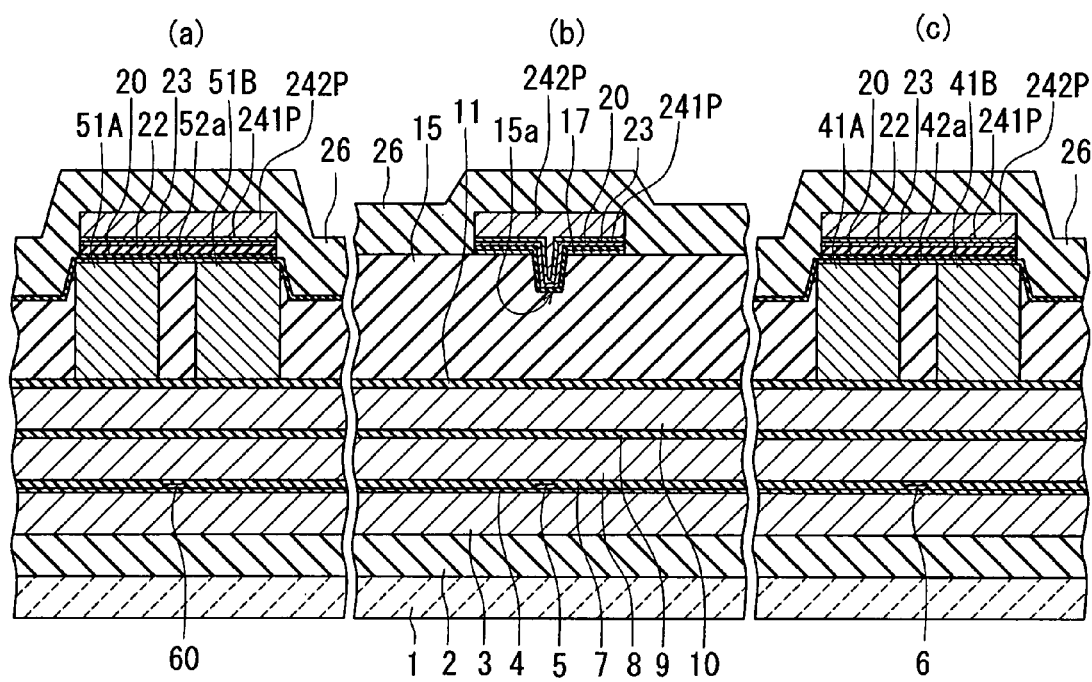
FIG. 24 is another cross-sectional view of the layered structure shown in FIG. 23.
Figure 25:
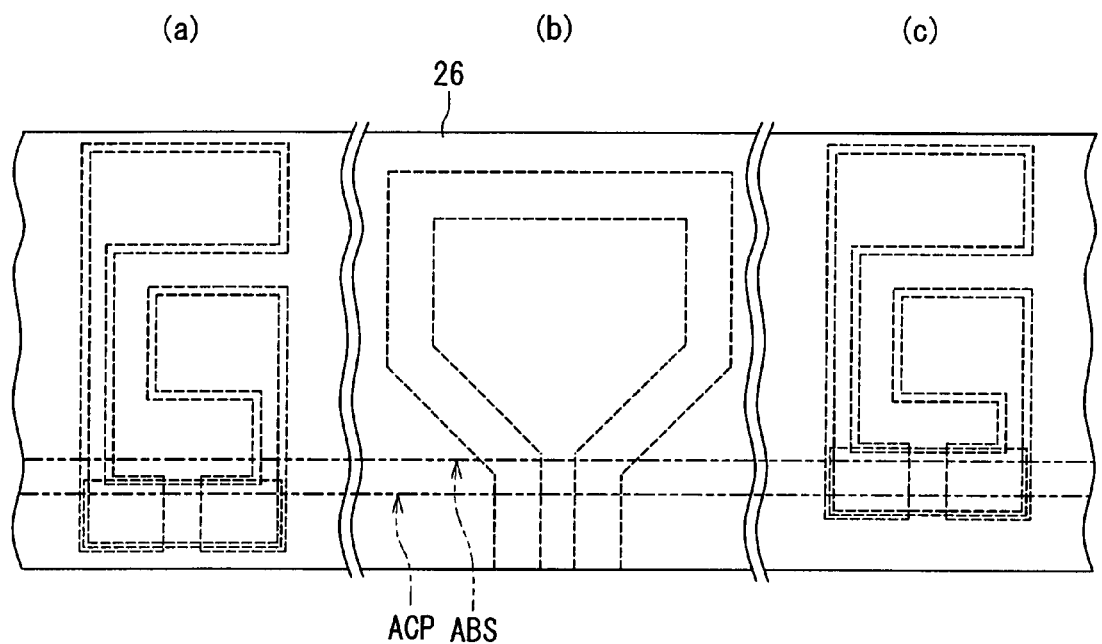
FIG. 25 is a top view of the layered structure shown in FIG. 23.

FIG. 23 to FIG. 25 illustrate the following step. FIG. 23 shows a cross section of the layered structure orthogonal to the medium facing surface and the top surface of the substrate. FIG. 24 shows a cross section of the layered structure parallel to the medium facing surface. FIG. 25 shows the top surface of the layered structure. FIG. 24(a), FIG. 24(b), FIG. 24(c), FIG. 25(a), FIG. 25(b) and FIG. 25(c) illustrate the regions the same as those of FIG. 6(a), FIG. 6(b), FIG. 6(c), FIG. 7(a), FIG. 7(b) and FIG. 7(c), respectively.

In the step, first, in the pre-head portion 101 and the adjacent portion of the inter-row portion to be removed 102, the layered structure that is disposed on the top surface of the encasing layer 15 and made up of the nonmagnetic conductive layer 17, the nonmagnetic film 20, the polishing stopper layer 23 and the magnetic layer 241P except portions below the magnetic layer 242P is removed by ion beam etching, for example. At the same time, in the intra-row portion to be removed 103 and the adjacent portion of the inter-row portion to be removed 102, the layered structure made up of the polishing stopper layer 23 and the magnetic layer 241P except portions below the magnetic layer 242P is removed by ion beam etching, for example. At this time, the resistor elements 42a and 52a are protected by the nonmagnetic film 20 and the insulating layer 22 located above the resistor elements 42a and 52a. Next, the coating layer 26 made of alumina, for example, and having a thickness of 1.0 to 1.5 µm, for example, is formed on the entire top surface of the layered structure.

Figure 26:
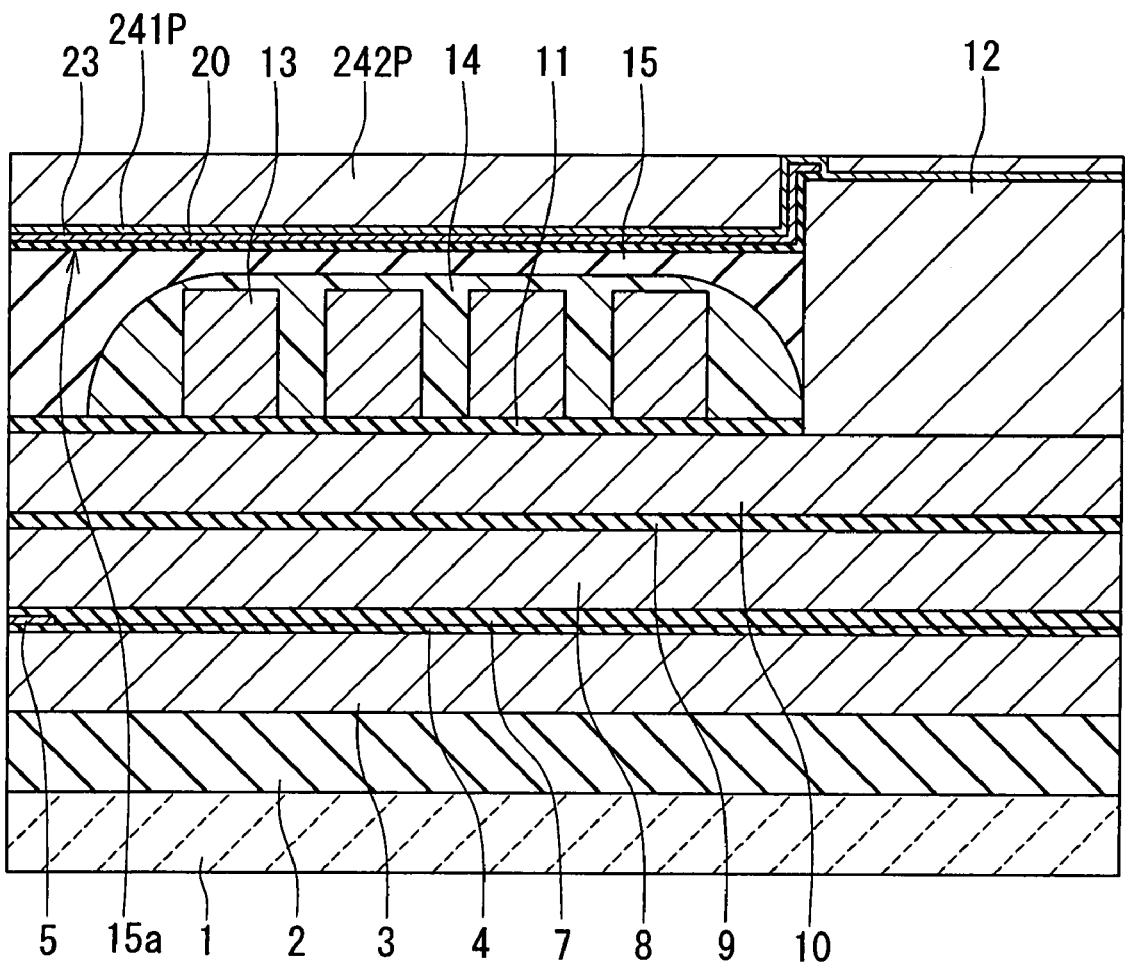
FIG. 26 is a cross-sectional view of the layered structure obtained in a step that follows the step shown in FIG. 23.
Figure 27:
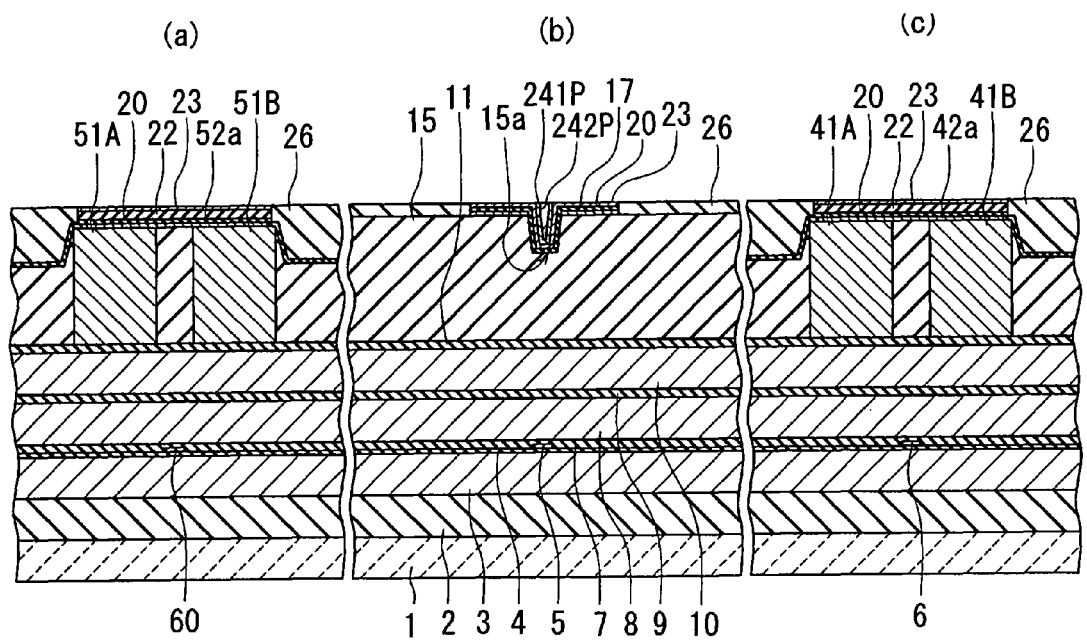
FIG. 27 is another cross-sectional view of the layered structure shown in FIG. 26.
Figure 28:
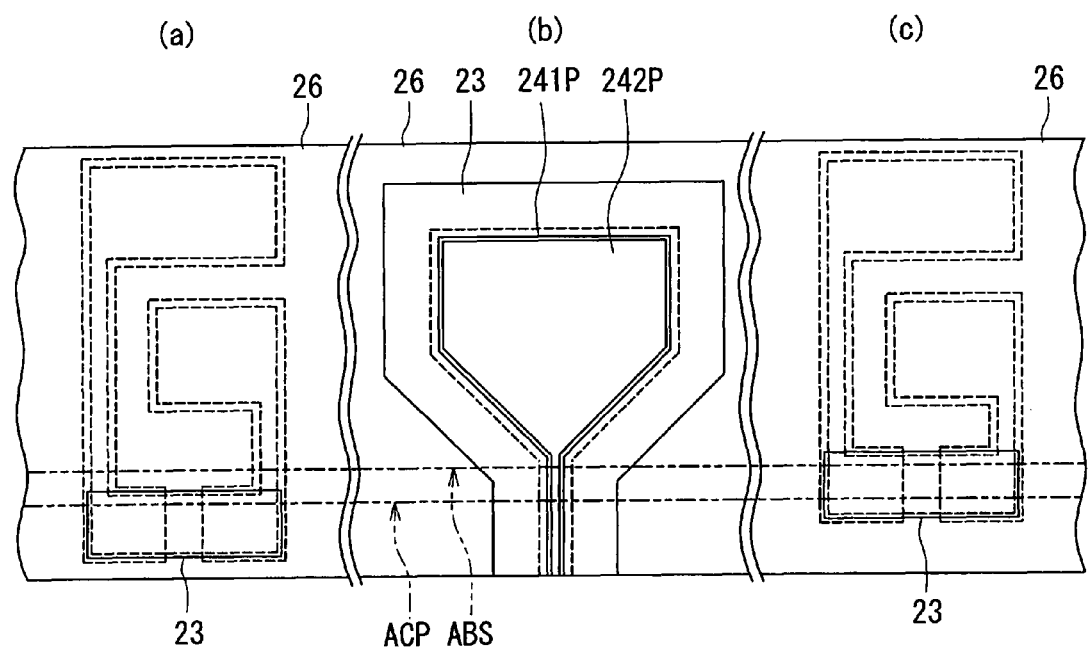
FIG. 28 is a top view of the layered structure shown in FIG. 26.

FIG. 26 to FIG. 28 illustrate the following step. FIG. 26 shows a cross section of the layered structure orthogonal to the medium facing surface and the top surface of the substrate. FIG. 27 shows a cross section of the layered structure parallel to the medium facing surface. FIG. 28 shows the top surface of the layered structure. FIG. 27(a), FIG. 27(b), FIG. 27(c), FIG. 28(a), FIG. 28(b) and FIG. 28(c) illustrate the regions the same as those of FIG. 6(a), FIG. 6(b), FIG. 6(c), FIG. 7(a), FIG. 7(b) and FIG. 7(c), respectively.

In the step, the coating layer 26, the magnetic layer 242P and the magnetic layer 241P are polished by CMP, for example, until the polishing stopper layer 23 is exposed. As a result, in the pre-head portion 101 and the adjacent portion of the inter-row portion to be removed 102, portions of the magnetic layers 241P and 242P disposed on the top surface of the polishing stopper layer 23 are removed and the top surfaces of the polishing stopper layer 23, the magnetic layer 241P and the magnetic layer 242P are flattened. In the case of polishing the coating layer 26, the magnetic layer 242P and the magnetic layer 241P by CMP, such a slurry is used that polishing is stopped when the polishing stopper layer 23 is exposed, such as an alumina-base slurry. In the case of polishing the coating layer 26, the magnetic layer 242P and the magnetic layer 241P by CMP using an alumina-base slurry, the material of the polishing stopper layer 23 is preferably Ta or Ru.

Figure 29:
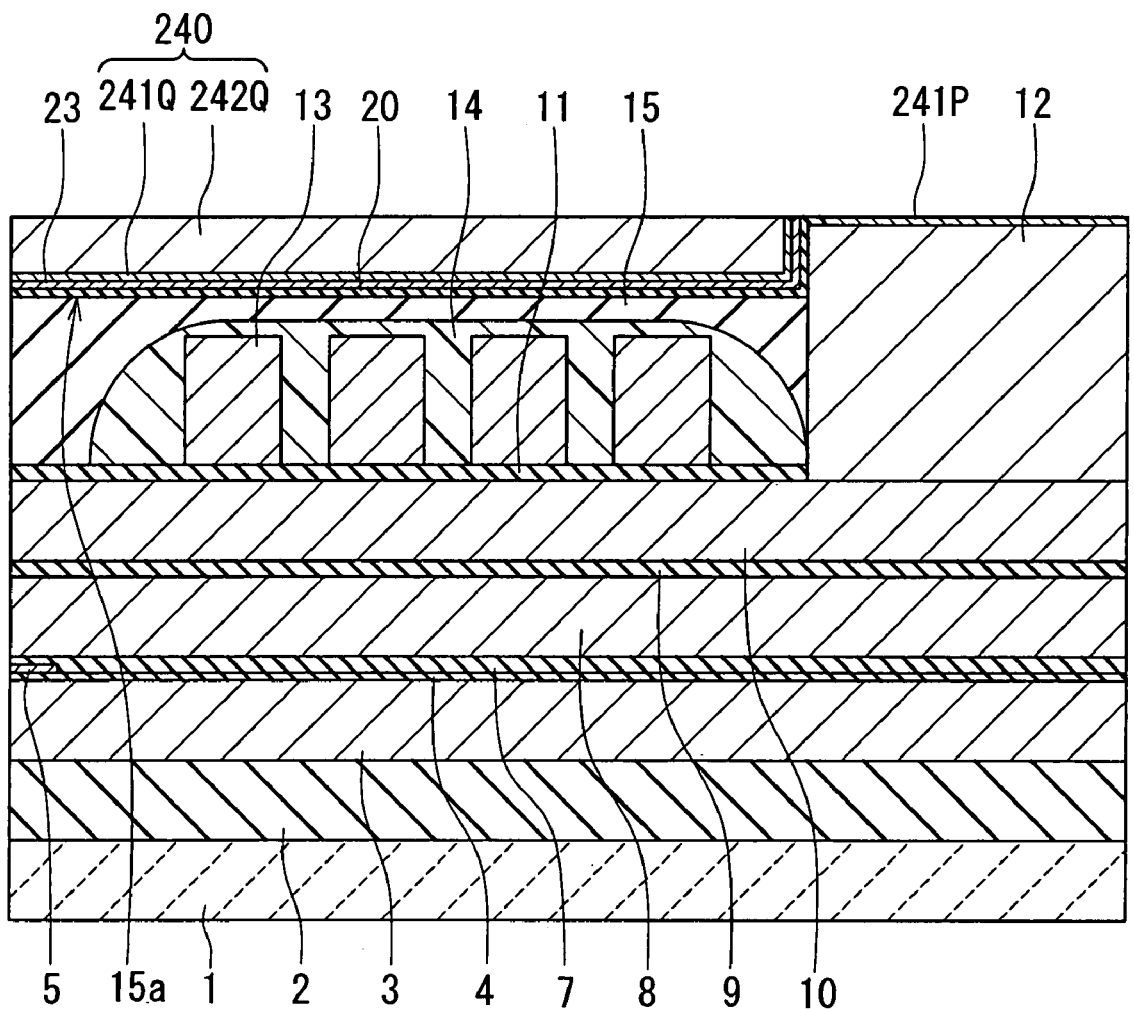
FIG. 29 is a cross-sectional view of the layered structure obtained in a step that follows the step shown in FIG. 26.
Figure 30:
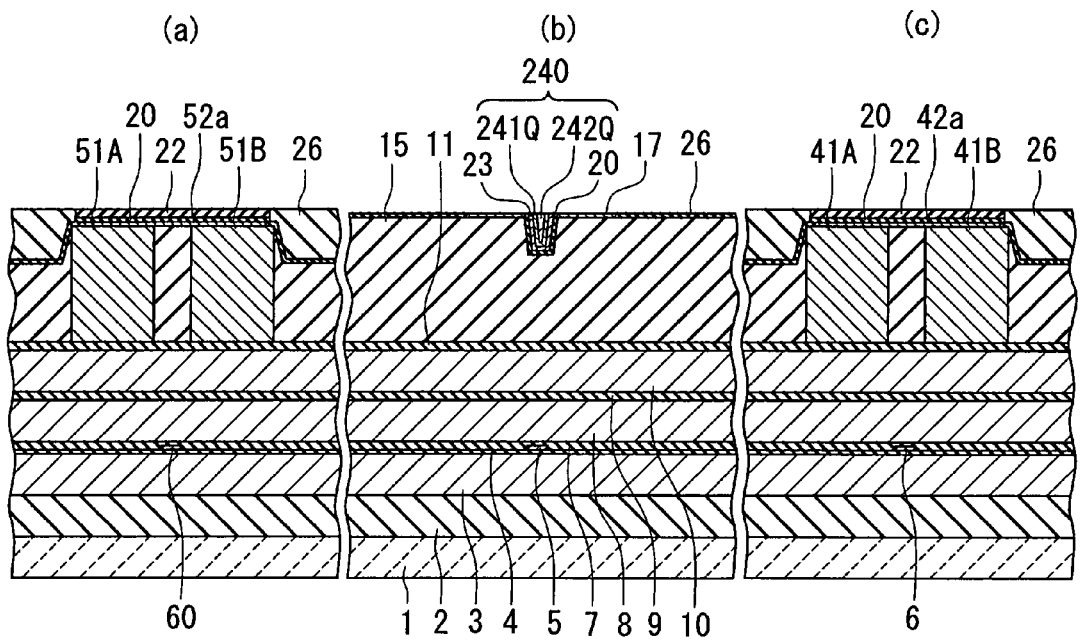
FIG. 30 is another cross-sectional view of the layered structure shown in FIG. 29.
Figure 31:
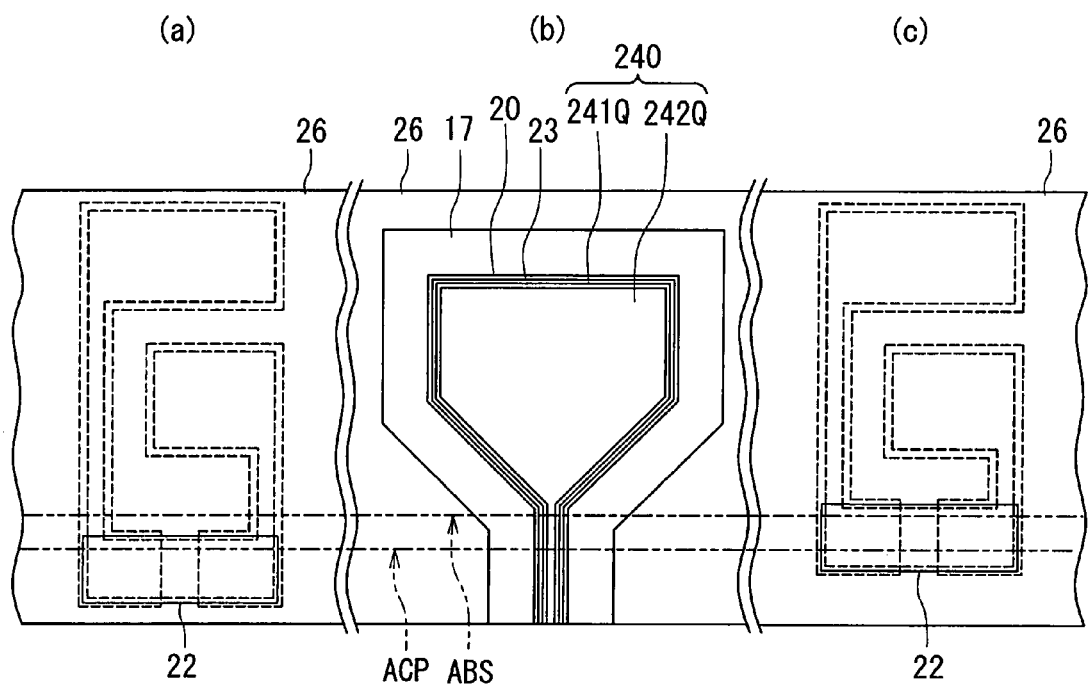
FIG. 31 is a top view of the layered structure shown in FIG. 29.

FIG. 29 to FIG. 31 illustrate the following step. FIG. 29 shows a cross section of the layered structure orthogonal to the medium facing surface and the top surface of the substrate. FIG. 30 shows a cross section of the layered structure parallel to the medium facing surface. FIG. 31 shows the top surface of the layered structure. FIG. 30(a), FIG. 30(b), FIG. 30(c), FIG. 31(a), FIG. 31(b) and FIG. 31(c) illustrate the regions the same as those of FIG. 6(a), FIG. 6(b), FIG. 6(c), FIG. 7(a), FIG. 7(b) and FIG. 7(c), respectively.

In the step, ion beam etching, for example, is performed to remove portions of the polishing stopper layer 23 and the nonmagnetic film 20 disposed on the nonmagnetic conductive layer 17, and to etch portions of the first magnetic layer 241P and the second magnetic layer 242P. The top surfaces of the nonmagnetic conductive layer 17, the nonmagnetic film 20, the polishing stopper layer 23, the first magnetic layer 241P and the second magnetic layer 242P are thereby flattened. At this time, the resistor elements 42a and 52a are protected by the nonmagnetic film 20 and the insulating layer 22 that are located above the resistor elements 42a and 52a. The magnetic layers 241P and 242P disposed on the polishing stopper layer 23 in the groove 15a are hereinafter defined as magnetic layers 241Q and 242Q, respectively. In addition, a combination of the magnetic layers 241Q and 242Q is defined as a magnetic layer 240.

Alternatively, a portion of the polishing stopper layer 23 located above the nonmagnetic conductive layer 17 may be removed by ion beam etching, for example, and then the coating layer 26, the nonmagnetic film 20, the polishing stopper layer 23, and the magnetic layers 242P and 241P may be polished by CMP, for example, so that the top surfaces of the nonmagnetic conductive layer 17, the nonmagnetic film 20, the polishing stopper layer 23, the first magnetic layer 241P and the second magnetic layer 242P are flattened.

Since each of the polishing stopper layer 23 and the nonmagnetic film 20 is made of a nonmagnetic material, the track width is not affected even though the stopper layer 23 and the nonmagnetic film 20 are disposed on the nonmagnetic conductive layer 17. Therefore, portions of the stopper layer 23 and the nonmagnetic film 20 disposed on the nonmagnetic conductive layer 17 may be left unremoved, or a portion of the nonmagnetic film 20 disposed on the nonmagnetic conductive layer 17 may be left unremoved.

Another alternative is that, ion beam etching, for example, may be performed to remove the nonmagnetic conductive layer 17 and to etch portions of the first magnetic layer 241P and the second magnetic layer 242P, and the top surfaces of the encasing layer 15, the nonmagnetic film 20, the polishing stopper layer 23, the first magnetic layer 241P and the second magnetic layer 242P may be thereby flattened.

Figure 32:
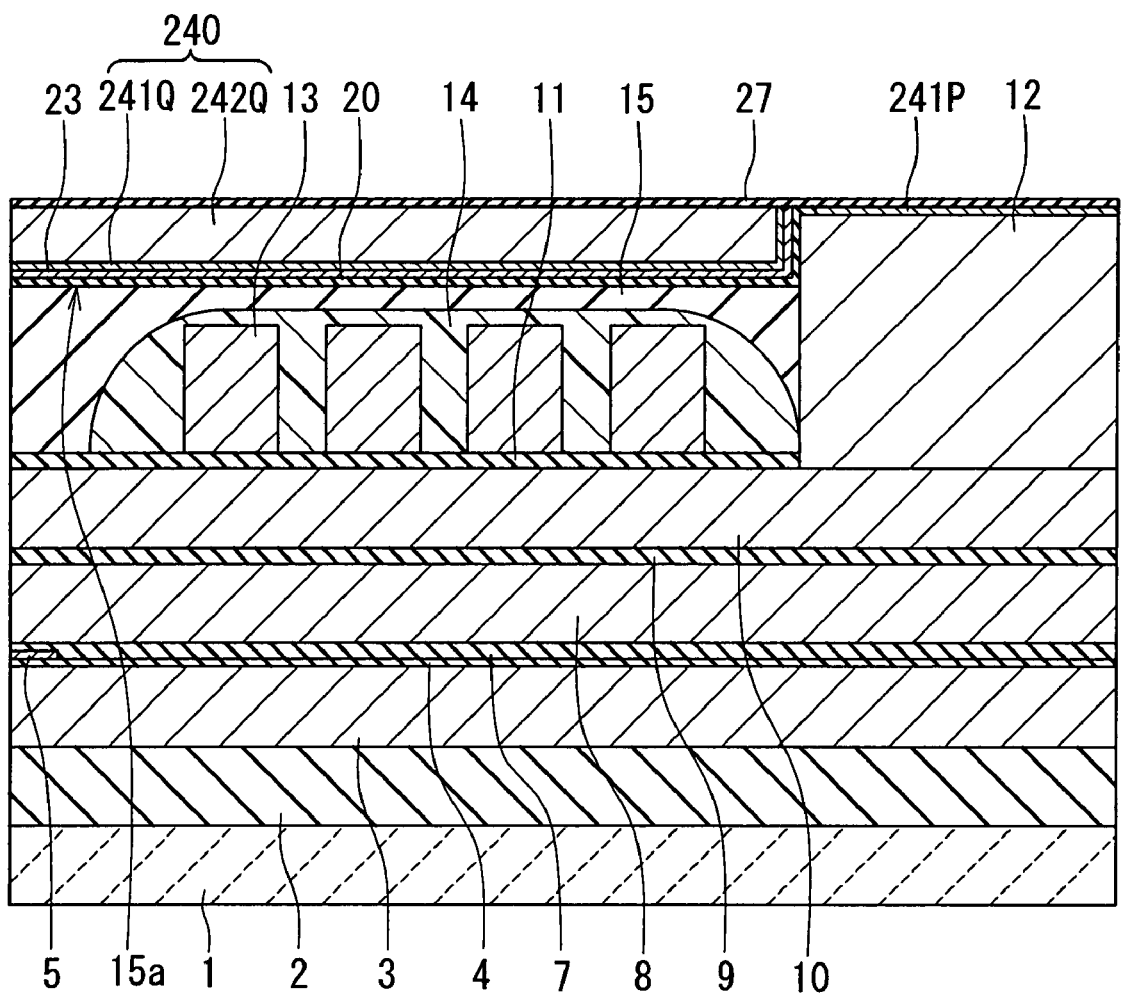
FIG. 32 is a cross-sectional view of the layered structure obtained in a step that follows the step shown in FIG. 29.
Figure 33:
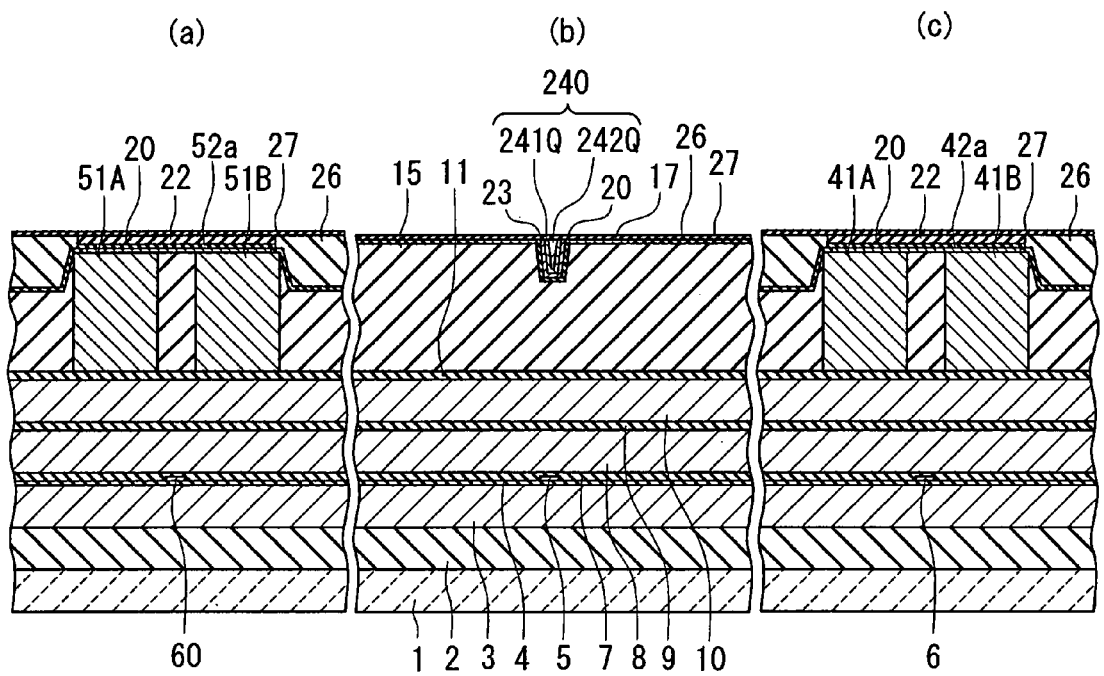
FIG. 33 is another cross-sectional view of the layered structure shown in FIG. 32.
Figure 34:
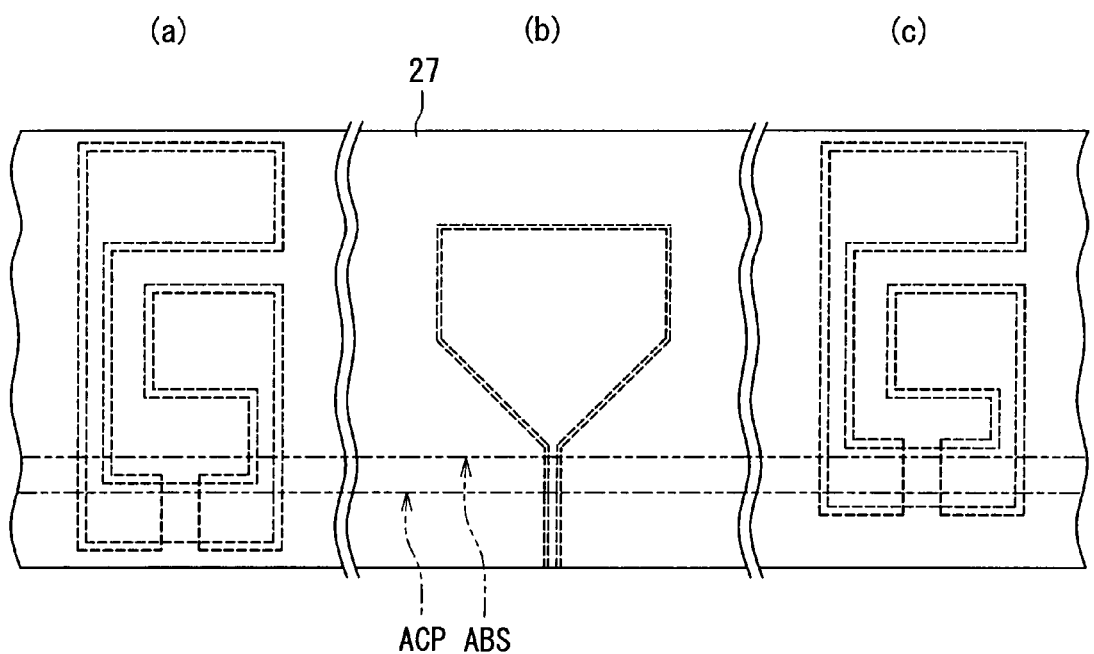
FIG. 34 is a top view of the layered structure shown in FIG. 32.

FIG. 32 to FIG. 34 illustrate the following step. FIG. 32 shows a cross section of the layered structure orthogonal to the medium facing surface and the top surface of the substrate. FIG. 33 shows a cross section of the layered structure parallel to the medium facing surface. FIG. 34 shows the top surface of the layered structure. FIG. 33(a), FIG. 33(b), FIG. 33(c), FIG. 34(a), FIG. 34(b) and FIG. 34(c) illustrate the regions the same as those of FIG. 6(a), FIG. 6(b), FIG. 6(c), FIG. 7(a), FIG. 7(b) and FIG. 7(c), respectively. In this step, the gap layer 27 is formed on the entire top surface of the layered structure.

Figure 35:
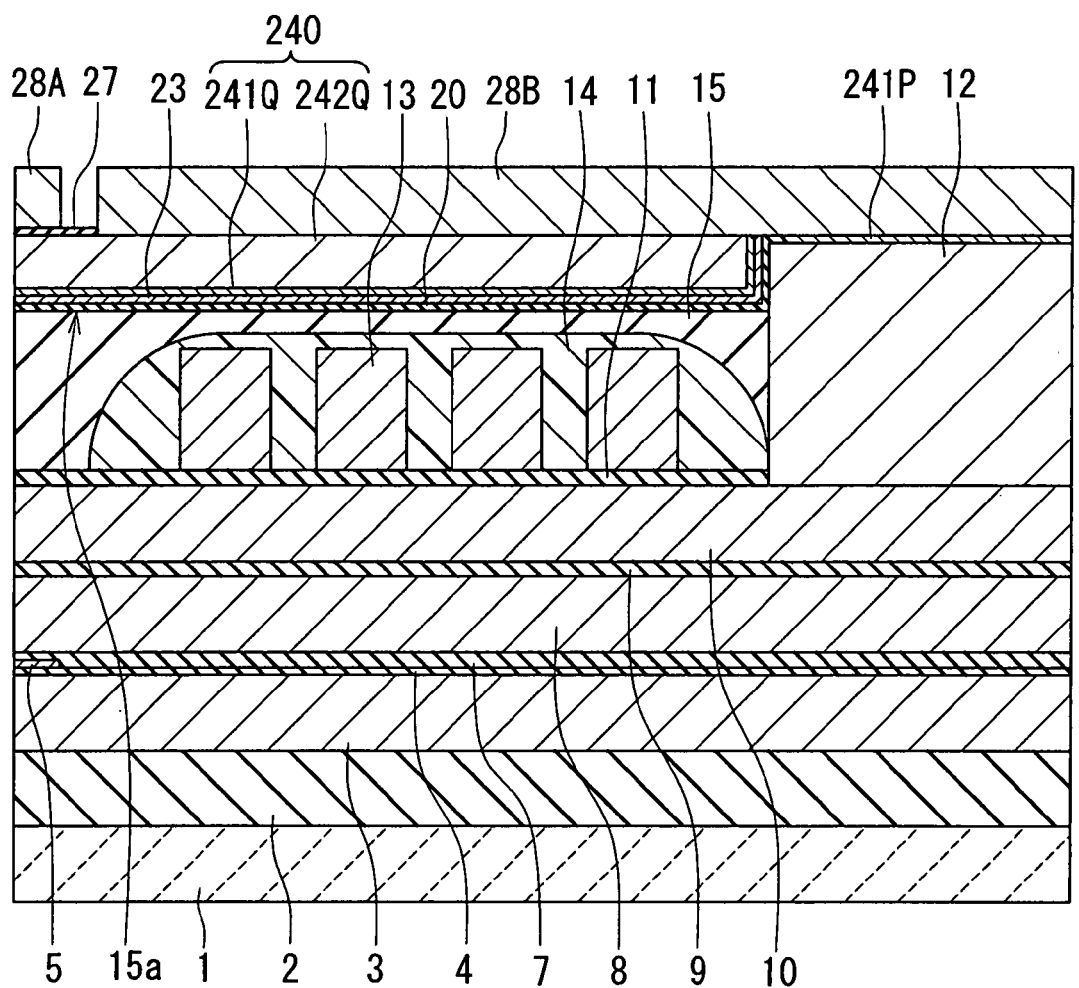
FIG. 35 is a cross-sectional view of the layered structure obtained in a step that follows the step shown in FIG. 32.
Figure 36:
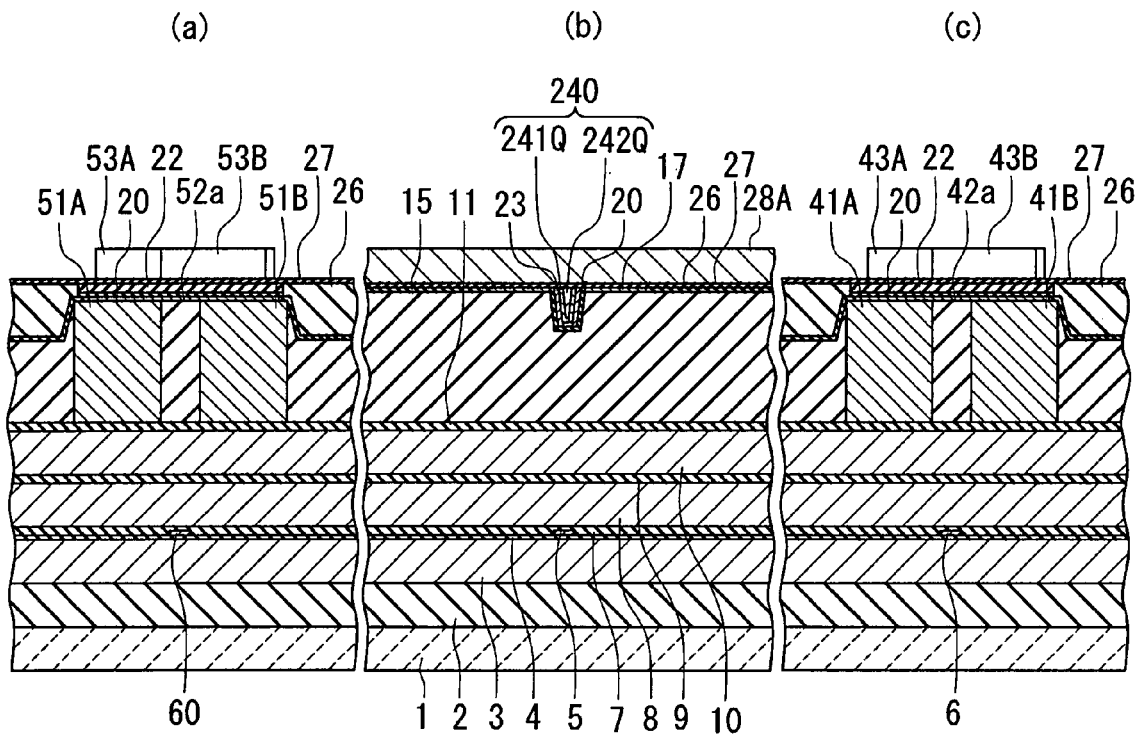
FIG. 36 is another cross-sectional view of the layered structure shown in FIG. 35.
Figure 37:
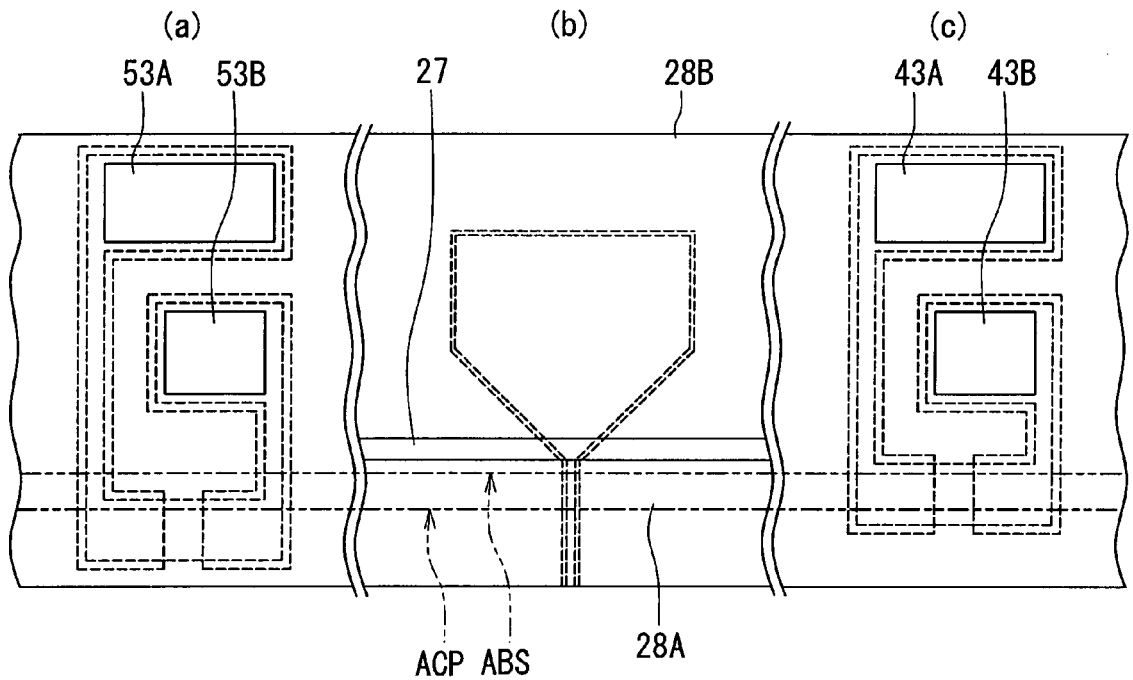
FIG. 37 is a top view of the layered structure shown in FIG. 35.

FIG. 35 to FIG. 37 illustrate the following step. FIG. 35 shows a cross section of the layered structure orthogonal to the medium facing surface and the top surface of the substrate. FIG. 36 shows a cross section of the layered structure parallel to the medium facing surface. FIG. 37 shows the top surface of the layered structure. FIG. 36(a), FIG. 36(b), FIG. 36(c), FIG. 37(a), FIG. 37(b) and FIG. 37(c) illustrate the regions the same as those of FIG. 6(a), FIG. 6(b), FIG. 6(c), FIG. 7(a), FIG. 7(b) and FIG. 7(c), respectively.

In the step, first, in the pre-head portion 101, a region of the gap layer 27 in which the yoke layer 28B is to be formed is selectively etched to form an opening in the gap layer 27. At the same time, in the intra-row portion to be removed 103, portions of the gap layer 27 and the nonmagnetic film 20 located above the wide portions 41Aa and 41Ba of the electrode layers 41A and 41B and above the wide portions 51Aa and 51Ba of the electrode layers 51A and 51B are selectively etched to form openings in the gap layer 27 and the nonmagnetic film 20.

Next, in the pre-head portion 101 and the adjacent portion of the inter-row portion to be removed 102, the first layer 28A is formed on the gap layer 27, and the yoke layer 28B is formed on a portion of the magnetic layer 240 where the opening of the gap layer 27 is formed. In the intra-row portion to be removed 103, electrode layers 43A and 43B are formed on the resistor layer 42 and electrode layers 53A and 53B are formed on the resistor layer 52 in the region in which the openings of the gap layer 27 and the nonmagnetic film 20 are formed. The electrode layers 43A, 43B, 53A and 53B are made of a conductive material. The material of the electrode layers 43A, 43B, 53A and 53B may be the same as that of the first layer 28A and the yoke layer 28B. The first layer 28A, the yoke layer 28B and the electrode layers 43A, 43B, 53A and 53B may be formed by frame plating or by making a magnetic layer through sputtering and then selectively etching the magnetic layer.

Figure 38:
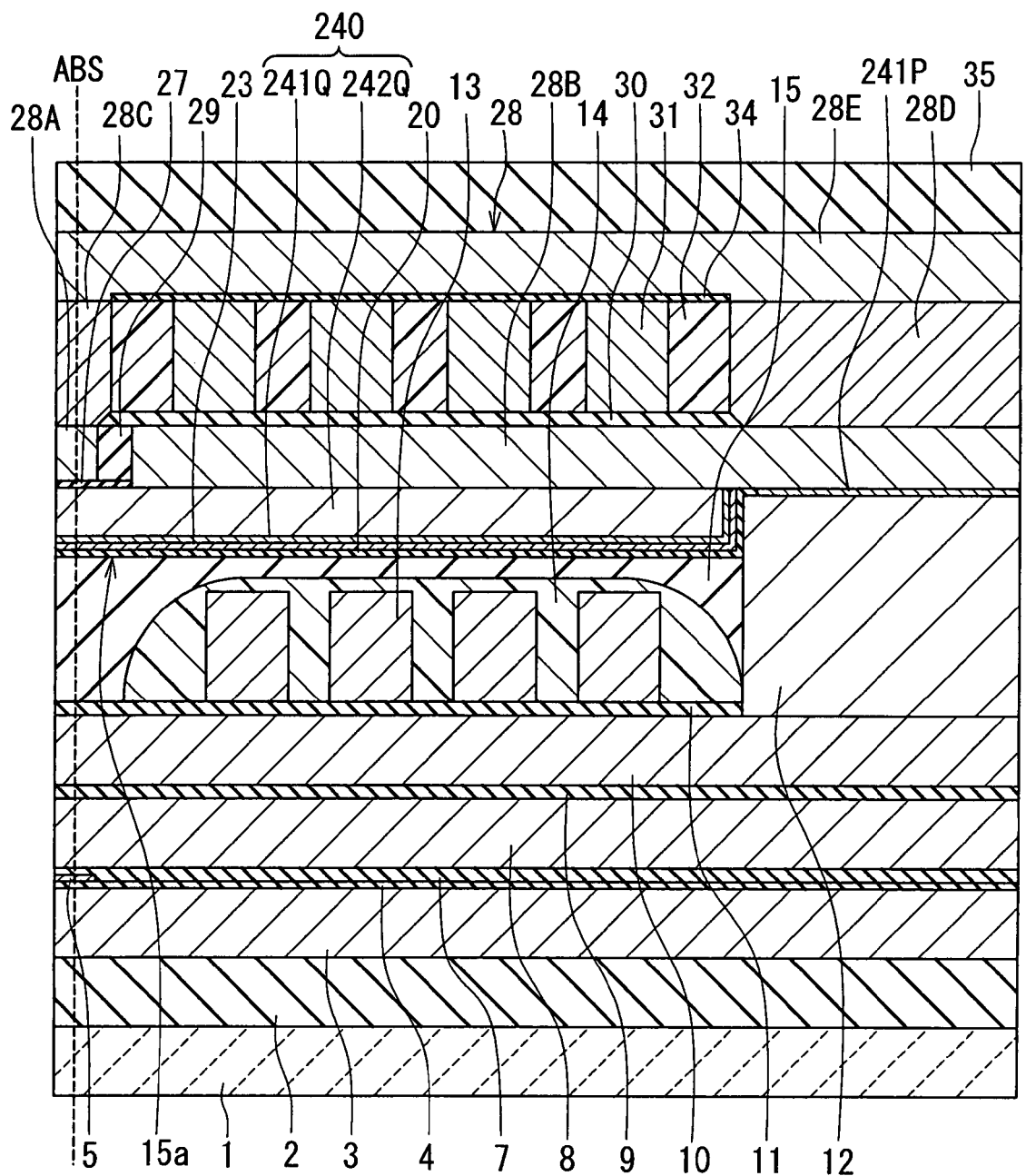
FIG. 38 is a cross-sectional view of the layered structure obtained in a step that follows the step shown in FIG. 35.
Figure 39:
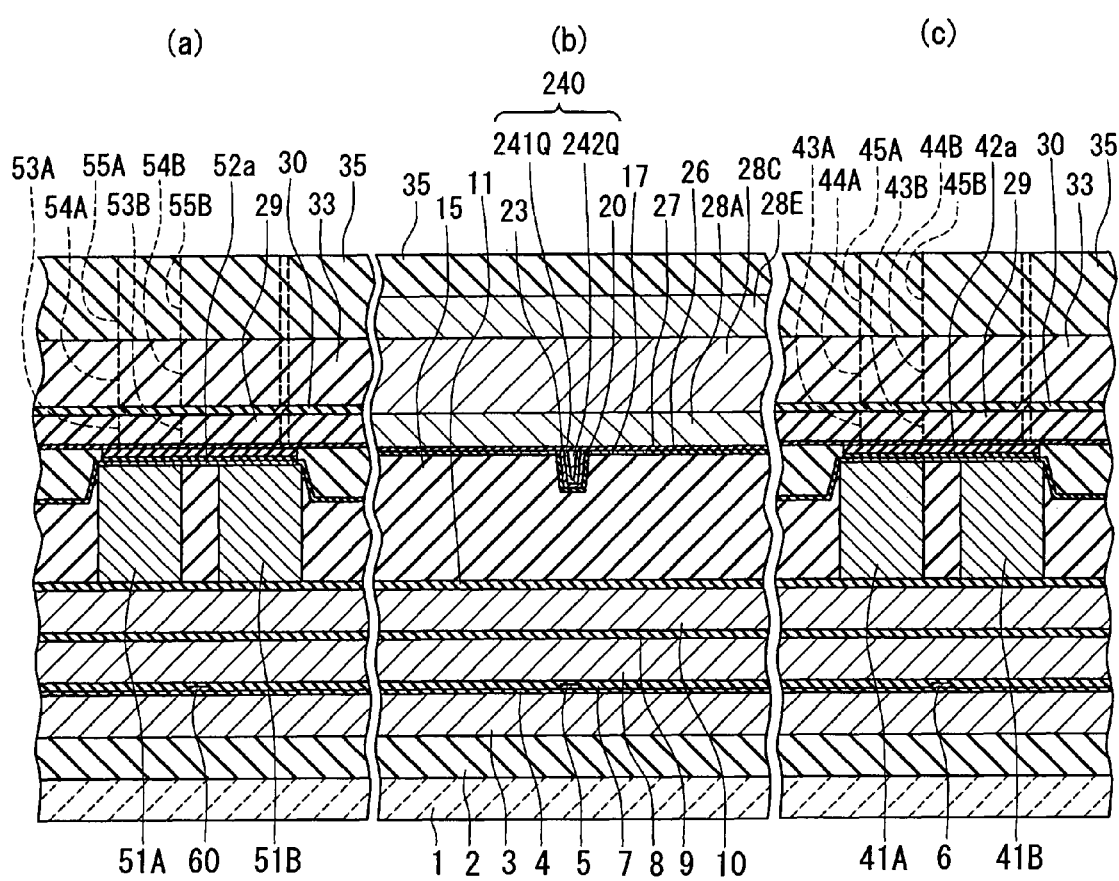
FIG. 39 is another cross-sectional view of the layered structure shown in FIG. 38.
Figure 40:
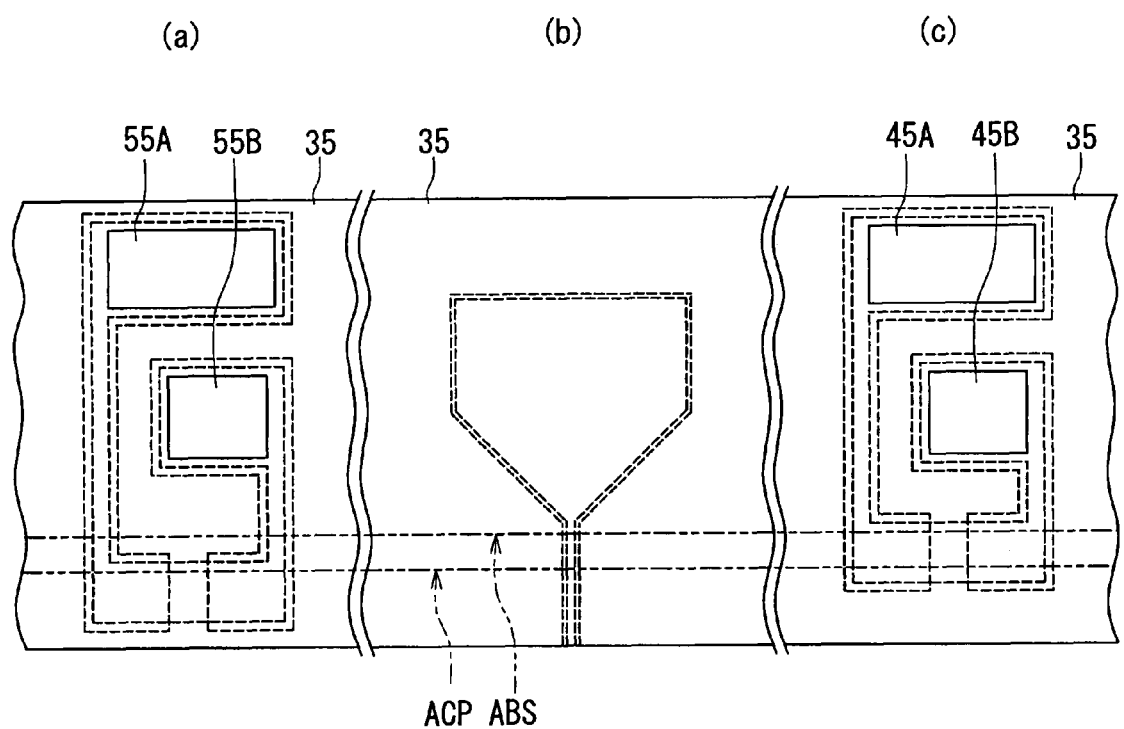
FIG. 40 is a top view of the layered structure shown in FIG. 38.

FIG. 38 to FIG. 40 illustrate the following step. FIG. 38 shows a cross section of the layered structure orthogonal to the medium facing surface and the top surface of the substrate. FIG. 39 shows a cross section of the layered structure parallel to the medium facing surface. FIG. 40 shows the top surface of the layered structure. FIG. 39(a), FIG. 39(b), FIG. 39(c), FIG. 40(a), FIG. 40(b) and FIG. 40(c) illustrate the regions the same as those of FIG. 6(a), FIG. 6(b), FIG. 6(c), FIG. 7(a), FIG. 7(b) and FIG. 7(c), respectively.

In the step, first, the nonmagnetic layer 29 is formed on the entire top surface of the layered structure. Next, the nonmagnetic layer 29 is polished by CMP, for example, so that the first layer 28A and the yoke layer 28B are exposed, and the top surfaces of the first layer 28A, the yoke layer 28B and the nonmagnetic layer 29 are flattened. Next, the insulating layer 30 having a thickness that falls within a range of 0.2 to 0.3 µm inclusive, for example, is formed by a method such as sputtering on the entire top surface of the layered structure.

Next, in the pre-head portion 101 and the adjacent portion of the inter-row portion to be removed 102, a region of the insulating layer 30 in which the second layer 28C and the coupling layer 28D are to be formed is selectively etched to form an opening in the insulating layer 30. At the same time, in the intra-row portion to be removed 103, a portion of the insulating layer 30 located above the electrode layers 43A, 43B, 53A and 53B is selectively etched to form openings in the insulating layer 30.

Next, in the pre-head portion 101, the coil 31 is formed by frame plating, for example, on the insulating layer 30. Next, in the pre-head portion 101 and the adjacent portion of the inter-row portion to be removed 102, the second layer 28C and the coupling layer 28D are formed by frame plating, for example. Alternatively, the coil 31 may be formed after the second layer 28C and the coupling layer 28D are formed. In the intra-row portion to be removed 103, electrode layers 44A, 44B, 54A and 54B are formed by frame plating, for example, on the electrode layers 43A, 43B, 53A and 53B in the regions in which the openings of the insulating layer 30 are formed. The electrode layers 44A, 44B, 54A and 54B are made of a conductive material. The material of the electrode layers 44A, 44B, 54A and 54B may be the same as that of the second layer 28C and the coupling layer 28D, and the second layer 28C, the coupling layer 28D, and the electrode layers 44A, 44B, 54A and 54B may be formed at the same time.

Next, the insulating layer 32 made of photoresist, for example, is selectively formed in the space between respective adjacent ones of the turns of the coil 31 and around the coil 31. Next, the insulating layer 33 having a thickness of 4 to 4.5 µm, for example, is formed on the entire top surface of the layered structure. Next, the insulating layer 33 is polished by CMP, for example, so that the second layer 28C, the coupling layer 28D, the coil 31, and the electrode layers 44A, 44B, 54A and 54B are exposed, and the top surfaces of the second layer 28C, the coupling layer 28D, the coil 31, the electrode layers 44A, 44B, 54A and 54B, and the insulating layers 32 and 33 are thereby flattened. Next, the insulating layer 34 is formed on the coil 31 and the insulating layer 32.

Next, in the pre-head portion 101 and the adjacent portion of the inter-row portion to be removed 102, the third layer 28E is formed by frame plating, for example, to complete the shield layer 28. In the intra-row portion to be removed 103, electrode layers 45A, 45B, 55A and 55B are formed by frame plating, for example, on the electrode layers 44A, 44B, 54A and 54B. The electrode layers 45A, 45B, 55A and 55B are made of a conductive material. The material of the electrode layers 45A, 45B, 55A and 55B may be the same as that of the third layer 28E, and the third layer 28E and the electrode layers 45A, 45B, 55A and 55B may be formed at the same time.

Next, a protection layer 35 is formed to cover the entire top surface of the layered structure. Wiring and terminals are then formed on the protection layer 35. In the pre-head portion 101, two terminals connected to the MR element 5 and two terminals connected to the coil 31 are formed on the protection layer 35. In the intra-row portion to be removed 103 in which the first resistor element 6 and the second resistor element 42a are disposed, two terminals connected to the first resistor element 6 and two terminals connected to the second resistor element 42a through the electrode layers 43A, 44A and 45A and the electrode layers 43B, 44B and 45B are formed on the protection layer 35. Furthermore, in the intra-row portion to be removed 103 adjacent to the portion of the inter-row portion to be removed 102 in which the third resistor element 60 and the fourth resistor element 52a are disposed, two terminals connected to the third resistor element 60 and two terminals connected to the fourth resistor element 52a through the electrode layers 53A, 54A and 55A and the electrode layers 53B, 54B and 55B are formed on the protection layer 35.

In such a manner, components of a plurality of magnetic heads including a plurality of sets of the MR element 5, the pole layer 24 and the coil 31 are formed in the single substrate 1. The magnetic head substructure is thus fabricated in which a plurality of pre-head portions 101 that will be the magnetic heads later are aligned in a plurality of rows. The magnetic head substructure is cut at the inter-row portions to be removed 102. A surface formed by cutting the magnetic head substructure is lapped to form the lapped surface, and the lapped surface is further lapped so that the lapped surface reaches the target position of the medium facing surfaces 40 and thereby becomes the medium facing surfaces 40. The medium facing surfaces 40 are thus formed. Furthermore, the plurality of pre-head portions 101 are separated from one another by cutting the substructure, and a plurality of magnetic heads are thereby formed. When the medium facing surfaces 40 are formed, the magnetic layers 241Q and 242Q become the first layer 241 and the second layer 242, respectively.

As shown in FIG. 1, the magnetic head substructure includes the plurality of pre-head portions 101, the plurality of inter-row portions to be removed 102, and the plurality of intra-row portions to be removed 103. In some of the intra-row portions 103, there are provided the first resistor element 6, two leads 111A and 111B connected to the first resistor element 6, and the resistor layer 42 including the second resistor element 42a. In these intra-row portions 103, two terminals 112A and 112B connected to the leads 111A and 111B, and two terminals 113A and 113B connected to the resistor layer 42 are provided on the protection layer 35. In FIG. 1 the first resistor element 6 and the second resistor element 42a are shown in different ones of the intra-row portions 103 for convenience. However, the first resistor element 6 and the second resistor element 42a are actually located at a distance from each other along the vertical direction in the same intra-row portion 103.

In another some of the intra-row portions 103 and portions of the inter-row portions 102 adjacent to these some of the intra-row portions 103, there are provided the third resistor element 60, two leads 121A and 121B connected to the third resistor element 60, and the resistor layer 52 including the fourth resistor element 52a. In these intra-row portions 103 and the portions of the inter-row portions 102 adjacent thereto, two terminals 122A and 122B connected to the leads 121A and 121B, and two terminals 123A and 123B connected to the resistor layer 52 are provided on the protection layer 35. In FIG. 1 the third resistor element 60 and the fourth resistor element 52a are shown in different portions of the inter-row portion 102 for convenience. However, the third resistor element 60 and the fourth resistor element 52a are actually located at a distance from each other along the vertical direction in the same portion of the inter-row portion to be removed 102.

In the embodiment each of the first to fourth resistor elements 6, 42a, 60 and 52a is located in the region of the magnetic head substructure that will not remain in each magnetic head.

In the embodiment the resistor layers 42 and 52 are made of the material the same as that of the nonmagnetic conductor layer 17. However, the resistor layers 42 and 52 may be made of a material different from that of the nonmagnetic conductor layer 17.

FIG. 4 illustrates the main part of each of the pre-head portion 101 and the intra-row portion to be removed 103 in the state in which the medium facing surface 40 is formed. As shown in FIG. 4, the first resistor element 6 is located such that a portion thereof is exposed at the medium facing surface 40 when the medium facing surface 40 is formed. The first resistor element 6 has a resistance that varies depending on the position of the end of the MR element 5 located in the medium facing surface 40 along the direction orthogonal to the medium facing surface 40 when the medium facing surface 40 is formed. The second resistor element 42a is located such that a portion thereof is exposed at the medium facing surface 40 when the medium facing surface 40 is formed. The second resistor element 42a has a resistance that varies depending on the position of the end face of the track width defining portion 24A located in the medium facing surface 40 along the direction orthogonal to the medium facing surface 40 when the medium facing surface 40 is formed.

The distance between the first resistor element 6 and the substrate 1 is closer to the distance between the MR element 5 and the substrate 1 than the distance between the track width defining portion 24A and the substrate 1. In the embodiment, in particular, the distance between the first resistor element 6 and the substrate 1 is equal to the distance between the MR element 5 and the substrate 1. Similarly, the distance between the third resistor element 60 and the substrate 1 is closer to the distance between the MR element 5 and the substrate 1 than the distance between the track width defining portion 24A and the substrate 1. In the embodiment, in particular, the distance between the third resistor element 60 and the substrate 1 is equal to the distance between the MR element 5 and the substrate 1.

The distance between the second resistor element 42a and the substrate 1 is closer to the distance between the track width defining portion 24A and the substrate 1 than the distance between the MR element 5 and the substrate 1. In the embodiment, in particular, the distance between the top surface of the second resistor element 42a and the substrate 1 is nearly equal to the distance between the top surface of the track width defining portion 24A and the substrate 1. Similarly, the distance between the fourth resistor element 52a and the substrate 1 is closer to the distance between the track width defining portion 24A and the substrate 1 than the distance between the MR element 5 and the substrate 1. In the embodiment, in particular, the distance between the top surface of the fourth resistor element 52a and the substrate 1 is nearly equal to the distance between the top surface of the track width defining portion 24A and the substrate 1.

The distance between an end face of the second resistor element 42a located in the medium facing surface 40 and the opposite end face after the medium facing surface 40 is formed has a relationship with the resistance value of the second resistor element 42a obtained after the medium facing surface 40 is formed, and also has a relationship with the length of the track width defining portion 24A taken in the direction orthogonal to the medium facing surface 40, that is, the neck height NH. Therefore, the resistance value of the second resistor element 42a obtained after the medium facing surface 40 is formed is related to the neck height NH. That is, it is possible to determine the neck height NH from the resistance value of the second resistor element 42a. In the embodiment, in particular, the distance between the end of the second resistor element 42a located in the medium facing surface 40 and the opposite end is equal to the neck height NH. In this case, since the resistance of the second resistor element 42a is substantially inversely proportional to the neck height NH, it is possible to determine the neck height NH from the resistance value of the second resistor element 42a, using a simple expression.

A specific example of the step of fabricating a plurality of magnetic heads by separating the magnetic head substructure will now be described. In the step of fabricating the magnetic heads, first, the substructure is cut at the positions in the inter-row portions 102 shown in FIG. 1 to form head aggregates each of which includes a row of the pre-head portions 101. Next, a surface (the surface closer to the plane ABS) formed in each of the head aggregates by cutting the substructure is lapped to form the lapped surface, and the lapped surface is further lapped so that the lapped surface reaches the target position of the medium facing surfaces 40 and thereby becomes the medium facing surfaces 40. The medium facing surfaces 40 of the pre-head portions 101 that the head aggregate includes are thereby formed.

A method of forming the medium facing surfaces 40 by lapping the head aggregate will now be described. In this method the surface formed by cutting the substructure is lapped to form the medium facing surfaces 40, while monitoring the resistance values of the MR elements 5, the first resistor elements 6, the second resistor elements 42a, the third resistor elements 60 and the fourth resistor elements 52a that the head aggregate includes, so that the resistance of each of the MR elements 5, the first resistor elements 6 and the second resistor elements 42a is of a specific value. As a result, the MR height, the throat height TH and the neck height NH of each of the pre-head portions 101 are controlled to be of respective desired values.

Figure 41:
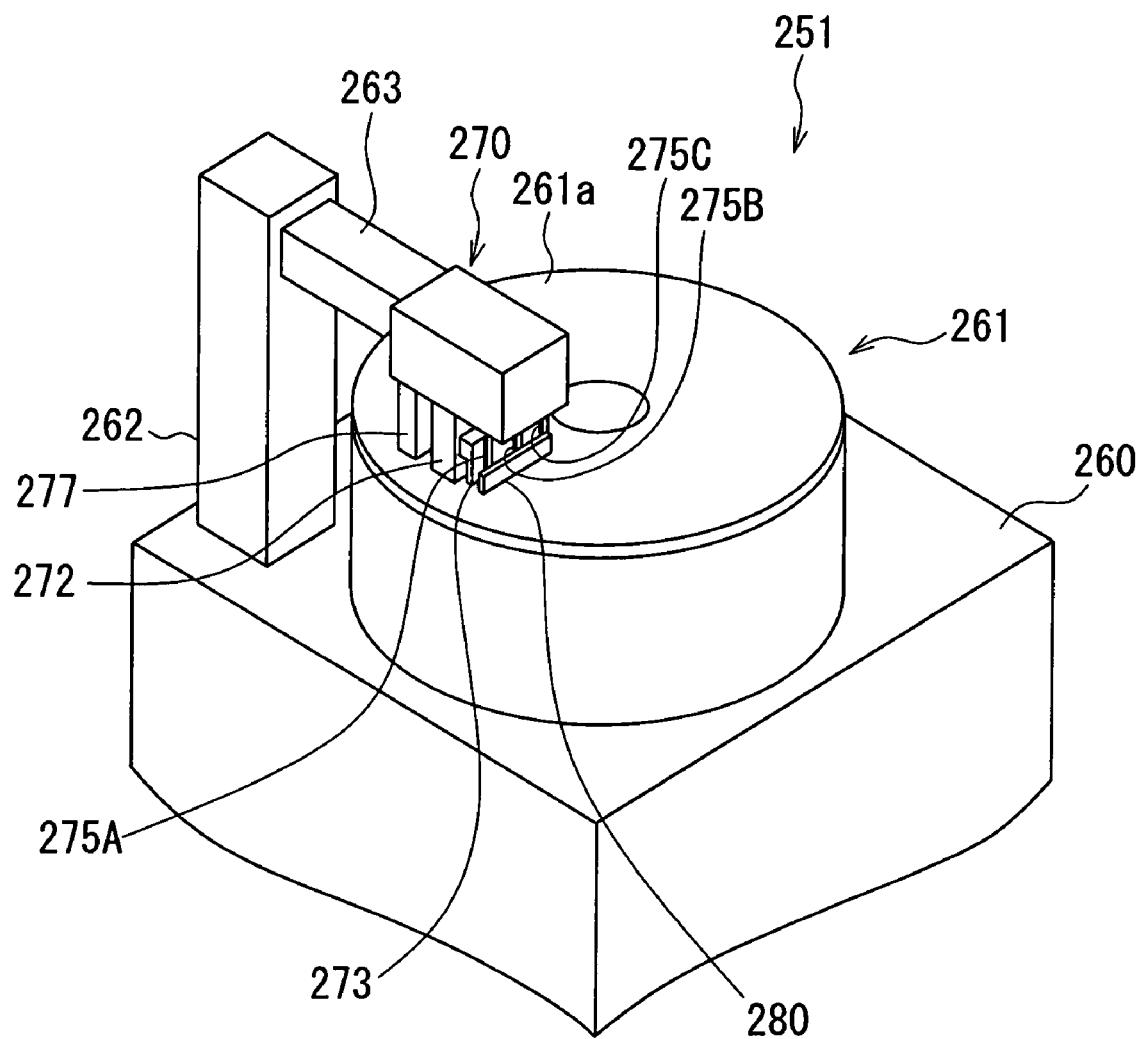
FIG. 41 is a perspective view for schematically illustrating the configuration of a lapping apparatus used in a method of manufacturing the magnetic head of the first embodiment of the invention.

FIG. 41 is a perspective view illustrating a schematic configuration of a lapping apparatus for lapping the head aggregate. This lapping apparatus 251 incorporates: a table 260; a rotating lapping table 261 provided on the table 260; a strut 262 provided on the table 260 on a side of the rotating lapping table 261; and a supporter 270 attached to the strut 262 through an arm 263. The rotating lapping table 261 has a lapping plate (surface plate) 261a to come to contact with the surface to be the medium facing surface 40 of each of the pre-head portions 101 that the head aggregate includes.

The supporter 270 incorporates: a supporter body 277 coupled to the arm 263; a base 272 placed in front of the supporter body 277; a jig retainer 273 placed in front of the base 272; and three load application rods 275A, 275B and 275C placed in front of the jig retainer 273 at equal spacings. A jig 280 is to be fixed to the jig retainer 273. The jig 280 has three load application sections each of which is in the shape of a hole having an oblong cross section. Load application pins are provided at the lower ends of the load application rods 275A, 275B and 275C, respectively. The load application pins have respective heads to be inserted to the load application sections (holes) of the jig 280, the heads each having an oblong cross section. Each of the load application pins is driven by an actuator (not shown) in the vertical, horizontal (along the length of the jig 280) and rotational directions.

The jig 280 has a retainer for retaining the head aggregate. With this jig 280, the retainer and the head aggregate are deformed by applying loads in various directions to the three load application sections. It is thereby possible that the medium facing surfaces 40 are formed so that the resistance of each of the MR elements 5, the first resistor elements 6 and the second resistor elements 42a that the head aggregate includes is of a target value.

Figure 42:
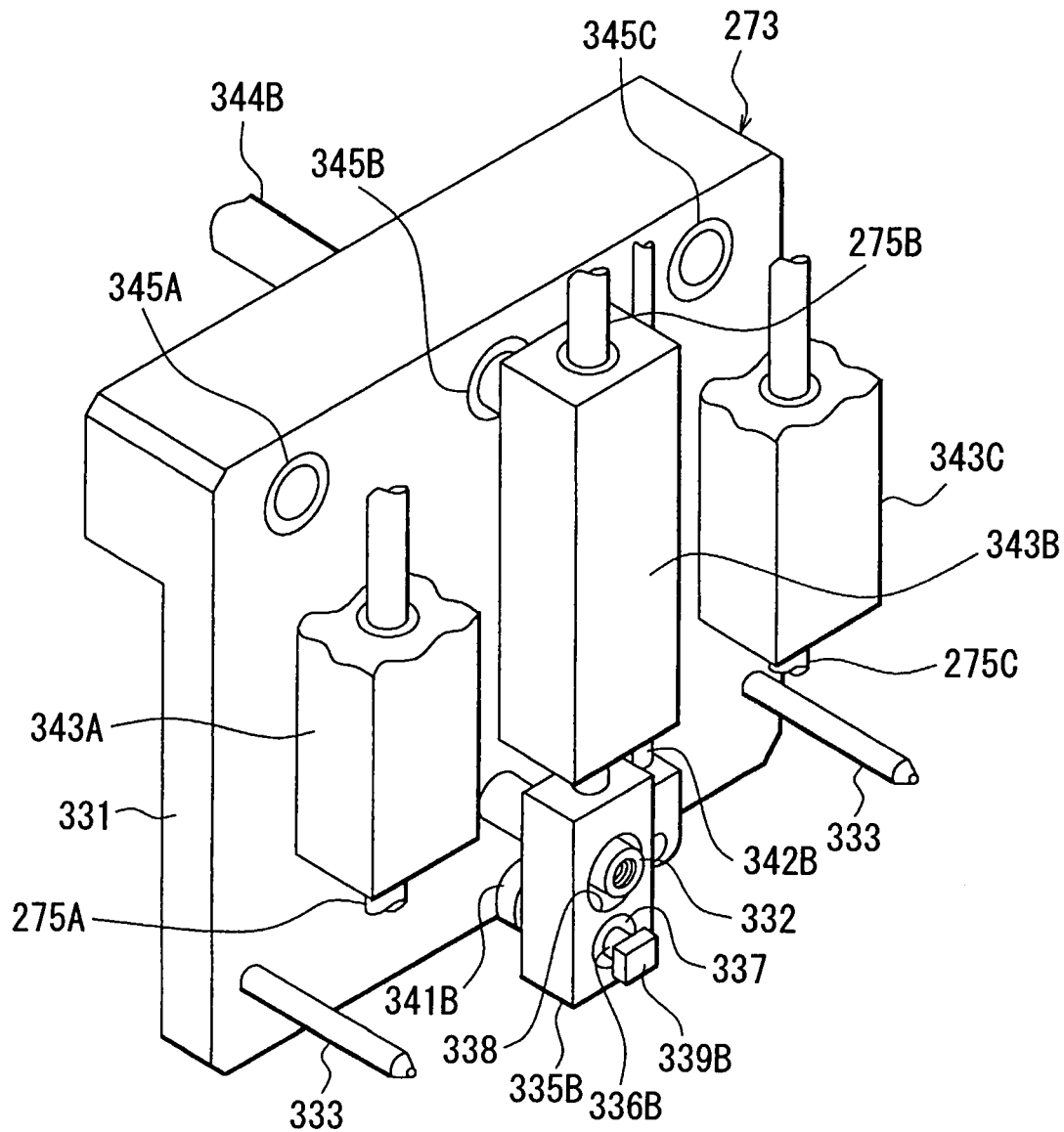
FIG. 42 is a perspective view for illustrating the jig retainer of FIG. 41 and a neighborhood thereof.
Figure 43:
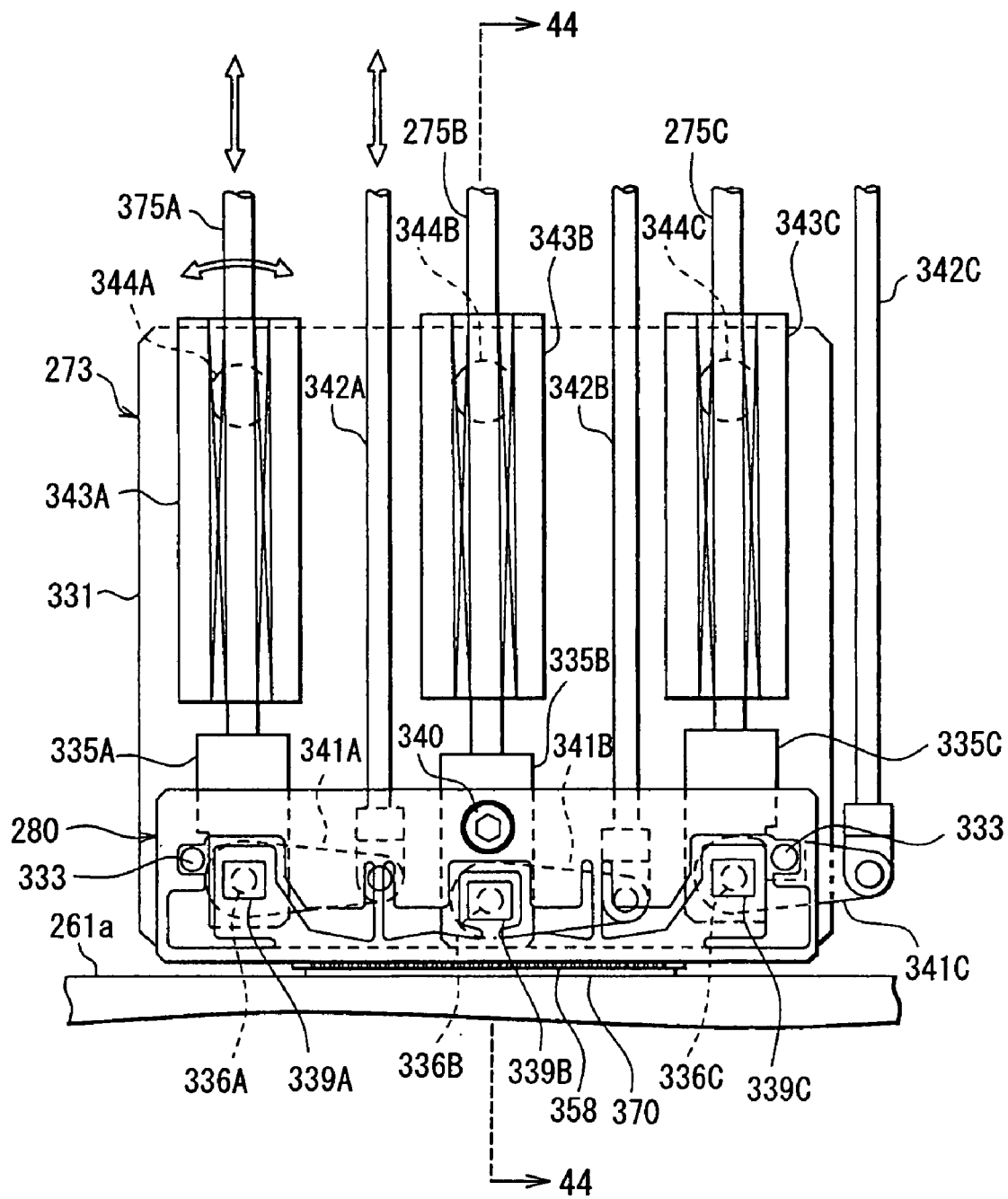
FIG. 43 is a front view for illustrating a state in which a jig is fixed to the jig retainer of FIG. 42.
Figure 44:
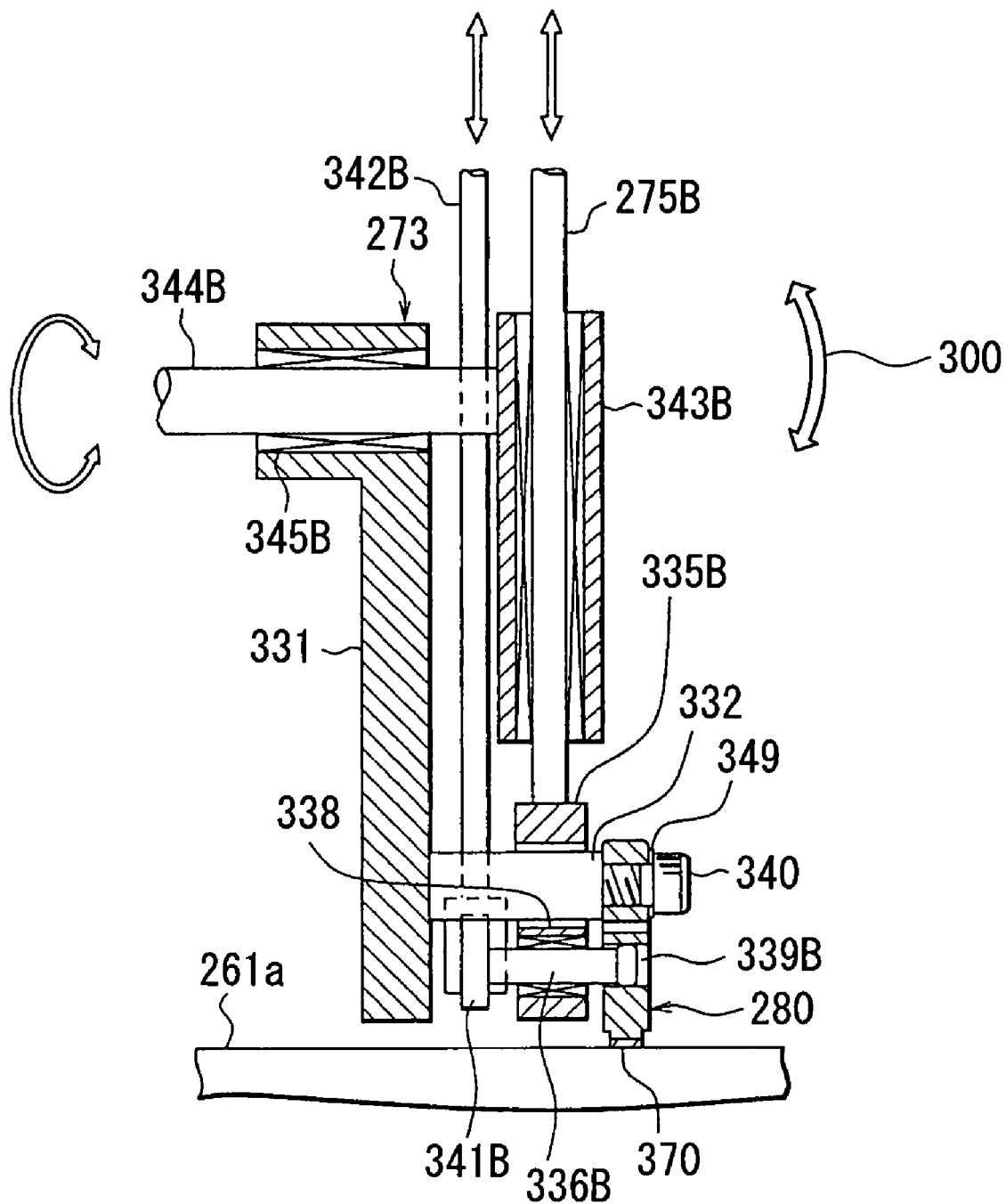
FIG. 44 is a cross-sectional view taken along line 44-44 of FIG. 43.

FIG. 42 is a perspective view illustrating the jig retainer 273 of FIG. 41 and a neighborhood thereof. FIG. 43 is a front view illustrating the state in which the jig is fixed to the jig retainer 273. FIG. 44 is a cross-sectional view taken along line 44-44 of FIG. 43. The jig retainer 273 incorporates: a retainer body 331; a jig fixing pin 332 protruding forward and provided in the middle of the horizontal direction in the neighborhood of the lower end of the front of the jig retainer body 331; and guide pins 333, 333 as members for preventing rotation that protrude forward and are provided near ends in the horizontal direction in the neighborhood of the lower end of the front of the jig retainer main body 331. Each of the guide pins 333, 333 is formed such that a major part is cylinder-shaped and a tip portion has such a shape that the diameter decreases toward the tip. The jig fixing pin 332 has an internal thread formed in the tip. The jig 280 is to be fixed to the jig fixing pin 332 with a bolt 340 as a fixture. The head aggregate 370 is to be attached to the retainer of the jig 280.

Load application blocks 335A, 335B and 335C each of which is rectangular-solid-shaped are fixed to the lower ends of the load application rods 275A, 275B and 275C, respectively. Bearings 337 are provided near the lower ends of the load application blocks 335A, 335B and 335C, the load application pins 336A, 336B and 336C being rotatably inserted to the bearings 337. The load application block 335B has a hole 338 formed at the position corresponding to the jig fixing pin 332, the jig fixing pin 332 being inserted to the hole 338 such that the load application block 335B is movable over a specific distance in the vertical and horizontal directions.

The load application pins 336A, 336B and 336C pass through the bearings 337 of the load application blocks 335A, 335B and 335C, respectively, and the front ends of the load application pins 336A, 336B and 336C protrude from the front end faces of the load application blocks 335A, 335B and 335C, respectively. Heads 339A, 339B and 339C each of which is rectangular-solid-shaped are formed on the tips of the load application pins 336A, 336B and 336C, respectively. The rear ends of the load application pins 336A, 336B and 336C are joined to ends of levers 341A, 341B and 341C disposed between the retainer body 331 and the load application blocks 335A, 335B and 335C. The other ends of the levers 341A, 341B and 341C are rotatably coupled to the lower ends of shafts 342A, 342B and 342C for swinging the levers 341A, 341B and 341C.

In a region above the load application blocks 335A, 335B and 335C, supporter members 343A, 343B and 343C are provided for supporting the load application rods 275A, 275B and 275C rotatably and movably in the vertical direction. Tips of driving rods 344A, 344B and 344C are joined to the rear ends of the supporter members 343A, 343B and 343C. The driving rods 344A, 344B and 344C pass through bearings 345A, 345B and 345C provided in the retainer body 331, and the rear ends of the driving rods 344A, 344B and 344C are introduced to the base 272.

The load application rods 275A, 275B and 275C are each driven in the vertical direction by an actuator (not shown) provided in the base 272. The load application pins 336A, 336B and 336C are thereby driven in the vertical direction. In such a manner, it is possible to apply loads in the vertical direction to the load application sections of the jig 280.

The driving rods 344A, 344B and 344C are each driven in the rotational direction by another actuator (not shown) provided in the base 272. The load application pins 336A, 336B and 336C are thereby driven in the horizontal direction. In such a manner, it is possible to apply loads in the horizontal direction to the load application sections of the jig 280.

The shafts 342A, 342B and 342C are each driven in the vertical direction by still another actuator (not shown) provided in the base 272. The load application pins 336A, 336B and 336C are thereby driven in the rotational direction. In such a manner, it is possible to apply loads in the rotational direction to the load application sections of the jig 280.

The entire supporter 270 is driven by still another actuator in the direction indicated with numeral 300 in FIG. 44. It is thereby possible to change the angle formed by the bottom surface of the jig 280 with respect to the top surface of the lapping plate 261a. In such a manner, it is possible to change the angle formed by the lapped surface to be the medium facing surface 40 with respect to the top surface of the substrate 1.

Figure 45:
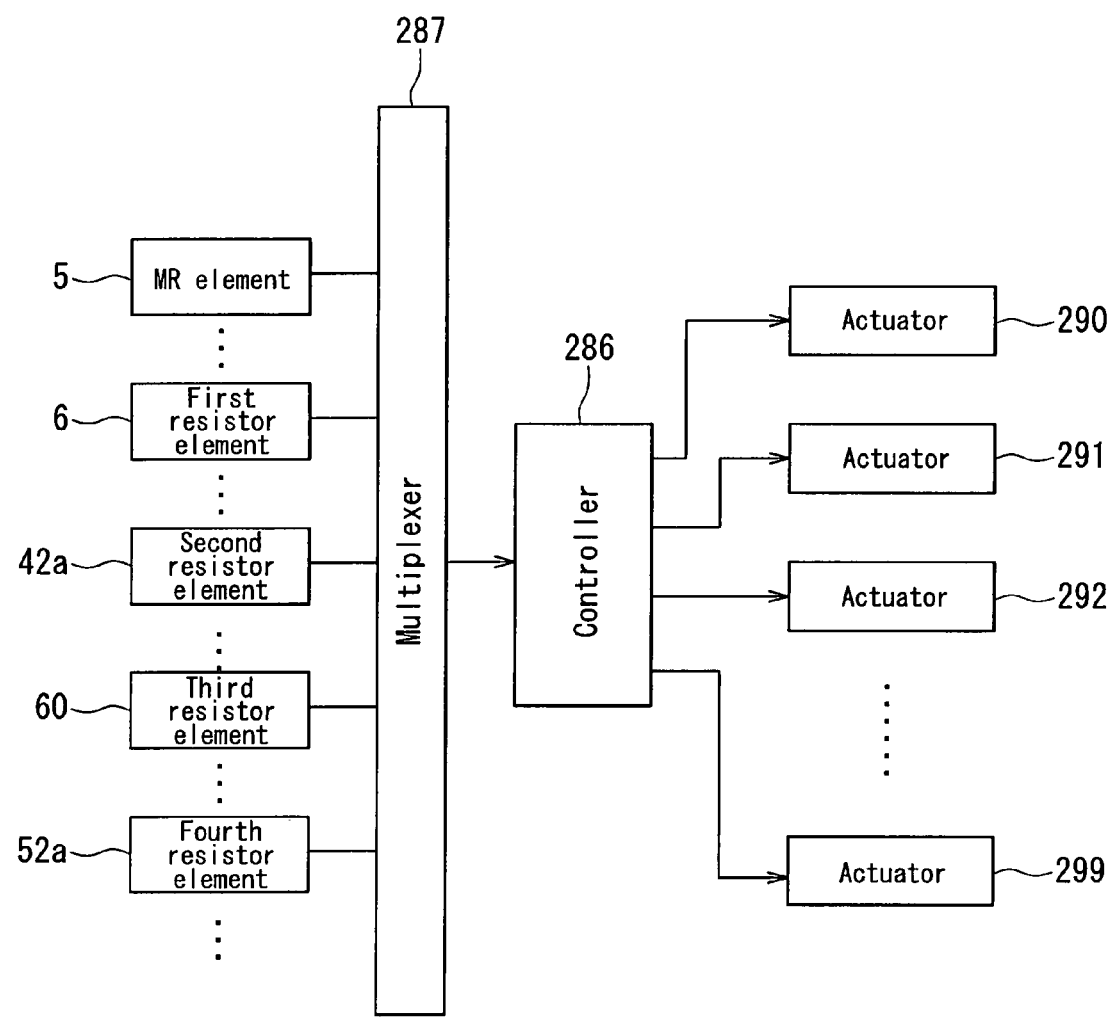
FIG. 45 is a block diagram illustrating an example of circuit configuration of the lapping apparatus of FIG. 41.

FIG. 45 is a block diagram showing an example of circuit configuration of the lapping apparatus shown in FIG. 41. This lapping apparatus incorporates: nine actuators 291 to 299 for applying loads in the three directions to the load application sections of the jig 280; and an actuator 290 for driving the entire supporter 270 in the direction indicated with numeral 300 in FIG. 44. The lapping apparatus further incorporates: a controller 286 for controlling the actuators 290 to 299 through monitoring the resistances of a plurality of MR elements 5 and the resistor elements 6, 42a, 60 and 52a that the head aggregate 370 includes; and a multiplexer 287 connected to the MR elements 5 and the resistor elements 6, 42a, 60 and 52a in the head aggregate 370 through a connector (not shown) for selectively connecting one of the MR elements 5 and the resistor elements 6, 42a, 60 and 52a to the controller 286.

In this lapping apparatus, the controller 286 monitors through the multiplexer 287 the resistances of the MR elements 5 and the resistor elements 6, 42a, 60 and 52a that the head aggregate 370 includes, and controls the actuators 290 to 299 so that each of the resistances is of a specific value.

Flying rails are formed by etching, for example, in the medium facing surfaces 40 formed by lapping as described above. The head aggregate is then cut at the positions of the intra-row portions to be removed 103 that are shown in FIG. 1, so that the pre-head portions 101 are separated from one another, and a plurality of magnetic heads are thereby fabricated.

The specific details of the step of fabricating the magnetic heads by cutting the magnetic head substructure are not limited to the foregoing example. For example, the magnetic heads may be fabricated in the following manner. First, the magnetic head substructure is cut to fabricate a first head aggregate including a plurality of pre-head portions 101 aligned in a plurality of rows. Next, a surface of the first head aggregate is lapped to form the medium facing surfaces 40 for one of the rows of the pre-head portions 101. Next, the first head aggregate is cut so that the one of the rows of the pre-head portions 101 whose medium facing surfaces 40 have been formed is separated to be a second head aggregate. Next, the second head aggregate is cut so that the pre-head portions 101 are separated from one another, and a plurality of magnetic heads are thereby fabricated.

Figure 46:
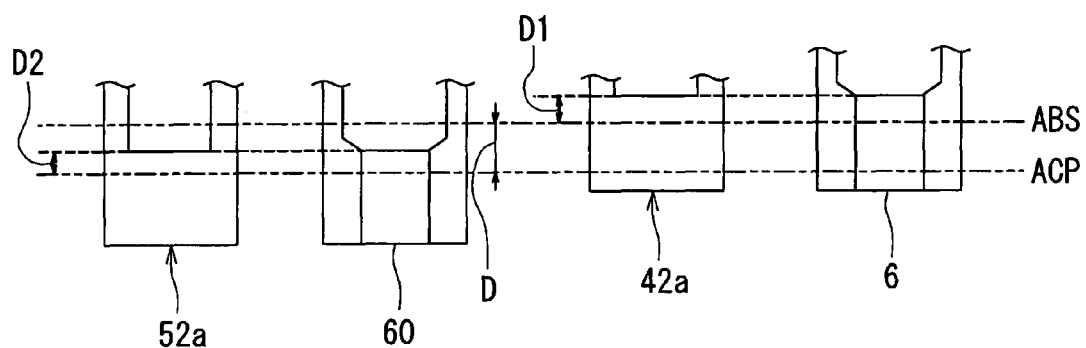
FIG. 46 illustrates the positional relationship among first to fourth resistor elements of the magnetic head substructure of the first embodiment of the invention.
Figure 47:
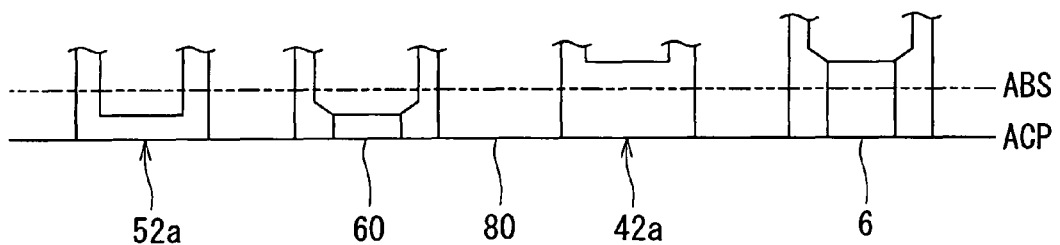
FIG. 47 illustrates a step of lapping a head aggregate in the method of manufacturing the magnetic head of the first embodiment of the invention.
Figure 48:
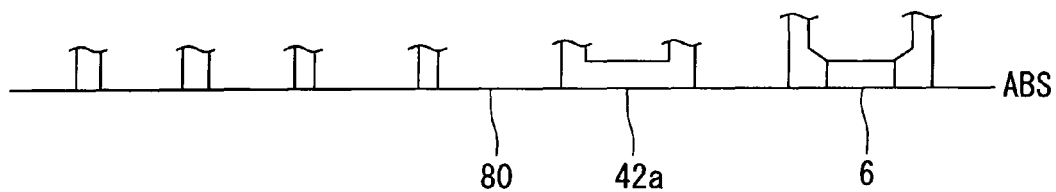
FIG. 48 illustrates the step of lapping the head aggregate in the method of manufacturing the magnetic head of the first embodiment of the invention.

Reference is now made to FIG. 46 to FIG. 48 to describe the step of forming the medium facing surfaces 40 by lapping the head aggregate in more detail. First, reference is made to FIG. 46 to describe the arrangement of the first to fourth resistor elements 6, 42a, 60 and 52a. FIG. 46 illustrates the positional relationship among the first to fourth resistor elements 6, 42a, 60 and 52a.

The first resistor element 6 and the second resistor element 42a are disposed so that the respective distances from the top surface of the substrate 1 are different, and used to detect the position of the lapped surface and to detect the angle formed by the lapped surface with respect to the top surface of the substrate 1. In particular, the first resistor element 6 and the second resistor element 42a are disposed to extend across the intra-row portion to be removed 103 and a portion of the inter-row portion to be removed 102 that are adjacent to each other with the plane ABS located in between. The first resistor element 6 and the second resistor element 42a are particularly used to control the position of the medium facing surface 40 and the angle formed by the medium facing surface 40 with respect to the top surface of the substrate 1.

The third resistor element 60 and the fourth resistor element 42a are also disposed so that the respective distances from the top surface of the substrate 1 are different, and used to detect the position of the lapped surface and to detect the angle formed by the lapped surface with respect to the top surface of the substrate 1. The third resistor element 60 and the fourth resistor element 52a are located at positions shifted from the first resistor element 6 and the second resistor element 42a along the direction orthogonal to the medium facing surface 40. That is, the third resistor element 60 and the fourth resistor element 52a are located farther from the target position of the medium facing surface 40, that is, the plane ABS, than the first resistor element 6 and the second resistor element 42a. To be specific, the third resistor element 60 and the fourth resistor element 52a are disposed to extend across two regions in the inter-row portion to be removed 102 that are adjacent to each other with the plane ACP parallel to the plane ABS located in between. The third resistor element 60 and the fourth resistor element 52a are used to control the position of the lapped surface and the angle formed by the lapped surface with respect to the top surface of the substrate 1 when the lapped surface is located near the plane ACP.

When a portion of each of the resistor elements 6, 42a, 60 and 52a is exposed at the lapped surface, the length of each of the resistor elements 6, 42a, 60 and 52a taken in the direction orthogonal to the medium facing surface 40 changes with changes in position of the lapped surface along the direction orthogonal to the medium facing surface 40, and the resistance of each of the resistor elements 6, 42a, 60 and 52a thereby changes. The resistance of each of the resistor elements 6, 42a, 60 and 52a is inversely proportional to the length of each of the resistor elements 6, 42a, 60 and 52a taken in the direction orthogonal to the medium facing surface 40. Therefore, a change in resistance of each of the resistor elements 6, 42a, 60 and 52a with respect to a change in position of the lapped surface becomes greater as the length of each of the resistor elements 6, 42a, 60 and 52a decreases.

Here, in the magnetic head substructure, as shown in FIG. 46, the distance between the plane ABS and the end face of each of the resistor elements 6 and 42a located in the intra-row portion to be removed 103 is defined as D1, the distance between the plane ACP and the end face of each of the resistor elements 60 and 52a closer to the plane ABS is defined as D2, and the distance between the plane ABS and the plane ACP is defined as D. D1 is determined so that a change in resistance of each of the resistor elements 6 and 42a with respect to a change in position of the lapped surface is sufficiently great when the lapped surface has become closer to the plane ABS. Similarly, D2 is determined so that a change in resistance of each of the resistor elements 60 and 52a with respect to a change in position of the lapped surface is sufficiently great when the lapped surface has become closer to the plane ACP. To be specific, each of D1 and D2 is determined to be a value within a range of 0.4 to 0.8 µm inclusive, for example. D is within a range of 1 to 5 µm inclusive, for example, and preferably within a range of 3 to 4 µm inclusive. D is equal to the amount of shift between the position of the resistor elements 6, 42a and the position of the resistor elements 60, 52a, for example. The distance between the plane ABS and the end face of each of the resistor elements 6 and 42a located in the inter-row portion to be removed 102 is equal to or greater than D, for example.

FIG. 47 illustrates the state in which the lapped surface 80 reaches the plane ACP in the step of lapping the head aggregate. In the step of lapping the head aggregate, as shown in FIG. 47, the lapped surface 80 gets closer to the plane ACP before getting closer to the plane ABS. At this time, the change in resistance of each of the resistor elements 60 and 52a with respect to a change in the position of the lapped surface 80 is greater than the change in resistance of each of the resistor elements 6 and 42a with respect to the change in the position of the lapped surface 80. Accordingly, when the lapped surface 80 is close to the plane ACP, the lapping apparatus is capable of precisely detecting the position of the lapped surface 80 and the angle formed by the lapped surface 80 with respect to the top surface of the substrate 1, based on the resistances of the resistor elements 60 and 52a. The lapping apparatus performs lapping while monitoring the resistances of the resistor elements 60 and 52a by using the controller 286 and controlling the actuators 290 to 299 so that those resistances are of specific values. To be specific, the lapping apparatus performs lapping while controlling the actuators 290 to 299 so that, for example, the distance between the plane ACP and the end face of the third resistor element 60 exposed at the lapped surface 80 coincides with the distance between the plane ACP and the end face of the fourth resistor element 52a exposed at the lapped surface 80. As a result, as long as the lapped surface 80 is located at a position within a range detectable by the third and fourth resistor elements 60 and 52a, it is possible to detect the distance between the lapped surface 80 and the target position of the medium facing surface 40 and to control the angle formed by the lapped surface 80 with respect to the top surface of the substrate 1 so that the angle is of a desired value such as 90 degrees.

FIG. 48 illustrates the state in which the lapped surface 80 reaches the plane ABS that is the target position of the medium facing surface 40 in the step of lapping the head aggregate. If the step of lapping the head aggregate proceeds, the resistor elements 60 and 52a disappear, as shown in FIG. 48. At this time, however, the lapped surface 80 is close enough to the plane ABS, and the change in resistance of each of the MR element 5 and the resistor elements 6 and 42a with respect to the change in position of the lapped surface 80 is sufficiently great. As a result, the lapping apparatus is capable of precisely detecting the position of the lapped surface 80 and the angle formed by the lapped surface 80 with respect to the top surface of the substrate 1, based on the resistance of each of the MR element 5 and the resistor elements 6 and 42a. The lapping apparatus performs lapping while monitoring the resistances of the MR element 5 and the resistor elements 6 and 42a by using the controller 286 and controlling the actuators 290 to 299 so that those resistances are of specific values. To be specific, the lapping apparatus performs lapping while controlling the actuators 290 to 299 so that, for example, the distance between the plane ABS and the end face of the MR element 5 exposed at the lapped surface 80, the distance between the plane ABS and the end face of the first resistor element 6 exposed at the lapped surface 80, and the distance between the plane ABS and the end face of the second resistor element 42a exposed at the lapped surface 80 coincides with one another. The lapping apparatus performs lapping so that the position of the end face of each of the MR element 5 and the resistor elements 6 and 42a exposed at the lapped surface 80 finally coincides with the plane ABS. As a result, it is possible to form the medium facing surface 40 at a desired position with accuracy and to control the angle formed by the medium facing surface 40 with respect to the top surface of the substrate 1 so that the angle is of a desired value such as 90 degrees.

When the lapped surface is located at a position within a range detectable by the first and second resistor elements 6 and 42a, the lapping apparatus may perform lapping while monitoring the resistances of the resistor elements 6 and 42a only, without monitoring the resistance of the MR element 5, and controlling the actuators 290 to 299 so that those resistances are of specific values.

When the lapped surface 80 is located at a position between the plane ACP and the plane ABS and the resistor elements 60 and 52a remain, the lapping apparatus may perform lapping while controlling the actuators 290 to 299 so that the resistances of the first to fourth resistor elements 6, 42a, 60 and 52a are of specific values.

According to the embodiment as thus described, in the step of lapping the head aggregate, even when the lapped surface is far from the target position of the medium facing surface 40 and it is therefore impossible to precisely detect the distance between the lapped surface and the target position of the medium facing surface 40 and the angle formed by the lapped surface with respect to the top surface of the substrate 1 by using the first and second resistor elements 6 and 42a, it is possible to precisely detect the distance between the lapped surface and the target position of the medium facing surface 40 and the angle formed by the lapped surface with respect to the top surface of the substrate 1 by using the third and fourth resistor elements 60 and 52a. As a result, according to the embodiment, it is possible to perform lapping while obtaining the distance between the lapped surface and the target position of the medium facing surface 40 even when the lapped surface is far from the target position of the medium facing surface 40. Furthermore, according to the embodiment, it is possible to prevent the angle formed by the lapped surface with respect to the top surface of the substrate 1 from deviating greatly from 90 degrees when the lapped surface is far from the target position of the medium facing surface 40.

According to the embodiment, in the step of lapping the head aggregate, the medium facing surface 40 is formed by lapping the lapped surface while monitoring the resistances of the MR element 5, the first resistor element 6 and the second resistor element 42a so that the resistances of the MR element 5, the first resistor element 6 and the second resistor element 42a are of specific values. As a result, according to the embodiment, it is possible to precisely form the medium facing surface 40 at a desired position so that the MR height, the throat height TH and the neck height NH of each of the pre-head portions 101 are of desired values. Furthermore, by forming the medium facing surface 40 in such a manner, it is possible to control the angle θ formed by the medium facing surface 40 with respect to the top surface of the substrate 1 shown in FIG. 4 so that the angle θ is of a desired value such as 90 degrees.

In the embodiment, the resistance of the second resistor element 42a is related to the neck height NH. Therefore, it is important to align the second resistor element 42a and the pole layer 24 with respect to each other with accuracy. In the embodiment the opening 17a of the nonmagnetic conductive layer 17 and the second resistor element 42a are patterned at the same time. It is thereby possible to align the opening 17a and the second resistor element 42a with respect to each other with accuracy. The shape and position of the pole layer 24 are determined by the shape and position of the opening 17a. Because of these features, according to the embodiment, it is possible to align the second resistor element 42a and the pole layer 24 with respect to each other with accuracy.

According to the embodiment, the pole layer 24 is disposed in the groove 15a of the encasing layer 15 with the nonmagnetic film 20 and the polishing stopper layer 23 disposed between the pole layer 24 and the groove 15a. Therefore, the shape of the pole layer 24 is determined by the shape of the groove 15a. As thus described, according to the embodiment, since the side portions of the pole layer 24 are not etched, it is impossible that the neck height NH is greater than a desired value and/or the pole layer 24 is greatly out of a desired shape. Furthermore, according to the embodiment, it is possible to form the medium facing surface 40 at a desired position with accuracy as previously described. Because of these features, it is possible to determine the track width with accuracy even if the neck height NH is small.

According to the embodiment, it is possible to form the pole layer 24 with accuracy to have a small width and a shape capable of preventing problems resulting from the skew.

According to the embodiment, the pole layer 24 is disposed in the groove 15a of the encasing layer 15 with the nonmagnetic film 20 and the polishing stopper layer 23 disposed between the pole layer 24 and the groove 15a. As a result, it is possible to reduce the width of the top surface of the track width defining portion 24A that defines the track width.

In the embodiment, the lapped surface may be lapped while monitoring the resistances of a plurality of MR elements 5 and second resistor elements 42a that the head aggregate includes, without providing the first resistor elements 6, and the medium facing surfaces 40 may be thereby formed so that the resistance of each of the MR elements 5 and the second resistor elements 42a is of a specific value. It is possible to achieve the above-described effects in this case, too. In this case, each of the MR elements 5 also functions as the first detection element of the invention.

Modification Example

Figure 49:
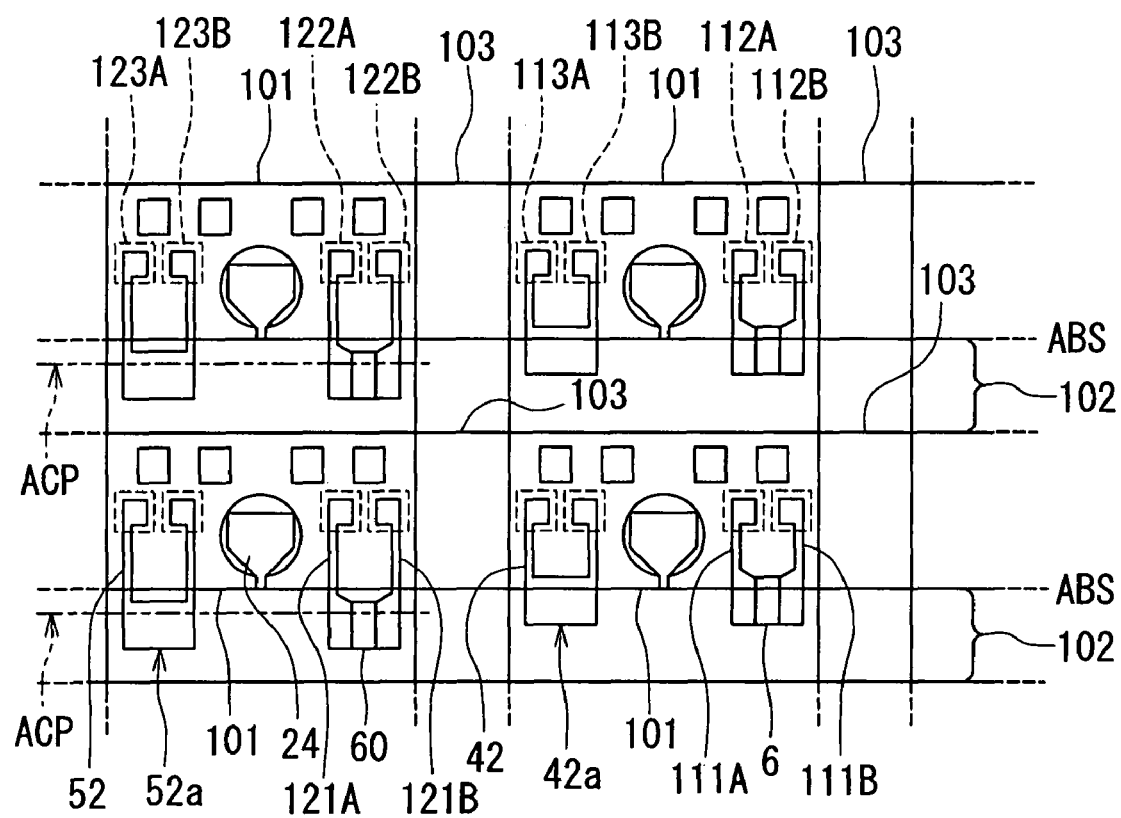
FIG. 49 illustrates a modification example of the magnetic head substructure of the first embodiment of the invention.

FIG. 49 illustrates a modification example of the magnetic head substructure of the embodiment. In the modification example each of the first resistor element 6 and the second resistor element 42a is disposed to extend across the pre-head portion 101 and a portion of the inter-row portion to be removed 102 that are adjacent to each other with the plane ABS disposed in between. That is, a portion of each of the first resistor element 6 and the second resistor element 42a is located in a region that will remain in the magnetic head. The two leads 111A and 111B connected to the first resistor element 6 are located in the pre-head portion 101. A portion of the resistor layer 42 other than the second resistor element 42a is located in the pre-head portion 101, too. In addition, the two terminals 112A and 112B respectively connected to the leads 111A and 111B and the two terminals 113A and 113B connected to the resistor layer 42 are located in the pre-head portion 101, too.

In the modification example each of the third resistor element 60 and the fourth resistor element 52a is disposed in a portion of the inter-row portion to be removed 102 adjacent to the pre-head portion 101. The two leads 121A and 121B connected to the third resistor element 60 are disposed to extend across the pre-head portion 101 and a portion of the inter-row portion to be removed 102 that are adjacent to each other with the plane ABS located in between. A portion of the resistor layer 52 other than the fourth resistor element 52a is also disposed to extend across the pre-head portion 101 and the portion of the inter-row portion to be removed 102 that are adjacent to each other with the plane ABS located in between. In addition, the two terminals 122A and 122B respectively connected to the leads 121A and 121B and the two terminals 123A and 123B connected to the resistor layer 52 are located in the pre-head portion 101.

The remainder of configuration of the magnetic head substructure of the modification example is the same as that of the substructure shown in FIG. 38 to FIG. 40. In addition, a method of manufacturing a magnetic head using the substructure of the modification example is also similar to the method of manufacturing a magnetic head using the substructure shown in FIG. 38 to FIG. 40.

Second Embodiment

Figure 50:
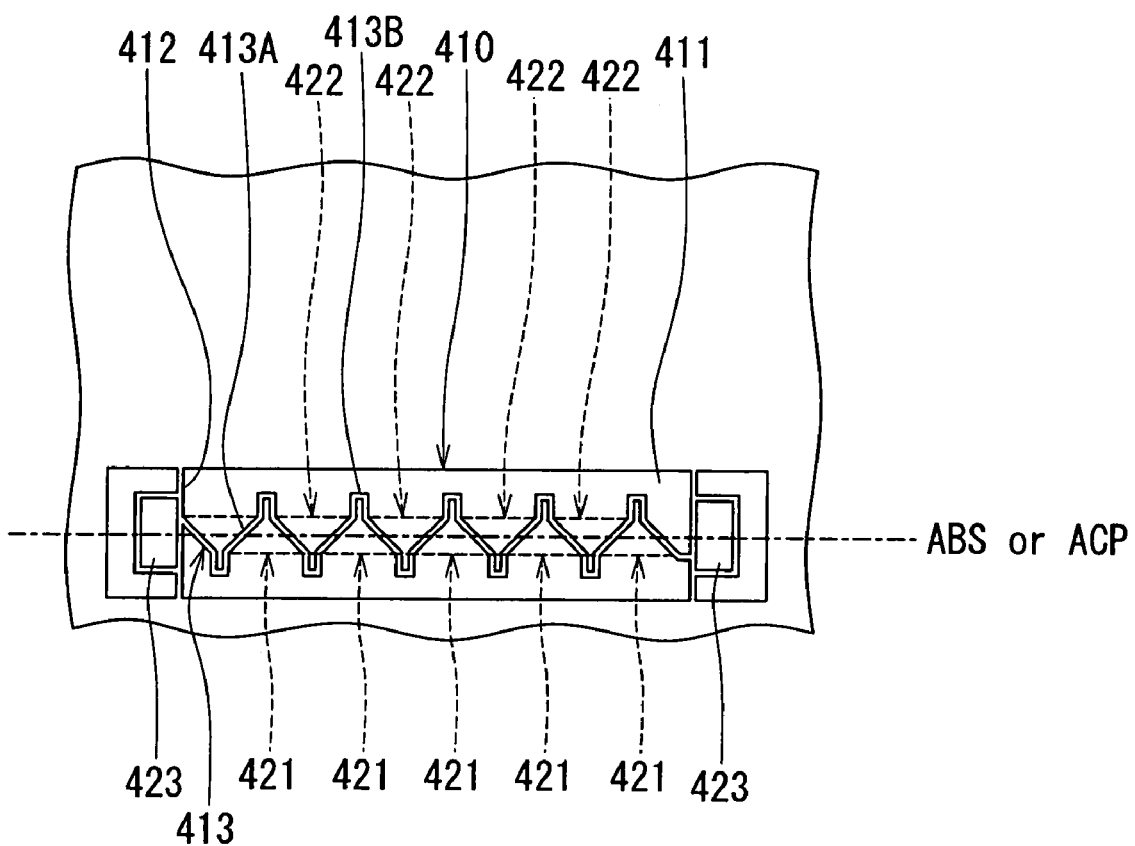
FIG. 50 is a top view of an indicator section of a magnetic head substructure of a second embodiment of the invention.

Reference is now made to FIG. 50 to describe a method of manufacturing a magnetic head and a magnetic head substructure of a second embodiment of the invention. The magnetic head substructure of the second embodiment incorporates first to fourth detection elements, wherein at least one of the first to fourth detection elements has an indicator section 410 shown in FIG. 50. That is, in the substructure of the second embodiment, the indicator section 410 shown in FIG. 50 is provided in place of at least one of the first to fourth resistor elements 6, 42a, 60 and 52a of the first embodiment. The indicator section 410 is placed at a position the same as that of the resistor elements 6, 42a, 60 and 52a. The indicator section 410 may be located in a region that will not remain in the magnetic head, or a portion of the indicator section 410 may be located in a region that will remain in the magnetic head.

If the indicator section 410 is provided in place of the resistor elements 6 and 42a, the indicator section 410 is located in a region that intersects the plane ABS. If the indicator section 410 is provided in place of the resistor elements 60 and 52a, the indicator section 410 is located in a region that intersects the plane ACP.

FIG. 50 illustrates an example of configuration of the indicator section 410. The indicator section 410 is made up of an indicator layer 411 and an indicator defining portion 412. In addition, the indicator section 410 includes a plurality of first indicators 421, a plurality of second indicators 422, and two reference portions 423. The indicator defining portion 412 is a portion for defining the outer shapes of the first indicators 421, the second indicators 422 and the reference portions 423. A portion of the indicator section 410 other than the indicator defining portion 412 is the indicator layer 411. The first indicators 421, the second indicators 422 and the reference portions 423 are formed of respective portions of the indicator layer 411. The indicator defining portion 412 is a groove formed in the indicator layer 411, for example. The plane geometry of the entire indicator section 410 is a rectangle that is long in the direction parallel to the plane ABS or the plane ACP and parallel to the top surface of the substrate 1 (the horizontal direction of FIG. 50). The indicator layer 411 may be made of a material the same as that of the nonmagnetic conductive layer 17, for example.

The two reference portions 423 are located near ends of the indicator section 410, respectively, the ends being opposed to each other in the longitudinal direction. The indicator defining portion 412 includes a zigzag portion 413 located between the two reference portions 423. The first indicators 421 and the second indicators 422 are located opposite to each other with the zigzag portion 413 located in between. The first indicators 421 are located lower than the zigzag portion 413 in FIG. 50. The second indicators 422 are located higher than the zigzag portion 413 in FIG. 50. The first indicators 421 and the second indicators 422 are alternately located when seen in the direction of length of the indicator section 410 (the horizontal direction of FIG. 50).

The zigzag portion 413 includes: a plurality of straight-line portions 413A intersecting the plane ABS or the plane ACP; and projecting portions 413B connected to ends of the straight-line portions 413A. The projecting portions 413B connect ends of respective adjacent two of the straight-line portions 413A to each other. The respective adjacent two of the straight-line portions 413A intersect the plane ABS or the plane ACP in a slanting direction and extend in directions different from each other. The straight-line portions 413A define sides of the first indicators 421 and the second indicators 422, the sides intersecting the plane ABS or the plane ACP in a slanting direction. The role of the projecting portions 413B is to prevent portions of the straight-line portions 413A near the ends thereof from bending when the indicator defining portion 412 is formed through the use of photolithography.

Each of the first indicators 421 and each of the second indicators 422 are formed between adjacent two of the straight-line portions 413A. Each of the first indicators 421 and the second indicators 422 has a shape obtained by trimming an apex portion of an isosceles triangle having a base located parallel to the plane ABS or the plane ACP. Therefore, the first indicators 421 and the second indicators 422 each have two sides having equal lengths that intersect the plane ABS or the plane ACP in a slanting direction. These two sides correspond to the two sides of equal lengths of the above-mentioned isosceles triangle.

In the case in which the indicator section 410 is provided in place of the resistor elements 6 and 42a, the first indicator 421 and the second indicator 422 are equal in width at the target position of the medium facing surface 40, that is, at the plane ABS. In the case in which the indicator section 410 is provided in place of the resistor elements 60 and 52a, the first indicator 421 and the second indicator 422 are equal in width at the plane ACP. Each of the reference portions 423 has a width that is equal to the width of the first indicator 421 and the second indicator 422 taken at the plane ABS or the plane ACP, and that does not change with a change in position along the direction orthogonal to the medium facing surface 40. Each of the reference portions 423 is disposed to intersect the plane ABS or the plane ACP.

In the embodiment the first indicator 421 and the second indicator 422 are exposed at the lapped surface in the step of lapping the head aggregate. Then, one of the width of the first indicator 421 and the width of the second indicator 422 taken at the lapped surface decreases while the other increases with changes in position of the lapped surface along the direction orthogonal to the medium facing surface 40. Therefore, according to the embodiment, it is possible to detect the position of the lapped surface by observing the width of the first indicator 421 and the width of the second indicator 422 taken at the lapped surface. Therefore, it is possible to use the indicator section 410 in place of at least one of the first to fourth resistor elements 6, 42a, 60 and 52a of the first embodiment.

The remainder of configuration, function and effects of the second embodiment are similar to those of the first embodiment.

The present invention is not limited to the foregoing embodiments but may be practiced in still other ways. For example, a coil wound around the pole layer 24 in a helical manner may be provided in place of the flat-whorl-shaped coils 13 and 31 in each of the embodiments.

In the foregoing embodiments, although the magnetic head is disclosed, having such a configuration that the read head is formed on the base body and the write head is stacked on the read head, the read head may be stacked on the write head.

The invention is applicable not only to magnetic heads for the perpendicular magnetic recording system but also to magnetic heads for the longitudinal magnetic recording system.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a magnetic head, the magnetic head comprising:
   a medium facing surface that faces toward a recording medium;
   a read element that reads data written on the recording medium; and
   a write element that has an end face located in the medium facing surface and writes data on the recording medium, the method comprising the steps of:
   fabricating a magnetic head substructure by forming a plurality of sets of the read element and the write element on a substrate, the magnetic head substructure including a plurality of pre-head portions that are aligned in a plurality of rows, each of the pre-head portions including a set of the read element and the write element; and
   fabricating a plurality of magnetic heads by separating the plurality of pre-head portions from one another through cutting the substructure, wherein:
   in the step of fabricating the substructure, the read elements and the write elements are disposed such that a distance from a top surface of the substrate to the read elements and a distance from the top surface of the substrate to the write elements are different;
   the step of fabricating the magnetic heads includes the step of lapping a cut surface that is formed by cutting the substructure, so that a lapped surface that is formed by lapping the cut surface reaches a target position of the medium facing surface and thereby becomes the medium facing surface;
   the step of fabricating the substructure includes the step of forming: first and second detection elements that are disposed such that a distance from the top surface of the substrate to the first detection element and a distance from the top surface of the substrate to the second detection element are different and that are each used to detect a position of the lapped surface and to detect an angle formed by the lapped surface with respect to the top surface of the substrate; and third and fourth detection elements that are located at positions shifted from the first and second detection elements along a direction orthogonal to the medium facing surface and disposed such that a distance from the top surface of the substrate to the third detection element and a distance from the top surface of the substrate to the fourth detection element are different and that are each used to detect the position of the lapped surface and to detect the angle formed by the lapped surface with respect to the top surface of the substrate; and,
   in the step of lapping the cut surface, the medium facing surface is formed by lapping the cut surface while monitoring the position of the lapped surface and the angle formed by the lapped surface with respect to the top surface of the substrate that are detected by using the first and second detection elements, and monitoring the position of the lapped surface and the angle formed by the lapped surface with respect to the top surface of the substrate that are detected by using the third and fourth detection elements.

2. The method according to claim 1, wherein each of the first to fourth detection elements is a resistor element whose resistance changes with changes in the position of the lapped surface.

3. The method according to claim 1, wherein the third and fourth detection elements are located farther from the target position of the medium facing surface than the first and second detection elements.

4. The method according to claim 3, wherein each of the first to fourth detection elements is removed in the step of fabricating the plurality of magnetic heads.

5. The method according to claim 3, wherein a portion of each of the first and second detection elements remains in the magnetic head.

6. The method according to claim 1, wherein the read element is a magnetoresistive element.

7. The method according to claim 6, wherein the read element also functions as the first detection element.

8. The method according to claim 1, wherein at least one of the first to fourth detection elements includes a first indicator and a second indicator that are exposed at the lapped surface, and one of a width of the first indicator and a width of the second indicator taken at the lapped surface decreases while the other increases with changes in the position of the lapped surface.

9. The method according to claim 1, wherein the write element incorporates: a coil for generating a magnetic field corresponding to data to be written on the recording medium; and a pole layer that includes a track width defining portion having an end face located in the medium facing surface, the pole layer allowing a magnetic flux corresponding to the field generated by the coil to pass therethrough and generating a write magnetic field for writing the data on the recording medium.

10. The method according to claim 1, wherein the magnetic head is one used for a perpendicular magnetic recording system.

11. A magnetic head substructure used for manufacturing a magnetic head, the magnetic head comprising:
    a medium facing surface that faces toward a recording medium;
    a read element that reads data written on the recording medium; and
    a write element that has an end face located in the medium facing surface and writes data on the recording medium, the substructure comprising:
    a substrate; and
    a plurality of sets of the read element and the write element that are formed on the substrate so that a plurality of pre-head portions each of which includes a set of the read element and the write element are aligned in a plurality of rows, wherein:
    the read elements and the write elements are disposed such that a distance from a top surface of the substrate to the read elements and a distance from the top surface of the substrate to the write elements are different; and
    the substructure is such one that, to fabricate the magnetic head, the substructure is cut so that the plurality of pre-head portions are separated from one another, a cut surface formed by cutting the substructure is lapped to form a lapped surface, and the lapped surface reaches a target position of the medium facing surface and thereby becomes the medium facing surface, the substructure further comprising: first and second detection elements that are disposed such that a distance from the top surface of the substrate to the first detection element and a distance from the top surface of the substrate to the second detection element are different and that are each used to detect a position of the lapped surface and to detect an angle formed by the lapped surface with respect to the top surface of the substrate; and third and fourth detection elements that are located at positions shifted from the first and second detection elements along a direction orthogonal to the medium facing surface and disposed such that a distance from the top surface of the substrate to the third detection element and a distance from the top surface of the substrate to the fourth detection element are different and that are each used to detect the position of the lapped surface and to detect the angle formed by the lapped surface with respect to the top surface of the substrate.

12. The substructure according to claim 11, wherein each of the first to fourth detection elements is a resistor element whose resistance changes with changes in the position of the lapped surface.

13. The substructure according to claim 11, wherein the third and fourth detection elements are located farther from the target position of the medium facing surface than the first and second detection elements.

14. The substructure according to claim 13, wherein each of the first to fourth detection elements is removed when the substructure is cut.

15. The substructure according to claim 13, wherein a portion of each of the first and second detection elements remains in the magnetic head.

16. The substructure according to claim 11, wherein the read element is a magnetoresistive element.

17. The substructure according to claim 16, wherein the read element also functions as the first detection element.

18. The substructure according to claim 11, wherein at least one of the first to fourth detection elements includes a first indicator and a second indicator that are exposed at the lapped surface, and one of a width of the first indicator and a width of the second indicator taken at the lapped surface decreases while the other increases with changes in the position of the lapped surface.

19. The substructure according to claim 11, wherein the write element incorporates: a coil for generating a magnetic field corresponding to data to be written on the recording medium; and a pole layer that includes a track width defining portion having an end face located in the medium facing surface, the pole layer allowing a magnetic flux corresponding to the field generated by the coil to pass therethrough and generating a write magnetic field for writing the data on the recording medium.

20. The substructure according to claim 11, wherein the magnetic head is one used for a perpendicular magnetic recording system.

* * * * *